US009244686B2

(12) United States Patent
Henry et al.

(10) Patent No.: US 9,244,686 B2
(45) Date of Patent: Jan. 26, 2016

(54) MICROPROCESSOR THAT TRANSLATES CONDITIONAL LOAD/STORE INSTRUCTIONS INTO VARIABLE NUMBER OF MICROINSTRUCTIONS

(75) Inventors: G. Glenn Henry, Austin, TX (US); Terry Parks, Austin, TX (US); Rodney E. Hooker, Austin, TX (US); Gerard M. Col, Austin, TX (US); Colin Eddy, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 365 days.

(21) Appl. No.: 14/007,116

(22) PCT Filed: Apr. 6, 2012

(86) PCT No.: PCT/US2012/032461
§ 371 (c)(1),
(2), (4) Date: Dec. 5, 2013

(87) PCT Pub. No.: WO2012/138957
PCT Pub. Date: Oct. 11, 2012

(65) Prior Publication Data
US 2014/0122847 A1 May 1, 2014

Related U.S. Application Data

(63) Continuation-in-part of application No. 13/416,879, filed on Mar. 9, 2012, now Pat. No. 9,128,701, which is a continuation-in-part of application No. 13/224,310, filed on Sep. 1, 2011, now Pat. No.
(Continued)

(51) Int. Cl.
*G06F 9/312* (2006.01)
*G06F 9/30* (2006.01)
(Continued)

(52) U.S. Cl.
CPC .............. *G06F 9/3017* (2013.01); *G06F 9/265* (2013.01); *G06F 9/30043* (2013.01);
(Continued)

(58) Field of Classification Search
None
See application file for complete search history.

(56) References Cited

U.S. PATENT DOCUMENTS 5,226,164 A 7/1993 Nadas et al.
5,235,686 A 8/1993 Bosshart
(Continued)

FOREIGN PATENT DOCUMENTS

CN 101866280 A 10/2010
EP 0709767 5/1996
(Continued)

OTHER PUBLICATIONS

Gwennap, Linley "Intel's P6 Uses Decoupled Superscalar Design: Next Generation of x86 Integrates L2 Cache in Package with CPU." Microprocessor Report, vol. 9, No. 2, pp. 1-7. Feb. 1995.
(Continued)

*Primary Examiner* — Kenneth Kim
(74) *Attorney, Agent, or Firm* — E. Alan Davis; James W. Huffman

(57) ABSTRACT

An instruction translator receives a conditional load/store instruction that specifies a condition, destination/data register, base register, offset source, and memory addressing mode. The instruction instructs the microprocessor to load data from a memory location into the destination register (conditional load) or store data to the memory location from the data register (conditional store) only if the condition flags satisfy the condition. The offset source specifies whether the offset is an immediate value or a value in an offset register. The addressing mode specifies whether the base register is updated when the condition flags satisfy the condition. The instruction translator translates the conditional load instruction into a number of microinstructions, which varies as a function of the offset source, addressing mode, and whether the conditional instruction is a conditional load or store instruction. An out-of-order execution pipeline executes the microinstructions to generate results specified by the instruction.

47 Claims, 27 Drawing Sheets

Related U.S. Application Data 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, and a continuation-in-part of application No. 13/413,258, filed on Mar. 6, 2012, and a continuation-in-part of application No. 13/412,888, filed on Mar. 6, 2012, now Pat. No. 9,141,389, and a continuation-in-part of application No. 13/412,904, filed on Mar. 6, 2012, and a continuation-in-part of application No. 13/412,914, filed on Mar. 6, 2012, now Pat. No. 9,146,742, and a continuation-in-part of application No. 13/413,346, filed on Mar. 6, 2012, now Pat. No. 9,043,580, and a continuation-in-part of application No. 13/413,300, filed on Mar. 6, 2012, now abandoned, and a continuation-in-part of application No. 13/413,314, filed on Mar. 6, 2012, now Pat. No. 9,176,733, said application No. 13/413,258 is a continuation-in-part of application No. 13/244,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/412,888 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/412,904 is a continuation-in-part of application No. 13/224,310, filed on Sep. 1, 2011, now Pat. No. 8,880,851, said application No. 13/412,904 is a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/412,914 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/413,346 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/413,300 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/413,314 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, said application No. 13/413,314 is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, application No. 13/413,314, which is a continuation-in-part of application No. 13/333,631, filed on Dec. 21, 2011, now Pat. No. 8,924,695, application No. 14/007,116, which is a continuation-in-part of application No. 13/224,310, filed on Sep. 1, 2011, now Pat. No. 8,880,851, and a continuation-in-part of application No. 13/333,520, filed on Dec. 21, 2011, now Pat. No. 9,032,189, and a continuation-in-part of application No. 13/333,572, filed on Dec. 21, 2011, now Pat. No. 8,880,857, and a continuation-in-part of application No. 13/333,631, filed on Dec. 21, 2011, now Pat. No. 8,924,695, and a continuation-in-part of application No. 13/413,258, filed on Mar. 6, 2012, and a continuation-in-part of application No. 13/412,888, filed on Mar. 6, 2012, now Pat. No. 9,141,389, and a continuation-in-part of application No. 13/412,904, filed on Mar. 6, 2012, and a continuation-in-part of application No. 13/412,914, filed on Mar. 6, 2012, now Pat. No. 9,146,742, and a continuation-in-part of application No. 13/413,346, filed on Mar. 6, 2012, now Pat. No. 9,043,580, and a continuation-in-part of application No. 13/413,300, filed on Mar. 6, 2012, now abandoned, and a continuation-in-part of application No. 13/413,314, filed on Mar. 6, 2012, now Pat. No. 9,176,733, and a continuation-in-part of application No. 13/416,879, filed on Mar. 9, 2012, now Pat. No. 9,128,701.

(60) Provisional application No. 61/614,893, filed on Mar. 23, 2012, provisional application No. 61/473,062, filed on Apr. 7, 2011, provisional application No. 61/473,067, filed on Apr. 7, 2011, provisional application No. 61/473,069, filed on Apr. 7, 2011, provisional application No. 61/537,473, filed on Sep. 21, 2011, provisional application No. 61/541,307, filed on Sep. 30, 2011, provisional application No. 61/547,449, filed on Oct. 14, 2011, provisional application No. 61/555,023, filed on Nov. 3, 2011, provisional application No. 61/604,561, filed on Feb. 29, 2012.

(51) Int. Cl.
*G06F 9/26* (2006.01)
*G06F 9/38* (2006.01)
*G06F 15/82* (2006.01)

Related U.S. Application Data

(52) U.S. Cl.
CPC ....... *G06F 9/30072* (2013.01); *G06F 9/30076* (2013.01); *G06F 9/30105* (2013.01); *G06F 9/30123* (2013.01); *G06F 9/30145* (2013.01); *G06F 9/30174* (2013.01); *G06F 9/30189* (2013.01); *G06F 9/30196* (2013.01); *G06F 9/3802* (2013.01); *G06F 15/82* (2013.01)

(56) References Cited

U.S. PATENT DOCUMENTS

| | | |
|---|---|---|
| 5,307,504 A | 4/1994 | Robinson et al. |
| 5,396,634 A | 3/1995 | Zaidi et al. |
| 5,438,668 A | 8/1995 | Coon et al. |
| 5,481,693 A | 1/1996 | Blomgren et al. |
| 5,574,927 A | 11/1996 | Scantlin |
| 5,619,666 A | 4/1997 | Coon et al. |
| 5,638,525 A | 6/1997 | Hammond et al. |
| 5,664,215 A | 9/1997 | Burgess et al. |
| 5,685,009 A | 11/1997 | Blomgren et al. |
| 5,745,722 A | 4/1998 | Matsumoto et al. |
| 5,752,014 A | 5/1998 | Mallick et al. |
| 5,781,457 A | 7/1998 | Cohen et al. |
| 5,781,750 A | 7/1998 | Blomgren et al. |
| 5,796,981 A | 8/1998 | Abudayyeh et al. |
| 5,832,205 A | 11/1998 | Kelly et al. |
| 5,832,297 A | 11/1998 | Ramagopal et al. |
| 5,854,913 A | 12/1998 | Goetz et al. |
| 5,887,152 A | 3/1999 | Tran |
| 5,926,642 A | 7/1999 | Favor |
| 5,926,646 A | 7/1999 | Pickett et al. |
| 5,946,483 A | 8/1999 | Boutaud et al. |
| 5,961,633 A | 10/1999 | Jaggar |
| 6,076,155 A | 6/2000 | Blomgren et al. |
| 6,178,482 B1 | 1/2001 | Sollars |
| 6,185,668 B1 | 2/2001 | Arya |
| 6,195,741 B1 | 2/2001 | Asato |
| 6,374,346 B1 | 4/2002 | Seshan et al. |
| 6,378,062 B1 | 4/2002 | Abramson et al. |
| 6,381,692 B1 | 4/2002 | Martin et al. |
| 6,442,679 B1 | 8/2002 | Klauser et al. |
| 6,496,922 B1 | 12/2002 | Borrill |
| 6,571,316 B1 | 5/2003 | D'Souza et al. |
| 6,611,909 B1 | 8/2003 | Roos et al. |
| 6,647,489 B1 | 11/2003 | Col et al. |
| 6,651,159 B1 | 11/2003 | Ramesh et al. |
| 6,654,875 B1 | 11/2003 | Hartnett et al. |
| 6,807,616 B1 | 10/2004 | McGrath et al. |
| 6,871,273 B1 | 3/2005 | Moore |
| 6,877,084 B1 | 4/2005 | Christie |
| 6,880,152 B1 | 4/2005 | Torvalds et al. |
| 6,889,312 B1 | 5/2005 | McGrath et al. |
| 6,898,697 B1 | 5/2005 | Gao et al. |
| 6,981,131 B2 | 12/2005 | Devereux |
| 7,003,652 B2 | 2/2006 | Nevill et al. |
| 7,047,394 B1 | 5/2006 | Van Dyke et al. |
| 7,051,190 B2 | 5/2006 | Samra et al. |
| 7,143,271 B2 | 11/2006 | Huang et al. |
| 7,178,011 B2 | 2/2007 | Seal et al. |
| 7,219,215 B2 | 5/2007 | Ford et al. |
| 7,237,098 B2 | 6/2007 | Henry et al. |
| 7,243,213 B2 | 7/2007 | Pagni et al. |
| 7,260,815 B1 | 8/2007 | Chen et al. |
| 7,272,622 B2 | 9/2007 | Sebot et al. |
| 7,299,343 B2 | 11/2007 | Kalluri et al. |
| 7,353,368 B2 | 4/2008 | Chow et al. |
| 7,437,532 B1 | 10/2008 | Chen et al. |
| 7,478,388 B1 | 1/2009 | Chen et al. |
| 7,617,388 B2 | 11/2009 | Kissell |
| 7,624,256 B2 | 11/2009 | Sartorius et al. |
| 7,647,480 B2 | 1/2010 | Ford et al. |
| 7,818,550 B2 | 10/2010 | Vaden |
| 7,873,814 B1 | 1/2011 | Cohen et al. |
| 7,925,868 B2 | 4/2011 | Lataille et al. |
| 8,090,931 B2 | 1/2012 | Col et al. |
| 8,479,176 B2 | 7/2013 | Ottoni et al. |
| 2001/0008563 A1 | 7/2001 | Yamaura et al. |
| 2001/0010072 A1 | 7/2001 | Yoshida |
| 2001/0032308 A1 | 10/2001 | Grochowski et al. |
| 2001/0044891 A1 | 11/2001 | McGrath et al. |
| 2002/0053013 A1 | 5/2002 | Sollars |
| 2002/0194458 A1 | 12/2002 | Soni |
| 2003/0018880 A1 | 1/2003 | Litaize et al. |
| 2003/0061471 A1 | 3/2003 | Matsuo |
| 2003/0188140 A1 | 10/2003 | Henry et al. |
| 2004/0034757 A1 | 2/2004 | Gochman et al. |
| 2004/0064684 A1 | 4/2004 | Kalluri et al. |
| 2004/0148496 A1 | 7/2004 | Thimmannagari et al. |
| 2004/0255103 A1 | 12/2004 | Duncan et al. |
| 2005/0081017 A1 | 4/2005 | Rupley, II et al. |
| 2005/0091474 A1 | 4/2005 | Wojewoda et al. |
| 2005/0125637 A1 | 6/2005 | Dijkstra et al. |
| 2005/0188185 A1 | 8/2005 | Grochowski |
| 2005/0216714 A1 | 9/2005 | Grochowski |
| 2005/0223199 A1 | 10/2005 | Grochowski et al. |
| 2006/0101247 A1 | 5/2006 | Callan et al. |
| 2006/0155974 A1 | 7/2006 | Moyer et al. |
| 2006/0179288 A1 | 8/2006 | Mellvaine et al. |
| 2006/0236078 A1 | 10/2006 | Sartorius et al. |
| 2007/0038844 A1 | 2/2007 | Valentine et al. |
| 2007/0074010 A1 | 3/2007 | Nakajima |
| 2007/0208924 A1 | 9/2007 | Ford et al. |
| 2007/0260855 A1 | 11/2007 | Gschwind et al. |
| 2008/0046704 A1 | 2/2008 | Tanaka et al. |
| 2008/0065862 A1 | 3/2008 | Hansen et al. |
| 2008/0072011 A1 | 3/2008 | Kitamura |
| 2008/0189519 A1 | 8/2008 | Gschwind et al. |
| 2008/0216073 A1 | 9/2008 | Yates et al. |
| 2008/0256336 A1 | 10/2008 | Henry et al. |
| 2008/0276069 A1 | 11/2008 | Blaner et al. |
| 2008/0276072 A1 | 11/2008 | Rychlik |
| 2009/0006811 A1 | 1/2009 | Badran-Louca et al. |
| 2009/0031116 A1 | 1/2009 | Sudhakar et al. |
| 2009/0204785 A1 | 8/2009 | Yates, Jr. et al. |
| 2009/0204800 A1 | 8/2009 | Hooker et al. |
| 2009/0228691 A1 | 9/2009 | Furuta et al. |
| 2009/0300331 A1 | 12/2009 | Gschwind et al. |
| 2010/0070741 A1 | 3/2010 | Col et al. |
| 2010/0274988 A1 | 10/2010 | Mimar |
| 2010/0287359 A1 | 11/2010 | Norden |
| 2010/0299504 A1 | 11/2010 | Henry et al. |
| 2010/0332787 A1 | 12/2010 | Grohoski et al. |
| 2011/0035569 A1 | 2/2011 | Col et al. |
| 2011/0047357 A1 | 2/2011 | Stempel et al. |
| 2011/0225397 A1 | 9/2011 | Grisenthwaite et al. |
| 2012/0124346 A1 | 5/2012 | Hardage et al. |
| 2012/0260042 A1 | 10/2012 | Henry et al. |
| 2012/0260064 A1 | 10/2012 | Henry et al. |
| 2012/0260065 A1 | 10/2012 | Henry et al. |
| 2012/0260066 A1 | 10/2012 | Henry et al. |
| 2012/0260067 A1 | 10/2012 | Henry et al. |
| 2012/0260068 A1 | 10/2012 | Henry et al. |
| 2012/0260071 A1 | 10/2012 | Henry et al. |
| 2012/0260073 A1 | 10/2012 | Henry et al. |
| 2012/0260074 A1 | 10/2012 | Henry et al. |
| 2012/0260075 A1 | 10/2012 | Henry et al. |
| 2013/0067199 A1 | 3/2013 | Henry et al. |
| 2013/0067202 A1 | 3/2013 | Henry et al. |
| 2013/0097408 A1 | 4/2013 | Seal et al. |
| 2013/0305013 A1 | 11/2013 | Ebersole |
| 2013/0305014 A1 | 11/2013 | Ebersole |
| 2014/0095847 A1 | 4/2014 | Orenstein |

FOREIGN PATENT DOCUMENTS

| | | |
|---|---|---|
| EP | 0747808 | 12/1996 |
| EP | 1050803 | 11/2000 |
| EP | 1447742 | 8/2004 |
| TW | 200912741 A | 3/2009 |
| WO | WO96/24895 A1 | 8/1996 |
| WO | WO0106354 A1 | 1/2001 |
| WO | WO02097612 A1 | 12/2002 |

(56) References Cited

FOREIGN PATENT DOCUMENTS

| WO | WO2012138950 A2 | 10/2012 |
|----|-----------------|---------|
| WO | WO2012138952 A1 | 10/2012 |
| WO | WO2012138957 A1 | 10/2012 |

OTHER PUBLICATIONS

Intel®, "IA-32 Intel® Architecture Software Developer's Manual." vol. 2A: Instruction Set Reference, A-M. Sep. 2005, p. 3-112 to 3-117.

Quinones, Eduardo et al., "Selective Predicate Prediction for Out-of-Order Processors." Jun. 28-30, 2006. Proceedings of the 20th Annual International Conference on Supercomputing, pp. 46-54.

Chuang, Weihaw, et al. "Predicate Prediction for Efficient Out-of-Order Execution." Jun. 23-26, 2003, Proceedings of the 17th Annual International Conference on Supercomputing. pp. 183-192.

ARM Limited, "ARM Architecture Reference Manual v7-A and v7-R Edition." 2008, pp. A4-22, B1-6 to B1-10.

ARM Limited, "ARM Architecture Reference Manual v7-A and v7-R Edition." 2008, pp. A1-3 to A1-6, A2-11, A2-21, A2-22, B1-9, B2-3, B2-4, B4-45 to B4-50.

Intel®, "IA-32 Intel® Architecture Software Developer's Manual." vol. 1, Sep. 2005, pp. 3-24, 3-28, vol. 3 pp. 2-16 to 2-23, 9-2 to 9-5, 10-1 to 10-4.

Sanchez et al. "Thermal Management System for High Performance PowerPC™ Microprocessors." Compcon '97, Proceedings, IEEE, Feb. 1997, pp. 325-330.

Buchty, Rainer et al. "High-Performance and Hardware-aware Computing." Proceedings of the First International Workshop on New Frontiers in High-performance and Hardware-aware Computing (HipHac'08). Lake Como, Italy, Nov. 2008. pp. 1-8.

"System/360, Model 30, 1401 Compatibility Feature." IBM Systems Reference Library. File No. S360-13, Form A24-3255-1. Revised Apr. 1964. pp. 5-12.

McCormack, M.A. et al. "1401 Compatibility Feature on the IBM System/360 Model 30." IBM Corporation, Endicott, New York. Downloaded May 11, 2011 from http://www.ibm-1401.info/ACM1401Sim.html. pp. 1-8.

Silberman, Gabriel M. et al. "An Architectural Framework for Supporting Heterogeneous Instruction-Set Architectures." IBM T.J. Watson Research Center. 8153 Computer, Jun. 26, 1993. No. 6 IEEE. XP000377627 pp. 39-56.

"Instruction Set Architectures." ARM the Architecture for the Digital World. Downloaded on Feb. 21, 2011 from http://www.arm.com/products/processors/technologies/instruction-set-architectures.php. pp. 1-2.

Bellard, Fabrice. "QEMU, a Fast and Portable Dynamic Translator." USENIX Association. FREENIX Track: 2005 USENIX Annual Technical Conference. pp. 41-46.

"Binary Translation" Wikipedia, the free encyclopedia. Downloaded on May 5, 2011 from http://en.wikipedia.org/wiki/Binary_translation. pp. 1-4.

Nakada, Takashi et al. "OROCHI: A Multiple Instruction Set SMT Processor." Taken from High-performance and Harware-aware Computing; Proceedings of the First International Workshop on New Frontiers in High-performance and Hareware-aware Computing (HipHaC'08) Nov. 2008. pp. 13-20.

Shimada, Hajime et al. "Outline of OROCHI: A Multiple Instruction Set Executab le SMT Processor." Downloaded on May 5, 2011 from http://arch.naist.jp/~shimada/pub/iwia07.pdf. pp. 1-8.

"Jazelle" Wikipedia, the free encyclopedia. Downloaded on May 30, 2011 from http://en.wikipedia.org/wiki/Jazelle. pp. 1-5.

"Concurrency (2): Advanced Operating Systems (M) Lecture 17" School of Computing Science, University of Glasgow. Downloaded on May 5, 2011 from http://csperkins.org/teaching/adv-os/Lecture17-concurrency.pdf. pp. 1-15.

"Machine Code" Wikipedia, the free encyclopedia. Downloaded on May 23, 2011 from http;//en.wikipedia.org/wiki/Machine_code. pp. 1-4.

Chen, Jiunn-Yeu et al. "On Static Binary Translation and Optimization for ARM Based Applications." Downloaded on Aug. 26, 2011 from http://www.cs.princeton.edu/~thhung/pubs/odes08.pdf pp. 1-10.

Ebcioglu, Kemal et al. "DAISY: Dynamic Compilation for 100% Architectural Compatibility." IBM Research Report. RC 20538 Computer Science Aug. 5, 1996. pp. 1-84.

"Texas Instruments OMAP" Wikipedia, the free encyclopedia. Downloaded on May 16, 2011 from http://en.wikipedia.org/wiki/Texas_Instruments_OMAP. pp. 1-4.

"Transmeta" Wikipedia, the free encyclopedia. Downloaded on May 12, 2011 from http://en.wikipedia.org/wiki/Transmeta. pp. 1-8.

Wang Hao, Lee. "ARM Instruction Set Simulation on Multi-Core x86 Hardware." School of Computer Science, The University of Adelaide. Jun. 19, 2009. pp. 1-70 Downloaded on May 5, 2011 from http://cs.adelaide.edu.au/~brad/students/wanghao.pdf.

Gochman, Simcha et al. "The Intel® Pentium® M Processor: Microarchitecture and Performance." Intel® Technology Journal. vol. 7 Issue 02 Published May 21, 2003. ISSN 1535-864X pp. 21-36.

Osdata.com "Assembly Language: address space and addressing modes." Downloaded from http://www.osdata.com/topic/language/asm/address.htm. Downloaded Dec. 7, 2009. pp. 1-11.

Tendler, J.M. et al. "Power4 System Microarchitecture." IBM J. Res. & Dev. vol. 46 No. 1, Jan. 2002. pp. 5-25.

Intel® "Intel® Itanium® Architecture Software Deverloper's Manual." vol. 2: System Architecture. Revision 2.1 Document # 245318-004. Oct. 2002. pp. 2:35, 2:86 and pp. 2:115 thru 2:130.

Karaki, Hussein et al. "Multiple Instruction Sets Architecture (MISA)." Energy Aware Computing (ICEAC), 2011 International Conference on, IEEE. Nov. 30, 2011 thru Dec. 2, 2011. Pages 1-6, XP032099542, ISBN: 978-1-4673-0466-5.

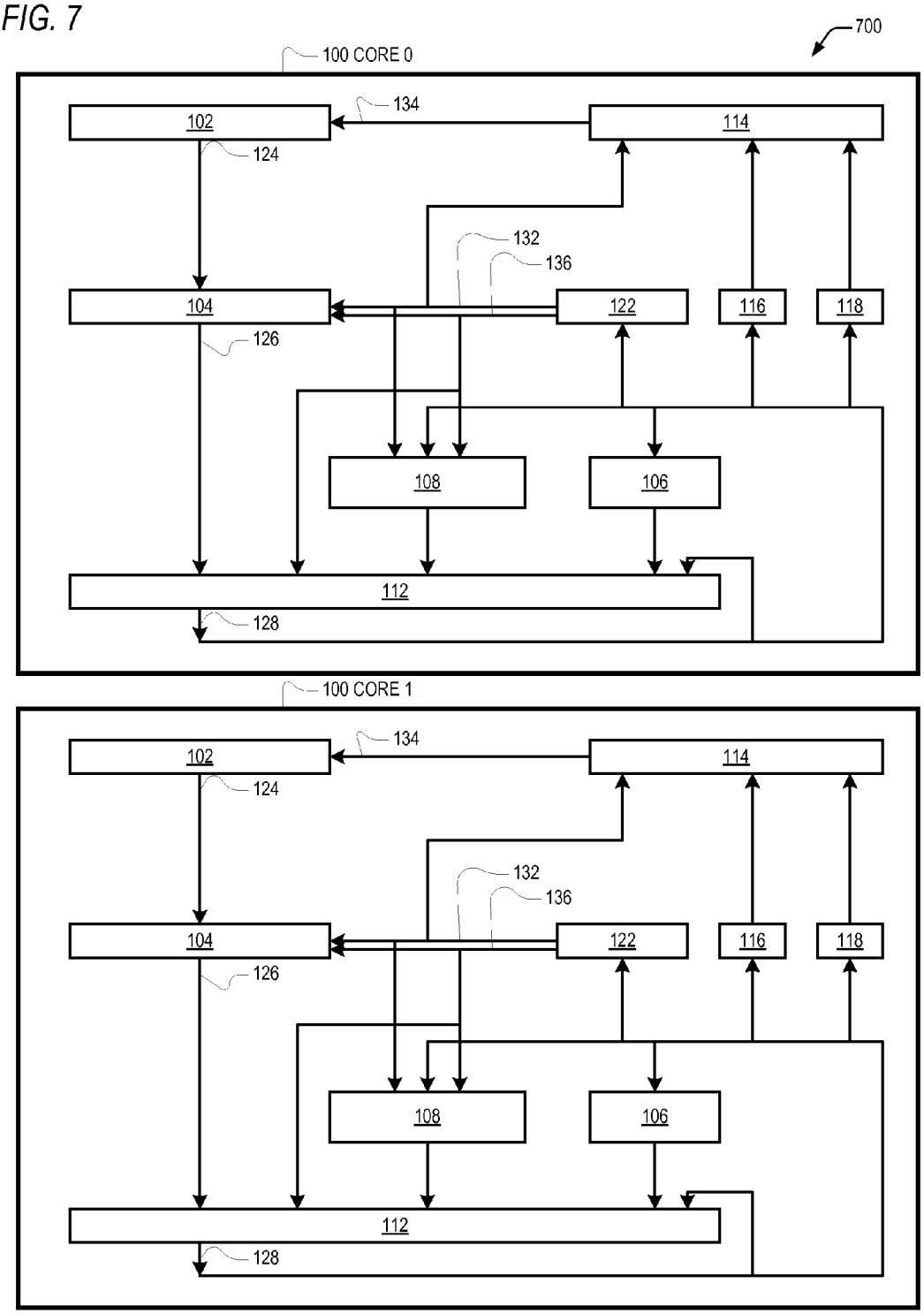

FIG. 18 (ALTERNATE EMBODIMENT)

FIG. 19 (ALTERNATE EMBODIMENT)

FIG. 20 (ALTERNATE EMBODIMENT)

MICROPROCESSOR THAT TRANSLATES CONDITIONAL LOAD/STORE INSTRUCTIONS INTO VARIABLE NUMBER OF MICROINSTRUCTIONS

CROSS REFERENCE TO RELATED APPLICATION(S)

This application is a continuation-in-part (CIP) of U.S. Non-Provisional patent application Ser. Nos.

| | |
|---|---|
| 13/224,310 (CNTR.2575) | Sep. 1, 2011 |
| 13/333,520 (CNTR.2569) | Dec. 21, 2011 |
| 13/333,572 (CNTR.2572) | Dec. 21, 2011 |
| 13/333,631 (CNTR.2618) | Dec. 21, 2011 |
| 13/413,258 (CNTR.2552) | Mar. 6, 2012 |
| 13/412,888 (CNTR.2580) | Mar. 6, 2012 |
| 13/412,904 (CNTR.2583) | Mar. 6, 2012 |
| 13/412,914 (CNTR.2585) | Mar. 6, 2012 |
| 13/413,346 (CNTR.2573) | Mar. 6, 2012 |
| 13/413,300 (CNTR.2564) | Mar. 6, 2012 |
| 13/413,314 (CNTR.2568) | Mar. 6, 2012 |
| 13/416,879 (CNTR.2556) | Mar. 9, 2012 | each of which is hereby incorporated by reference in its entirety for all purposes;

This application claims priority based on U.S. Provisional Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |
| 61/537,473 (CNTR.2569) | Sep. 21, 2011 |
| 61/541,307 (CNTR.2585) | Sep. 30, 2011 |
| 61/547,449 (CNTR.2573) | Oct. 14, 2011 |
| 61/555,023 (CNTR.2564) | Nov. 3, 2011 |
| 61/604,561 (CNTR.2552) | Feb. 29, 2012 |
| 61/614,893 (CNTR.2592) | Mar. 23, 2012 | each of which is incorporated by reference herein in its entirety for all purposes;

U.S. Non-Provisional patent application Ser. Nos.

| | |
|---|---|
| 13/224,310 (CNTR.2575) | Sep. 1, 2011 | claims priority to U.S. Provisional Patent Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 | each of which is hereby incorporated by reference in its entirety for all purposes;

Each of U.S. Non-Provisional application Ser. Nos.

| | |
|---|---|
| 13/413,258 (CNTR.2552) | Mar. 6, 2012 |
| 13/412,888 (CNTR.2580) | Mar. 6, 2012 |
| 13/412,904 (CNTR.2583) | Mar. 6, 2012 |
| 13/412,914 (CNTR.2585) | Mar. 6, 2012 |
| 13/413,346 (CNTR.2573) | Mar. 6, 2012 |
| 13/413,300 (CNTR.2564) | Mar. 6, 2012 |
| 13/413,314 (CNTR.2568) | Mar. 6, 2012 | is a continuation-in-part (CIP) of U.S. Non-Provisional patent application Ser. Nos.

| | |
|---|---|
| 13/224,310 (CNTR.2575) | Sep. 1, 2011 |
| 13/333,520 (CNTR.2569) | Dec. 21, 2011 |
| 13/333,572 (CNTR.2572) | Dec. 21, 2011 |
| 13/333,631 (CNTR.2618) | Dec. 21, 2011 | and claims priority based on U.S. Provisional Patent Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |
| 61/537,473 (CNTR.2569) | Sep. 21, 2011 |
| 61/541,307 (CNTR.2585) | Sep. 30, 2011 |
| 61/547,449 (CNTR.2573) | Oct. 14, 2011 |
| 61/555,023 (CNTR.2564) | Nov. 3, 2011 |
| 61/604,561 (CNTR.2552) | Feb. 29, 2012 | each of which is hereby incorporated by reference in its entirety for all purposes;

U.S. Non-Provisional application Ser. No.

| | |
|---|---|
| 13/416,879 (CNTR.2556) | Mar. 9, 2012 | is a continuation-in-part (CIP) of U.S. Non-Provisional patent application Ser. Nos.

| | |
|---|---|
| 13/224,310 (CNTR.2575) | Sep. 1, 2011 |
| 13/333,520 (CNTR.2569) | Dec. 21, 2011 |
| 13/333,572 (CNTR.2572) | Dec. 21, 2011 |
| 13/333,631 (CNTR.2618) | Dec. 21, 2011 |
| 13/413,258 (CNTR.2552) | Mar. 6, 2012 |
| 13/412,888 (CNTR.2580) | Mar. 6, 2012 |
| 13/412,904 (CNTR.2583) | Mar. 6, 2012 |
| 13/412,914 (CNTR.2585) | Mar. 6, 2012 |
| 13/413,346 (CNTR.2573) | Mar. 6, 2012 |
| 13/413,300 (CNTR.2564) | Mar. 6, 2012 |
| 13/413,314 (CNTR.2568) | Mar. 6, 2012 | and claims priority based on U.S. Provisional Patent Applications

| | |
|---|---|
| 61/473,062 (CNTR.2547) | Apr. 7, 2011 |
| 61/473,067 (CNTR.2552) | Apr. 7, 2011 |
| 61/473,069 (CNTR.2556) | Apr. 7, 2011 |
| 61/537,473 (CNTR.2569) | Sep. 21, 2011 |
| 61/541,307 (CNTR.2585) | Sep. 30, 2011 |
| 61/547,449 (CNTR.2573) | Oct. 14, 2011 |
| 61/555,023 (CNTR.2564) | Nov. 3, 2011 |
| 61/604,561 (CNTR.2552) | Feb. 29, 2012 | each of which is hereby incorporated by reference in its entirety for all purposes.

BACKGROUND OF THE INVENTION

The x86 processor architecture, originally developed by Intel Corporation of Santa Clara, Calif., and the Advanced RISC Machines (ARM) architecture, originally developed by ARM Ltd. of Cambridge, UK, are well known in the art of computing. Many computing systems exist that include an ARM or x86 processor, and the demand for them appears to be increasing rapidly. Presently, the demand for ARM architecture processing cores appears to dominate low power, low cost segments of the computing market, such as cell phones, PDA's, tablet PCs, network routers and hubs, and set-top boxes (for example, the main processing power of the Apple iPhone and iPad is supplied by an ARM architecture processor core), while the demand for x86 architecture processors appears to dominate market segments that require higher performance that justifies higher cost, such as in laptops, desktops and servers. However, as the performance of ARM cores increases and the power consumption and cost of certain models of x86 processors decreases, the line between the different markets is evidently fading, and the two architectures are beginning to compete head-to-head, for example in mobile computing markets such as smart cellular phones, and it is likely they will begin to compete more frequently in the laptop, desktop and server markets.

This situation may leave computing device manufacturers and consumers in a dilemma over which of the two architectures will predominate and, more specifically, for which of the two architectures software developers will develop more software. For example, some entities purchase very large amounts of computing systems each month or year. These entities are highly motivated to buy systems that are the same configuration due to the cost efficiencies associated with purchasing large quantities of the same system and the simplification of system maintenance and repair, for example. However, the user population of these large entities may have diverse computing needs for these single configuration systems. More specifically, some of the users have computing needs in which they want to run software on an ARM architecture processor, and some have computing needs in which they want to run software on an x86 architecture processor, and some may even want to run software on both. Still further, new previously-unanticipated computing needs may emerge that demand one architecture or the other. In these situations, a portion of the extremely large investment made by these large entities may have been wasted. For another example, a given user may have a crucial application that only runs on the x86 architecture so he purchases an x86 architecture system, but a version of the application is subsequently developed for the ARM architecture that is superior to the x86 version (or vice versa) and therefore the user would like to switch. Unfortunately, he has already made the investment in the architecture that he does not prefer. Still further, a given user may have invested in applications that only run on the ARM architecture, but the user would also like to take advantage of fact that applications in other areas have been developed for the x86 architecture that do not exist for the ARM architecture or that are superior to comparable software developed for the ARM architecture, or vice versa. It should be noted that although the investment made by a small entity or an individual user may not be as great as by the large entity in terms of magnitude, nevertheless in relative terms the investment wasted may be even larger. Many other similar examples of wasted investment may exist or arise in the context of a switch in dominance from the x86 architecture to the ARM architecture, or vice versa, in various computing device markets. Finally, computing device manufacturers, such as OEMs, invest large amounts of resources into developing new products. They are caught in the dilemma also and may waste some of their valuable development resources if they develop and manufacture mass quantities of a system around the x86 or ARM architecture and then the user demand changes relatively suddenly.

It would be beneficial for manufacturers and consumers of computing devices to be able to preserve their investment regardless of which of the two architectures prevails. Therefore, what is needed is a solution that would allow system manufacturers to develop computing devices that enable users to run both x86 architecture and ARM architecture programs.

The desire to have a system that is capable of running programs of more than one instruction set has long existed, primarily because customers may make a significant investment in software that runs on old hardware whose instruction set is different from that of the new hardware. For example, the IBM System/360 Model 30 included an IBM System 1401 compatibility feature to ease the pain of conversion to the higher performance and feature-enhanced System/360. The Model 30 included both a System/360 and a 1401 Read Only Storage (ROS) Control, which gave it the capability of being used in 1401 mode if the Auxiliary Storage was loaded with needed information beforehand. Furthermore, where the software was developed in a high-level language, the new hardware developer may have little or no control over the software compiled for the old hardware, and the software developer may not have a motivation to re-compile the source code for the new hardware, particularly if the software developer and the hardware developer are not the same entity. Silberman and Ebcioglu proposed techniques for improving performance of existing ("base") CISC architecture (e.g., IBM S/390) software by running it on RISC, superscalar, and Very Long Instruction Word (VLIW) architecture ("native") systems by including a native engine that executes native code and a migrant engine that executes base object code, with the ability to switch between the code types as necessary depending upon the effectiveness of translation software that translates the base object code into native code. See "An Architectural Framework for Supporting Heterogeneous Instruction-Set Architectures," Siberman and Ebcioglu, Computer, June 1993, No. 6. Van Dyke et al. disclosed a processor having an execution pipeline that executes native RISC (Tapestry) program instructions and which also translates x86 program instructions into the native RISC instructions through a combination of hardware translation and software translation, in U.S. Pat. No. 7,047,394, issued May 16, 2006. Nakada et al. proposed a heterogeneous SMT processor with an Advanced RISC Machines (ARM) architecture front-end pipeline for irregular (e.g., OS) programs and a Fujitsu FR-V (VLIW) architecture front-end pipeline for multimedia applications that feed an FR-V VLIW back-end pipeline with an added VLIW queue to hold instructions from the front-end pipelines. See "OROCHI: A Multiple Instruction Set SMT Processor," Proceedings of the First International Workshop on New Frontiers in High-performance and Hardware-aware Computing (HipHaC'08), Lake Como, Italy, November 2008 (In conjunction with MICRO-41), Buchty and Weib, eds, Universitatsverlag Karlsruhe, ISBN 978-3-86644-298-6. This approach was proposed in order to reduce the total system footprint over heterogeneous System on Chip (SOC) devices, such as the Texas Instruments OMAP that includes an ARM processor core plus one or more co-processors (such as the TMS320, various digital signal processors, or various GPUs) that do not share instruction execution resources but are instead essentially distinct processing cores integrated onto a single chip.

Software translators, also referred to as software emulators, software simulators, dynamic binary translators and the like, have also been employed to support the ability to run programs of one architecture on a processor of a different architecture. A popular commercial example is the Motorola 68K-to-PowerPC emulator that accompanied Apple Macintosh computers to permit 68K programs to run on a Macintosh with a PowerPC processor, and a PowerPC-to-x86 emulator was later developed to permit PowerPC programs to run on a Macintosh with an x86 processor. Transmeta Corporation of Santa Clara, Calif., coupled VLIW core hardware and "a pure software-based instruction translator [referred to as "Code Morphing Software"] [that] dynamically compiles or emulates x86 code sequences" to execute x86 code. "Transmeta." *Wikimedia*. 2011. Wikimedia Foundation, Inc. <http://en.wikipedia.org/wiki/Transmeta>. See also, for example, U.S. Pat. No. 5,832,205, issued Nov. 3, 1998 to Kelly et al. The IBM DAISY (Dynamically Architected Instruction Set from Yorktown) system includes a VLIW machine and dynamic binary software translation to provide 100% software compatible emulation of old architectures. DAISY includes a Virtual Machine Monitor residing in ROM that parallelizes and saves the VLIW primitives to a portion of main memory not visible to the old architecture in hopes of avoiding re-translation on subsequent instances of the same old architecture code fragments. DAISY includes fast compiler optimization algorithms to increase performance. QEMU is a machine emulator that includes a software dynamic translator. QEMU emulates a number of CPUs (e.g., x86, PowerPC, ARM and SPARC) on various hosts (e.g., x86, PowerPC, ARM, SPARC, Alpha and MIPS). As stated by its originator, the "dynamic translator performs a runtime conversion of the target CPU instructions into the host instruction set. The resulting binary code is stored in a translation cache so that it can be reused . . . . QEMU is much simpler [than other dynamic translators] because it just concatenates pieces of machine code generated off line by the GNU C Compiler." QEMU, a Fast and Portable Dynamic Translator, Fabrice Bellard, USENIX Association, FREENIX Track: 2005 USENIX Annual Technical Conference. See also, "ARM Instruction Set Simulation on Multi-Core x86 Hardware," Lee Wang Hao, thesis, University of Adelaide, Jun. 19, 2009. However, while software translator-based solutions may provide sufficient performance for a subset of computing needs, they are unlikely to provide the performance required by many users.

Static binary translation is another technique that has the potential for high performance. However, there are technical considerations (e.g., self-modifying code, indirect branches whose value is known only at run-time) and commercial/legal barriers (e.g., may require the hardware developer to develop channels for distribution of the new programs; potential license or copyright violations with the original program distributors) associated with static binary translation.

One feature of the ARM ISA is conditional instruction execution. As the ARM Architecture Reference Manual states at page A4-3:

Most ARM instructions can be conditionally executed. This means that they only have their normal effect on the programmer's model operation, memory and coprocessors if the N, Z, C and V flags in the APSR satisfy a condition specified in the instruction. If the flags do not satisfy the condition, the instruction acts as a NOP, that is, execution advances to the next instruction as normal, including any relevant checks for exceptions being taken, but has no other effect.

Benefits of the conditional execution feature are that it potentially facilitates smaller code size and may improve performance by reducing the number of branch instructions and concomitantly the performance penalties associated with mispredicting them. Therefore, what is needed is a way to efficiently perform conditional instructions, particularly in a fashion that supports high microprocessor clock rates.

BRIEF SUMMARY OF INVENTION

In one aspect the present invention provides a microprocessor. The microprocessor includes condition flags. The microprocessor also includes an instruction translator that receives a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition. The instruction translator translates the conditional load instruction into a number of microinstructions, wherein the number of microinstructions varies as a function of the offset source, addressing mode, and whether the conditional instruction is a conditional load or store instruction. The microprocessor also includes an out-of-order execution pipeline that executes the microinstructions to generate results specified by the instruction.

In another aspect, the present invention provides a method for operating a microprocessor having condition flags. The method includes receiving a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition. The method also includes translating the conditional load instruction into a number of microinstructions, wherein the number of microinstructions varies as a function of the offset source, addressing mode, and whether the conditional instruction is a conditional load or store instruction. The method also includes executing the microinstructions to generate results specified by the instruction, by an out-of-order execution pipeline.

In yet another aspect, the present invention provides a computer program product encoded in at least one computer readable storage medium for use with a computing device, the computer program product comprising computer readable program code embodied in the medium for specifying a microprocessor. The computer readable program code includes first program code for specifying condition flags. The computer readable program code also includes second program code for specifying an instruction translator, that receives a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition, wherein the instruction translator translates the conditional load instruction into a number of microinstructions, wherein the number of microinstructions varies as a function of the offset source, addressing mode, and whether the conditional instruction is a conditional load or store instruction. The computer readable program code also includes third program code for specifying an out-of-order execution pipeline, that executes the microinstructions to generate results specified by the instruction.

BRIEF DESCRIPTION OF THE DRAWINGS

FIG. 7 is a block diagram illustrating a dual-core microprocessor according to the present invention.

DETAILED DESCRIPTION OF THE INVENTION

Glossary

Figure 1:
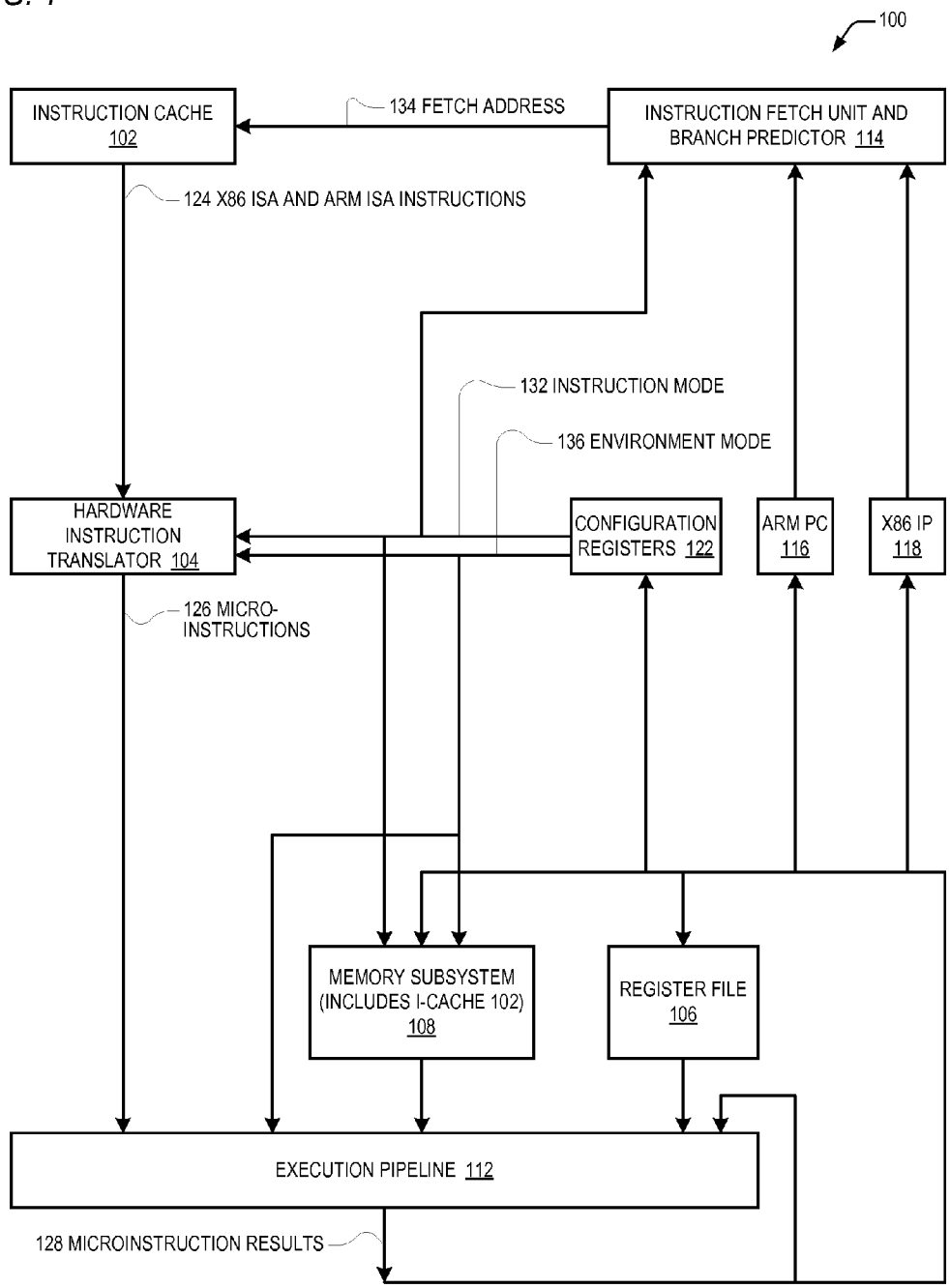
FIG. 1 is a block diagram illustrating a microprocessor that runs x86 ISA and ARM ISA machine language programs according to the present invention.

An instruction set defines the mapping of a set of binary encoded values, which are machine language instructions, to operations the microprocessor performs. (Typically, machine language programs are encoded in binary, although other number systems may be employed, for example, the machine language programs of some older IBM computers were encoded in decimal although they were ultimately represented by collections of physical signals having voltages sensed as binary values.) Illustrative examples of the types of operations machine language instructions may instruct a microprocessor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each machine language instruction must have to cause the microprocessor to perform the desired operation. It should be understood that the fact that the instruction set defines the mapping of binary values to microprocessor operations does not imply that a single binary value maps to a single microprocessor operation. More specifically, in some instruction sets, multiple binary values may map to the same microprocessor operation.

An instruction set architecture (ISA), in the context of a family of microprocessors, comprises: (1) an instruction set, (2) a set of resources (e.g., registers and modes for addressing memory) accessible by the instructions of the instruction set, and (3) a set of exceptions the microprocessor generates in response to processing the instructions of the instruction set (e.g., divide by zero, page fault, memory protection violation). Because a programmer, such as an assembler or compiler writer, who wants to generate a machine language program to run on a microprocessor family requires a definition of its ISA, the manufacturer of the microprocessor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to herein as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM ISA, ARM ISA family, ARM family or similar terms. Other examples of well-known ISA families are IBM System/360/370/390 and z/Architecture, DEC VAX, Motorola 68k, MIPS, SPARC, PowerPC, and DEC Alpha. The ISA definition covers a family of processors because over the life of the ISA processor family the manufacturer may enhance the ISA of the original processor in the family by, for example, adding new instructions to the instruction set and/or new registers to the architectural register set. To clarify by example, as the x86 ISA evolved it introduced in the Intel Pentium III processor family a set of 128-bit XMM registers as part of the SSE extensions, and x86 ISA machine language programs have been developed to utilize the XMM registers to increase performance, although x86 ISA machine language programs exist that do not utilize the XMM registers of the SSE extensions. Furthermore, other manufacturers have designed and manufactured microprocessors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel microprocessors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

A machine language program of an ISA comprises a sequence of instructions of the ISA, i.e., a sequence of binary encoded values that the ISA instruction set maps to the sequence of operations the programmer desires the program to perform. Thus, an x86 ISA machine language program comprises a sequence of x86 ISA instructions; and an ARM ISA machine language program comprises a sequence of ARM ISA instructions. The machine language program instructions reside in memory and are fetched and performed by the microprocessor.

A hardware instruction translator comprises an arrangement of transistors that receives an ISA machine language instruction (e.g., an x86 ISA or ARM ISA machine language instruction) as input and responsively outputs one or more microinstructions directly to an execution pipeline of the microprocessor. The results of the execution of the one or more microinstructions by the execution pipeline are the results defined by the ISA instruction. Thus, the collective execution of the one or more microinstructions by the execution pipeline "implements" the ISA instruction; that is, the collective execution by the execution pipeline of the implementing microinstructions output by the hardware instruction translator performs the operation specified by the ISA instruction on inputs specified by the ISA instruction to produce a result defined by the ISA instruction. Thus, the hardware instruction translator is said to "translate" the ISA instruction into the one or more implementing microinstructions. The present disclosure describes embodiments of a microprocessor that includes a hardware instruction translator that translates x86 ISA instructions and ARM ISA instructions into microinstructions. It should be understood that the hardware instruction translator is not necessarily capable of translating the entire set of instructions defined by the x86 programmer's manual nor the ARM programmer's manual but rather is capable of translating a subset of those instructions, just as the vast majority of x86 ISA and ARM ISA processors support only a subset of the instructions defined by their respective programmer's manuals. More specifically, the subset of instructions defined by the x86 programmer's manual that the hardware instruction translator translates does not necessarily correspond to any existing x86 ISA processor, and the subset of instructions defined by the ARM programmer's manual that the hardware instruction translator translates does not necessarily correspond to any existing ARM ISA processor.

An execution pipeline is a sequence of stages in which each stage includes hardware logic and a hardware register for holding the output of the hardware logic for provision to the next stage in the sequence based on a clock signal of the microprocessor. The execution pipeline may include multiple such sequences of stages, i.e., multiple pipelines. The execution pipeline receives as input microinstructions and responsively performs the operations specified by the microinstructions to output results. The hardware logic of the various pipelines performs the operations specified by the microinstructions that may include, but are not limited to, arithmetic, logical, memory load/store, compare, test, and branch resolution, and performs the operations on data in formats that may include, but are not limited to, integer, floating point, character, BCD, and packed. The execution pipeline executes the microinstructions that implement an ISA instruction (e.g., x86 and ARM) to generate the result defined by the ISA instruction. The execution pipeline is distinct from the hardware instruction translator; more specifically, the hardware instruction translator generates the implementing microinstructions and the execution pipeline executes them; furthermore, the execution pipeline does not generate the implementing microinstructions.

An instruction cache is a random access memory device within a microprocessor into which the microprocessor places instructions of an ISA machine language program (such as x86 ISA and ARM ISA machine language instructions) that were recently fetched from system memory and performed by the microprocessor in the course of running the ISA machine language program. More specifically, the ISA defines an instruction address register that holds the memory address of the next ISA instruction to be performed (defined by the x86 ISA as an instruction pointer (IP) and by the ARM ISA as a program counter (PC), for example), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP or PC), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data, i.e., that is accessed based on an instruction address register value and on a load/store address, but not exclusively based on a load/store address, is intended to be included in the definition of an instruction cache for purposes of the present disclosure. In this context, a load instruction is an instruction that reads data from memory into the microprocessor, and a store instruction is an instruction that writes data to memory from the microprocessor.

A microinstruction set is the set of instructions (microinstructions) the execution pipeline of the microprocessor can execute.

DESCRIPTION OF THE EMBODIMENTS

The present disclosure describes embodiments of a microprocessor that is capable of running both x86 ISA and ARM ISA machine language programs by hardware translating their respective x86 ISA and ARM ISA instructions into microinstructions that are directly executed by an execution pipeline of the microprocessor. The microinstructions are defined by a microinstruction set of the microarchitecture of the microprocessor distinct from both the x86 ISA and the ARM ISA. As the microprocessor embodiments described herein run x86 and ARM machine language programs, a hardware instruction translator of the microprocessor translates the x86 and ARM instructions into the microinstructions and provides them to the execution pipeline of the microprocessor that executes the microinstructions that implement the x86 and ARM instructions. Advantageously, the microprocessor potentially runs the x86 and ARM machine language programs faster than a system that employs a software translator since the implementing microinstructions are directly provided by the hardware instruction translator to the execution pipeline for execution, unlike a software translator-based system that stores the host instructions to memory before they can be executed by the execution pipeline.

Referring now to FIG. 1, a block diagram illustrating a microprocessor 100 that can run x86 ISA and ARM ISA machine language programs according to the present invention is shown. The microprocessor 100 includes an instruction cache 102; a hardware instruction translator 104 that receives x86 ISA instructions and ARM ISA instructions 124 from the instruction cache 102 and translates them into microinstructions 126; an execution pipeline 112 that receives the implementing microinstructions 126 from the hardware instruction translator 104 executes them to generate microinstruction results 128 that are forwarded back as operands to the execution pipeline 112; a register file 106 and a memory subsystem 108 that each provide operands to the execution pipeline 112 and receive the microinstruction results 128 therefrom; an instruction fetch unit and branch predictor 114 that provides a fetch address 134 to the instruction cache 102; an ARM ISA-defined program counter (PC) register 116 and an x86 ISA-defined instruction pointer (IP) register 118 that are updated by the microinstruction results 128 and whose contents are provided to the instruction fetch unit and branch predictor 114; and configuration registers 122 that provide an instruction mode indicator 132 and an environment mode indicator 136 to the hardware instruction translator 104 and the instruction fetch unit and branch predictor 114 and that are updated by the microinstruction results 128.

As the microprocessor 100 performs x86 ISA and ARM ISA machine language instructions, it fetches the instructions from system memory (not shown) into the microprocessor 100 according to the flow of the program. The microprocessor 100 caches the most recently fetched x86 ISA and ARM ISA machine language instructions in the instruction cache 102. The instruction fetch unit 114 generates a fetch address 134 from which to fetch a block of x86 ISA or ARM ISA instruction bytes from system memory. The instruction cache 102 provides to the hardware instruction translator 104 the block of x86 ISA or ARM ISA instruction bytes 124 at the fetch address 134 if it hits in the instruction cache 102; otherwise, the ISA instructions 124 are fetched from system memory. The instruction fetch unit 114 generates the fetch address 134 based on the values in the ARM PC 116 and x86 IP 118. More specifically, the instruction fetch unit 114 maintains a fetch address in a fetch address register. Each time the instruction fetch unit 114 fetches a new block of ISA instruction bytes, it updates the fetch address by the size of the block and continues sequentially in this fashion until a control flow event occurs. The control flow events include the generation of an exception, the prediction by the branch predictor 114 that a taken branch was present in the fetched block, and an update by the execution pipeline 112 to the ARM PC 116 and x86 IP 118 in response to a taken executed branch instruction that was not predicted taken by the branch predictor 114. In response to a control flow event, the instruction fetch unit 114 updates the fetch address to the exception handler address, predicted target address, or executed target address, respectively. An embodiment is contemplated in which the instruction cache 102 is a unified cache in that it caches both ISA instructions 124 and data. It is noted that in the unified cache embodiments, although the unified cache may be accessed based on a load/store address to read/write data, when the microprocessor 100 fetches ISA instructions 124 from the unified cache, the unified cache is accessed based on the ARM PC 116 and x86 IP 118 values rather than a load/store address. The instruction cache 102 is a random access memory (RAM) device.

The instruction mode indicator 132 is state that indicates whether the microprocessor 100 is currently fetching, formatting/decoding, and translating x86 ISA or ARM ISA instructions 124 into microinstructions 126. Additionally, the execution pipeline 112 and memory subsystem 108 receive the instruction mode indicator 132 which affects the manner of executing the implementing microinstructions 126, albeit for a relatively small subset of the microinstruction set. The x86 IP register 118 holds the memory address of the next x86 ISA instruction 124 to be performed, and the ARM PC register 116 holds the memory address of the next ARM ISA instruction 124 to be performed. To control the flow of the program, the microprocessor 100 updates the x86 IP register 118 and ARM PC register 116 as the microprocessor 100 performs the x86 and ARM machine language programs, respectively, either to the next sequential instruction or to the target address of a branch instruction or to an exception handler address. As the microprocessor 100 performs instructions of x86 ISA and ARM ISA machine language programs, it fetches the ISA instructions of the machine language programs from system memory and places them into the instruction cache 102 replacing less recently fetched and performed instructions. The fetch unit 114 generates the fetch address 134 based on the x86 IP register 118 or ARM PC register 116 value, depending upon whether the instruction mode indicator 132 indicates the microprocessor 100 is currently fetching ISA instructions 124 in x86 or ARM mode. In one embodiment, the x86 IP register 118 and the ARM PC register 116 are implemented as a shared hardware instruction address register that provides its contents to the instruction fetch unit and branch predictor 114 and that is updated by the execution pipeline 112 according to x86 or ARM semantics based on whether the instruction mode indicator 132 indicates x86 or ARM, respectively.

The environment mode indicator 136 is state that indicates whether the microprocessor 100 is to apply x86 ISA or ARM ISA semantics to various execution environment aspects of the microprocessor 100 operation, such as virtual memory, exceptions, cache control, and global execution-time protection. Thus, the instruction mode indicator 132 and environment mode indicator 136 together create multiple modes of execution. In a first mode in which the instruction mode indicator 132 and environment mode indicator 136 both indicate x86 ISA, the microprocessor 100 operates as a normal x86 ISA processor. In a second mode in which the instruction mode indicator 132 and environment mode indicator 136 both indicate ARM ISA, the microprocessor 100 operates as a normal ARM ISA processor. A third mode, in which the instruction mode indicator 132 indicates x86 ISA but the environment mode indicator 136 indicates ARM ISA, may advantageously be used to perform user mode x86 machine language programs under the control of an ARM operating system or hypervisor, for example; conversely, a fourth mode, in which the instruction mode indicator 132 indicates ARM ISA but the environment mode indicator 136 indicates x86 ISA, may advantageously be used to perform user mode ARM machine language programs under the control of an x86 operating system or hypervisor, for example. The instruction mode indicator 132 and environment mode indicator 136 values are initially determined at reset. In one embodiment, the initial values are encoded as microcode constants but may be modified by a blown configuration fuse and/or microcode patch. In another embodiment, the initial values are provided by an external input to the microprocessor 100. In one embodiment, the environment mode indicator 136 may only be changed after reset by a reset-to-ARM 124 or reset-to-x86 instruction 124 (described below with respect to FIG. 6); that is, the environment mode indicator 136 may not be changed during normal operation of the microprocessor 100 without resetting the microprocessor 100, either by a normal reset or by a reset-to-x86 or reset-to-ARM instruction 124.

The hardware instruction translator 104 receives as input the x86 ISA and ARM ISA machine language instructions 124 and in response to each provides as output one or more microinstructions 126 that implement the x86 or ARM ISA instruction 124. The collective execution of the one or more implementing microinstructions 126 by the execution pipeline 112 implements the x86 or ARM ISA instruction 124. That is, the collective execution performs the operation specified by the x86 or ARM ISA instruction 124 on inputs specified by the x86 or ARM ISA instruction 124 to produce a result defined by the x86 or ARM ISA instruction 124. Thus, the hardware instruction translator 104 translates the x86 or ARM ISA instruction 124 into the one or more implementing microinstructions 126. The hardware instruction translator 104 comprises a collection of transistors arranged in a predetermined manner to translate the x86 ISA and ARM ISA machine language instructions 124 into the implementing microinstructions 126. The hardware instruction translator 104 comprises Boolean logic gates (e.g., of simple instruction translator 204 of FIG. 2) that generate the implementing microinstructions 126. In one embodiment, the hardware instruction translator 104 also comprises a microcode ROM (e.g., element 234 of the complex instruction translator 206 of FIG. 2) that the hardware instruction translator 104 employs to generate implementing microinstructions 126 for complex ISA instructions 124, as described in more detail with respect to FIG. 2. Preferably, the hardware instruction translator 104 is not necessarily capable of translating the entire set of ISA instructions 124 defined by the x86 programmer's manual nor the ARM programmer's manual but rather is capable of translating a subset of those instructions. More specifically, the subset of ISA instructions 124 defined by the x86 programmer's manual that the hardware instruction translator 104 translates does not necessarily correspond to any existing x86 ISA processor developed by Intel, and the subset of ISA instructions 124 defined by the ARM programmer's manual that the hardware instruction translator 104 translates does not necessarily correspond to any existing ISA processor developed by ARM Ltd. The one or more implementing microinstructions 126 that implement an x86 or ARM ISA instruction 124 may be provided to the execution pipeline 112 by the hardware instruction translator 104 all at once or as a sequence. Advantageously, the hardware instruction translator 104 provides the implementing microinstructions 126 directly to the execution pipeline 112 for execution without requiring them to be stored to memory in between. In the embodiment of the microprocessor 100 of FIG. 1, as the microprocessor 100 runs an x86 or ARM machine language program, each time the microprocessor 100 performs an x86 or ARM instruction 124, the hardware instruction translator 104 translates the x86 or ARM machine language instruction 124 into the implementing one or more microinstructions 126. However, the embodiment of FIG. 8 employs a microinstruction cache to potentially avoid re-translation each time the microprocessor 100 performs an x86 or ARM ISA instruction 124. Embodiments of the hardware instruction translator 104 are described in more detail with respect to FIG. 2.

The execution pipeline 112 executes the implementing microinstructions 126 provided by the hardware instruction translator 104. Broadly speaking, the execution pipeline 112 is a general purpose high-speed microinstruction processor, and other portions of the microprocessor 100, such as the hardware instruction translator 104, perform the bulk of the x86/ARM-specific functions, although functions performed by the execution pipeline 112 with x86/ARM-specific knowledge are discussed herein. In one embodiment, the execution pipeline 112 performs register renaming, superscalar issue, and out-of-order execution of the implementing microinstructions 126 received from the hardware instruction translator 104. The execution pipeline 112 is described in more detail with respect to FIG. 4.

The microarchitecture of the microprocessor 100 includes: (1) the microinstruction set; (2) a set of resources accessible by the microinstructions 126 of the microinstruction set, which is a superset of the x86 ISA and ARM ISA resources; and (3) a set of micro-exceptions the microprocessor 100 is defined to generate in response to executing the microinstructions 126, which is a superset of the x86 ISA and ARM ISA exceptions. The microarchitecture is distinct from the x86 ISA and the ARM ISA. More specifically, the microinstruction set is distinct from the x86 ISA and ARM ISA instruction sets in several aspects. First, there is not a one-to-one correspondence between the set of operations that the microinstructions of the microinstruction set may instruct the execution pipeline 112 to perform and the set of operations that the instructions of the x86 ISA and ARM ISA instruction sets may instruct the microprocessor to perform. Although many of the operations may be the same, there may be some operations specifiable by the microinstruction set that are not specifiable by the x86 ISA and/or the ARM ISA instruction sets; conversely, there may be some operations specifiable by the x86 ISA and/or the ARM ISA instruction sets that are not specifiable by the microinstruction set. Second, the microinstructions of the microinstruction set are encoded in a distinct manner from the manner in which the instructions of the x86 ISA and ARM ISA instruction sets are encoded. That is, although many of the same operations (e.g., add, shift, load, return) are specifiable by both the microinstruction set and the x86 ISA and ARM ISA instruction sets, there is not a one-to-one correspondence between the binary opcode value-to-operation mappings of the microinstruction set and the x86 or ARM ISA instruction sets. If there are binary opcode value-to-operation mappings that are the same in the microinstruction set and the x86 or ARM ISA instruction set, they are, generally speaking, by coincidence, and there is nevertheless not a one-to-one correspondence between them. Third, the fields of the microinstructions of the microinstruction set do not have a one-to-one correspondence with the fields of the instructions of the x86 or ARM ISA instruction set.

The microprocessor 100, taken as a whole, can perform x86 ISA and ARM ISA machine language program instructions. However, the execution pipeline 112 cannot execute x86 or ARM ISA machine language instructions themselves; rather, the execution pipeline 112 executes the implementing microinstructions 126 of the microinstruction set of the microarchitecture of the microprocessor 100 into which the x86 ISA and ARM ISA instructions are translated. However, although the microarchitecture is distinct from the x86 ISA and the ARM ISA, alternate embodiments are contemplated in which the microinstruction set and other microarchitecture-specific resources are exposed to the user; that is, in the alternate embodiments the microarchitecture may effectively be a third ISA, in addition to the x86 ISA and ARM ISA, whose machine language programs the microprocessor 100 can perform.

Table 1 below describes some of the fields of a microinstruction 126 of the microinstruction set according to one embodiment of the microprocessor 100.

TABLE 1

| Field | Description |
| --- | --- |
| opcode | operation to be performed (see instruction list below) |
| destination | specifies destination register of microinstruction result |
| source 1 | specifies source of first input operand (e.g., general purpose register, floating point register, microarchitecture-specific register, condition flags register, immediate, displacement, useful constants, the next sequential instruction pointer value) |
| source 2 | specifies source of second input operand |
| source 3 | specifies source of third input operand (cannot be GPR or FPR) |
| condition code | condition upon which the operation will be performed if satisfied and not performed if not satisfied |
| operand size | encoded number of bytes of operands used by this microinstruction |
| address size | encoded number of bytes of address generated by this microinstruction |
| top of x87 FP register stack | needed for x87-style floating point instructions |

Table 2 below describes some of the microinstructions in the microinstruction set according to one embodiment of the microprocessor 100.

TABLE 2

| Instruction | Description |
| --- | --- |
| ALU type | e.g., add, subtract, rotate, shift, Boolean, multiply, divide, floating-point ALU, media-type ALU (e.g., packed operations) |
| load/store | load from memory into register/store to memory from register |
| conditional jump | jump to target address if condition is satisfied, e.g., zero, greater than, not equal; may specify either ISA flags or microarchitecture-specific (i.e., non-ISA visible) condition flags |
| move | move value from source register to destination register |
| conditional move | move value from source register to destination register if condition is satisfied |
| move to control register | move value from general purpose register to control register |

TABLE 2-continued

| Instruction | Description |
| --- | --- |
| move from control register | move value to general purpose register from control register |
| gprefetch | guaranteed cache line prefetch instruction (i.e., not a hint, always prefetches, unless certain exception conditions) |
| grabline | performs zero beat read-invalidate cycle on processor bus to obtain exclusive ownership of cache line without reading data from system memory (since it is known the entire cache line will be written) |
| load pram | load from PRAM (private microarchitecture-specific RAM, i.e., not visible to ISA, described more below) into register |
| store pram | store to PRAM |
| jump condition on/off | jump to target address if "static" condition is satisfied (within relevant timeframe, programmer guarantees there are no older, unretired microinstructions that may change the "static" condition); faster because resolved by complex instruction translator rather than execution pipeline |
| call | call subroutine |
| return | return from subroutine |
| set bit on/off | set/clear bit in register |
| copy bit | copy bit value from source register to destination register |
| branch to next sequential instruction pointer | branch to next sequential x86 or ARM ISA instruction after the x86 or ARM ISA instruction from which this microinstruction was translated |
| fence | wait until all microinstructions have drained from the execution pipeline to execute the microinstruction that comes after this microinstruction |
| indirect jump | unconditional jump through a register value |

The microprocessor 100 also includes some microarchitecture-specific resources, such as microarchitecture-specific general purpose registers, media registers, and segment registers (e.g., used for register renaming or by microcode) and control registers that are not visible by the x86 or ARM ISA, and a private RAM (PRAM) described more below. Additionally, the microarchitecture can generate exceptions, referred to as micro-exceptions, that are not specified by and are not seen by the x86 or ARM ISA. It should be understood that the fields listed in Table 1, the microinstructions listed in Table 2, and the microarchitecture-specific resources and microarchitecture-specific exceptions just listed are merely given as examples to illustrate the microarchitecture and are by no means exhaustive.

The register file 106 includes hardware registers used by the microinstructions 126 to hold source and/or destination operands. The execution pipeline 112 writes its results 128 to the register file 106 and receives operands for the microinstructions 126 from the register file 106. The hardware registers instantiate the x86 ISA-defined and ARM ISA-defined registers. In one embodiment, many of the general purpose registers defined by the x86 ISA and the ARM ISA share some instances of registers of the register file 106. For example, in one embodiment, the register file 106 instantiates fifteen 32-bit registers that are shared by the ARM ISA registers R0 through R14 and the x86 ISA EAX through R14D registers. Thus, for example, if a first microinstruction 126 writes a value to the ARM R2 register, then a subsequent second microinstruction 126 that reads the x86 ECX register will receive the same value written by the first microinstruction 126, and vice versa. This advantageously enables x86 ISA and ARM ISA machine language programs to communicate quickly through registers. For example, assume an ARM machine language program running under an ARM machine language operating system effects a change in the instruction mode 132 to x86 ISA and control transfer to an x86 machine language routine to perform a function, which may be advantageous because the x86 ISA may support certain instructions that can perform a particular operation faster than in the ARM ISA. The ARM program can provide needed data to the x86 routine in shared registers of the register file 106. Conversely, the x86 routine can provide the results in shared registers of the register file 106 that will be visible to the ARM program upon return to it by the x86 routine. Similarly, an x86 machine language program running under an x86 machine language operating system may effect a change in the instruction mode 132 to ARM ISA and control transfer to an ARM machine language routine; the x86 program can provide needed data to the ARM routine in shared registers of the register file 106, and the ARM routine can provide the results in shared registers of the register file 106 that will be visible to the x86 program upon return to it by the ARM routine. A sixteenth 32-bit register that instantiates the x86 R15D register is not shared by the ARM R15 register since ARM R15 is the ARM PC register 116, which is separately instantiated. Additionally, in one embodiment, the thirty-two 32-bit ARM VFPv3 floating-point registers share 32-bit portions of the x86 sixteen 128-bit XMM0 through XMM15 registers and the sixteen 128-bit Advanced SIMD ("Neon") registers. The register file 106 also instantiates flag registers (namely the x86 EFLAGS register and ARM condition flags register), and the various control and status registers defined by the x86 ISA and ARM ISA. The architectural control and status registers include x86 architectural model specific registers (MSRs) and ARM-reserved coprocessor (8-15) registers. The register file 106 also instantiates non-architectural registers, such as non-architectural general purpose registers used in register renaming and used by microcode 234, as well as non-architectural x86 MSRs and implementation-defined, or vendor-specific, ARM coprocessor registers. The register file 106 is described further with respect to FIG. 5.

The memory subsystem 108 includes a cache memory hierarchy of cache memories (in one embodiment, a level-1 instruction cache 102, level-1 data cache, and unified level-2 cache). The memory subsystem 108 also includes various memory request queues, e.g., load, store, fill, snoop, write-combine buffer. The memory subsystem 108 also includes a memory management unit (MMU) that includes translation lookaside buffers (TLBs), preferably separate instruction and data TLBs. The memory subsystem 108 also includes a table walk engine for obtaining virtual to physical address translations in response to a TLB miss. Although shown separately in FIG. 1, the instruction cache 102 is logically part of the memory subsystem 108. The memory subsystem 108 is configured such that the x86 and ARM machine language programs share a common memory space, which advantageously enables x86 and ARM machine language programs to communicate easily through memory.

The memory subsystem 108 is aware of the instruction mode 132 and environment mode 136 which enables it to perform various operations in the appropriate ISA context. For example, the memory subsystem 108 performs certain memory access violation checks (e.g., limit violation checks) based on whether the instruction mode indicator 132 indicates x86 or ARM ISA. For another example, in response to a change of the environment mode indicator 136, the memory subsystem 108 flushes the TLBs; however, the memory subsystem 108 does not flush the TLBs in response to a change of the instruction mode indicator 132, thereby enabling better performance in the third and fourth modes described above in which one of the instruction mode indicator 132 and environment mode indicator 136 indicates x86 and the other indicates ARM. For another example, in response to a TLB miss, the table walk engine performs a page table walk to populate the TLB using either x86 page tables or ARM page tables depending upon whether the environment mode indicator 136 indicates x86 ISA or ARM ISA. For another example, the memory subsystem 108 examines the architectural state of the appropriate x86 ISA control registers that affect the cache policies (e.g., CR0 CD and NW bits) if the state indicator 136 indicates x86 ISA and examines the architectural state of the appropriate ARM ISA control registers (e.g., SCTLR I and C bits) if the environment mode indicator 136 indicates ARM ISA. For another example, the memory subsystem 108 examines the architectural state of the appropriate x86 ISA control registers that affect the memory management (e.g., CR0 PG bit) if the state indicator 136 indicates x86 ISA and examines the architectural state of the appropriate ARM ISA control registers (e.g., SCTLR M bit) if the environment mode indicator 136 indicates ARM ISA. For another example, the memory subsystem 108 examines the architectural state of the appropriate x86 ISA control registers that affect the alignment checking (e.g., CR0 AM bit) if the state indicator 136 indicates x86 ISA and examines the architectural state of the appropriate ARM ISA control registers (e.g., SCTLR A bit) if the environment mode indicator 136 indicates ARM ISA. For another example, the memory subsystem 108 (as well as the hardware instruction translator 104 for privileged instructions) examines the architectural state of the appropriate x86 ISA control registers that specify the current privilege level (CPL) if the state indicator 136 indicates x86 ISA and examines the architectural state of the appropriate ARM ISA control registers that indicate user or privileged mode if the environment mode indicator 136 indicates ARM ISA. However, in one embodiment, the x86 ISA and ARM ISA share control bits/registers of the microprocessor 100 that have analogous function, rather than the microprocessor 100 instantiating separate control bits/registers for each ISA.

Although shown separately, the configuration registers 122 may be considered part of the register file 106. The configuration registers 122 include a global configuration register that controls operation of the microprocessor 100 in various aspects regarding the x86 ISA and ARM ISA, such as the ability to enable or disable various features. The global configuration register may be used to disable the ability of the microprocessor 100 to perform ARM ISA machine language programs, i.e., to make the microprocessor 100 an x86-only microprocessor 100, including disabling other relevant ARM-specific capabilities such as the launch-x86 and reset-to-x86 instructions 124 and implementation-defined coprocessor registers described herein. The global configuration register may also be used to disable the ability of the microprocessor 100 to perform x86 ISA machine language programs, i.e., to make the microprocessor 100 an ARM-only microprocessor 100, and to disable other relevant capabilities such as the launch-ARM and reset-to-ARM instructions 124 and new non-architectural MSRs described herein. In one embodiment, the microprocessor 100 is manufactured initially with default configuration settings, such as hardcoded values in the microcode 234, which the microcode 234 uses at initialization time to configure the microprocessor 100, namely to write the configuration registers 122. However, some configuration registers 122 are set by hardware rather than by microcode 234. Furthermore, the microprocessor 100 includes fuses, readable by the microcode 234, which may be blown to modify the default configuration values. In one embodiment, microcode 234 reads the fuses and performs an exclusive-OR operation with the default value and the fuse value and uses the result to write to the configuration registers 122. Still further, the modifying effect of the fuses may be reversed by a microcode 234 patch. The global configuration register may also be used, assuming the microprocessor 100 is configured to perform both x86 and ARM programs, to determine whether the microprocessor 100 (or a particular core 100 in a multi-core part, as described with respect to FIG. 7) will boot as an x86 or ARM microprocessor when reset, or in response to an x86-style INIT, as described in more detail below with respect to FIG. 6. The global configuration register also includes bits that provide initial default values for certain architectural control registers, for example, the ARM ISA SCTLT and CPACR registers. In a multi-core embodiment, such as described with respect to FIG. 7, there exists a single global configuration register, although each core is individually configurable, for example, to boot as either an x86 or ARM core, i.e., with the instruction mode indicator 132 and environment mode indicator 136 both set to x86 or ARM, respectively; furthermore, the launch-ARM instruction 126 and launch-x86 instruction 126 may be used to dynamically switch between the x86 and ARM instruction modes 132. In one embodiment, the global configuration register is readable via an x86 RDMSR instruction to a new non-architectural MSR and a portion of the control bits therein are writeable via an x86 WRMSR instruction to the new non-architectural MSR, and the global configuration register is readable via an ARM MRC/MRRC instruction to an ARM coprocessor register mapped to the new non-architectural MSR and the portion of the control bits therein are writeable via an ARM MCR/MCRR instruction to the ARM coprocessor register mapped to the new non-architectural MSR.

The configuration registers 122 also include various control registers that control operation of the microprocessor 100 in various aspects that are non-x86/ARM-specific, also referred to herein as global control registers, non-ISA control registers, non-x86/ARM control registers, generic control registers, and similar terms. In one embodiment, these control registers are accessible via both x86 RDMSR/WRMSR instructions to non-architectural MSRs and ARM MCR/MRC (or MCRR/MRRC) instructions to new implementation-defined coprocessor registers. For example, the microprocessor 100 includes non-x86/ARM-specific control registers that determine fine-grained cache control, i.e., finer-grained than provided by the x86 ISA and ARM ISA control registers.

In one embodiment, the microprocessor 100 provides ARM ISA machine language programs access to the x86 ISA MSRs via implementation-defined ARM ISA coprocessor registers that are mapped directly to the corresponding x86 MSRs. The MSR address is specified in the ARM ISA R1 register. The data is read from or written to the ARM ISA register specified by the MRC/MRRC/MCR/MCRR instruction. In one embodiment, a subset of the MSRs are password protected, i.e., the instruction attempting to access the MSR must provide a password; in this embodiment, the password is specified in the ARM R7:R6 registers. If the access would cause an x86 general protection fault, the microprocessor 100 causes an ARM ISA UND exception. In one embodiment, ARM coprocessor 4 (address: 0, 7, 15, 0) is used to access the corresponding x86 MSRs.

The microprocessor 100 also includes an interrupt controller (not shown) coupled to the execution pipeline 112. In one embodiment, the interrupt controller is an x86-style advanced programmable interrupt controller (APIC) that maps x86 ISA interrupts into ARM ISA interrupts. In one embodiment, the x86 INTR maps to an ARM IRQ Interrupt; the x86 NMI maps to an ARM IRQ Interrupt; the x86 INIT causes an INIT-reset sequence from which the microprocessor 100 started in whichever ISA (x86 or ARM) it originally started out of a hardware reset; the x86 SMI maps to an ARM FIQ Interrupt; and the x86 STPCLK, A20, Thermal, PREQ, and Rebranch are not mapped to ARM interrupts. ARM machine language programs are enabled to access the APIC functions via new implementation-defined ARM coprocessor registers. In one embodiment, the APIC register address is specified in the ARM R0 register, and the APIC register addresses are the same as the x86 addresses. In one embodiment, ARM coprocessor 6 (address: 0, 7, nn, 0, where nn is 15 for accessing the APIC, and 12-14 for accessing the bus interface unit to perform 8-bit, 16-bit, and 32-bit IN/OUT cycles on the processor bus) is used for privileged mode functions typically employed by operating systems. The microprocessor 100 also includes a bus interface unit (not shown), coupled to the memory subsystem 108 and execution pipeline 112, for interfacing the microprocessor 100 to a processor bus. In one embodiment, the processor bus is conformant with one of the various Intel Pentium family microprocessor buses. ARM machine language programs are enabled to access the bus interface unit functions via new implementation-defined ARM coprocessor registers in order to generate I/O cycles on the processor bus, i.e., IN and OUT bus transfers to a specified address in I/O space, which are needed to communicate with a chipset of a system, e.g., to generate an SMI acknowledgement special cycle, or I/O cycles associated with C-state transitions. In one embodiment, the I/O address is specified in the ARM R0 register. In one embodiment, the microprocessor 100 also includes power management capabilities, such as the well-known P-state and C-state management. ARM machine language programs are enabled to perform power management via new implementation-defined ARM coprocessor registers. In one embodiment, the microprocessor 100 also includes an encryption unit (not shown) in the execution pipeline 112. In one embodiment, the encryption unit is substantially similar to the encryption unit of VIA microprocessors that include the Padlock capability. ARM machine language programs are enabled to access the encryption unit functions, such as encryption instructions, via new implementation-defined ARM coprocessor registers. In one embodiment ARM coprocessor 5 is used for user mode functions typically employed by user mode application programs, such as those that may use the encryption unit feature.

As the microprocessor 100 runs x86 ISA and ARM ISA machine language programs, the hardware instruction translator 104 performs the hardware translation each time the microprocessor 100 performs an x86 or ARM ISA instruction 124. It is noted that, in contrast, a software translator-based system may be able to improve its performance by re-using a translation in many cases rather than re-translating a previously translated machine language instruction. Furthermore, the embodiment of FIG. 8 employs a microinstruction cache to potentially avoid re-translation each time the microprocessor 100 performs an x86 or ARM ISA instruction 124. Each approach may have performance advantages depending upon the program characteristics and the particular circumstances in which the program is run.

The branch predictor 114 caches history information about previously performed both x86 and ARM branch instructions. The branch predictor 114 predicts the presence and target address of both x86 and ARM branch instructions 124 within a cache line as it is fetched from the instruction cache 102 based on the cached history. In one embodiment, the cached history includes the memory address of the branch instruction 124, the branch target address, a direction (taken/not taken) indicator, type of branch instruction, start byte within the cache line of the branch instruction, and an indicator of whether the instruction wraps across multiple cache lines. In one embodiment, the branch predictor 114 is enhanced to predict the direction of ARM ISA conditional non-branch instructions, as described in U.S. Provisional Application No. 61/473,067, filed Apr. 7, 2011, entitled APPARATUS AND METHOD FOR USING BRANCH PREDICTION TO EFFICIENTLY EXECUTE CONDITIONAL NON-BRANCH INSTRUCTIONS. In one embodiment, the hardware instruction translator 104 also includes a static branch predictor that predicts a direction and branch target address for both x86 and ARM branch instructions based on the opcode, condition code type, backward/forward, and so forth.

Various embodiments are contemplated that implement different combinations of features defined by the x86 ISA and ARM ISA. For example, in one embodiment, the microprocessor 100 implements the ARM, Thumb, ThumbEE, and Jazelle instruction set states, but provides a trivial implementation of the Jazelle extension; and implements the following instruction set extensions: Thumb-2, VFPv3-D32, Advanced SIMD ("Neon"), multiprocessing, and VMSA; and does not implement the following extensions: security extensions, fast context switch extension, ARM debug features (however, x86 debug functions are accessible by ARM programs via ARM MCR/MRC instructions to new implementation-defined coprocessor registers), performance monitoring counters (however, x86 performance counters are accessible by ARM programs via the new implementation-defined coprocessor registers). For another example, in one embodiment, the microprocessor 100 treats the ARM SETEND instruction as a NOP and only supports the Little-endian data format. For another example, in one embodiment, the microprocessor 100 does not implement the x86 SSE 4.2 capabilities.

Embodiments are contemplated in which the microprocessor 100 is an enhancement of a commercially available microprocessor, namely a VIA Nano™ Processor manufactured by VIA Technologies, Inc., of Taipei, Taiwan, which is capable of running x86 ISA machine language programs but not ARM ISA machine language programs. The Nano microprocessor includes a high performance register-renaming, superscalar instruction issue, out-of-order execution pipeline and a hardware translator that translates x86 ISA instructions into microinstructions for execution by the execution pipeline. The Nano hardware instruction translator may be substantially enhanced as described herein to translate ARM ISA machine language instructions, in addition to x86 machine language instructions, into the microinstructions executable by the execution pipeline. The enhancements to the hardware instruction translator may include enhancements to both the simple instruction translator and to the complex instruction translator, including the microcode. Additionally, new microinstructions may be added to the microinstruction set to support the translation of ARM ISA machine language instructions into the microinstructions, and the execution pipeline may be enhanced to execute the new microinstructions. Furthermore, the Nano register file and memory subsystem may be substantially enhanced as described herein to support the ARM ISA, including sharing of certain registers. The branch prediction units may also be enhanced as described herein to accommodate ARM branch instruction prediction in addition to x86 branches. Advantageously, a relatively modest amount of modification is required to the execution pipeline of the Nano microprocessor to accommodate the ARM ISA instructions since it is already largely ISA-agnostic. Enhancements to the execution pipeline may include the manner in which condition code flags are generated and used, the semantics used to update and report the instruction pointer register, the access privilege protection method, and various memory management-related functions, such as access violation checks, paging and TLB use, and cache policies, which are listed only as illustrative examples, and some of which are described more below. Finally, as mentioned above, various features defined in the x86 ISA and ARM ISA may not be supported in the Nano-enhancement embodiments, such as x86 SSE 4.2 and ARM security extensions, fast context switch extension, debug, and performance counter features, which are listed only as illustrative examples, and some of which are described more below. The enhancement of the Nano processor to support running ARM ISA machine language programs is an example of an embodiment that makes synergistic use of design, testing, and manufacturing resources to potentially bring to market in a timely fashion a single integrated circuit design that can run both x86 and ARM machine language programs, which represent the vast majority of existing machine language programs. In particular, embodiments of the microprocessor 100 design described herein may be configured as an x86 microprocessor, an ARM microprocessor, or a microprocessor that can concurrently run both x86 ISA and ARM ISA machine language programs. The ability to concurrently run both x86 ISA and ARM ISA machine language programs may be achieved through dynamic switching between the x86 and ARM instruction modes 132 on a single microprocessor 100 (or core 100—see FIG. 7), through configuring one or more cores 100 in a multi-core microprocessor 100 (as described with respect to FIG. 7) as an ARM core and one or more cores as an x86 core, or through a combination of the two, i.e., dynamic switching between the x86 and ARM instruction modes 132 on each of the multiple cores 100. Furthermore, historically, ARM ISA cores have been designed as intellectual property cores to be incorporated into applications by various third-party vendors, such as SOC and/or embedded applications. Therefore, the ARM ISA does not specify a standardized processor bus to interface the ARM core to the rest of the system, such as a chipset or other peripheral devices. Advantageously, the Nano processor already includes a high speed x86-style processor bus interface to memory and peripherals and a memory coherency structure that may be employed synergistically by the microprocessor 100 to support running ARM ISA machine language programs in an x86 PC-style system environment.

Figure 2:
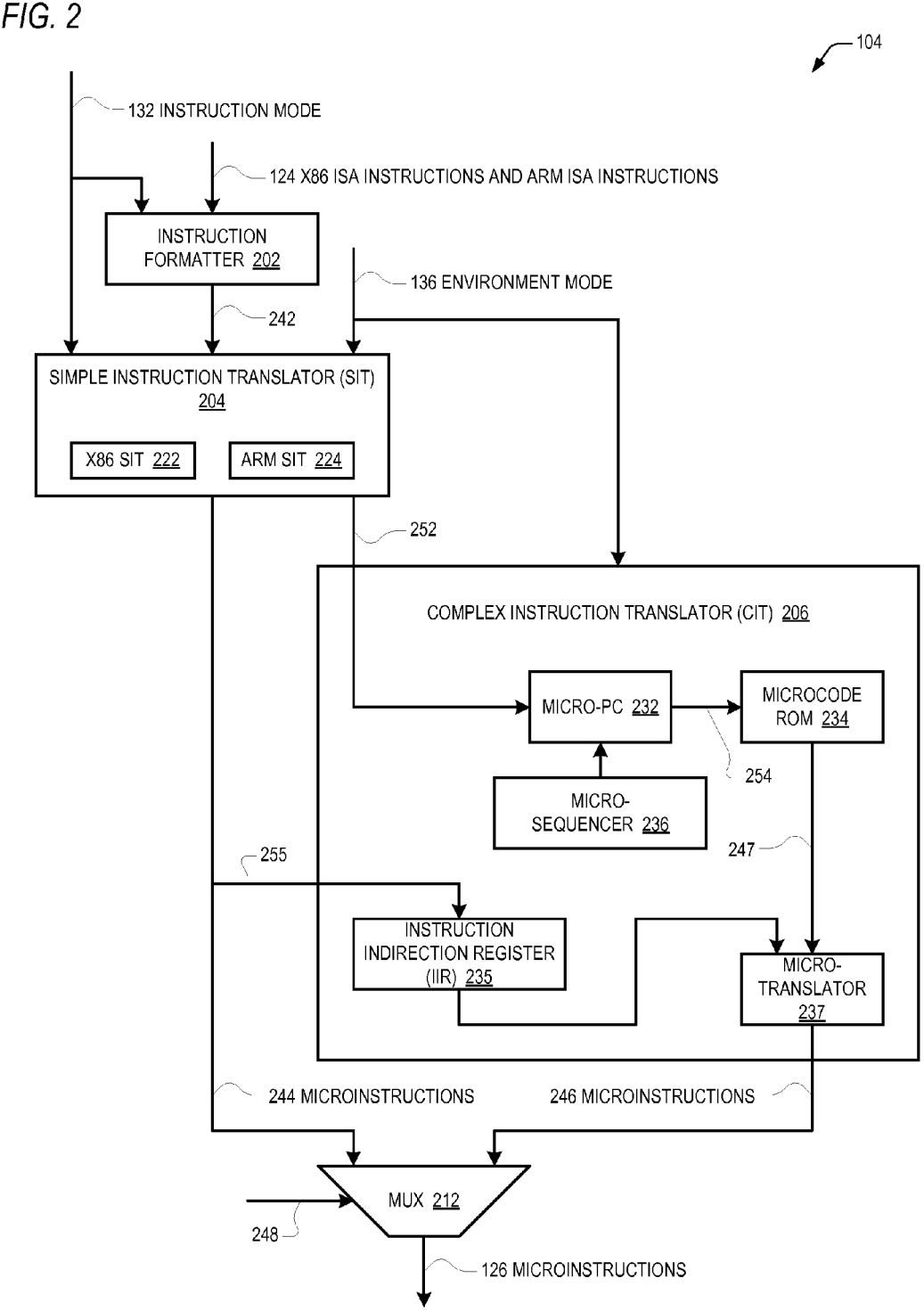
FIG. 2 is a block diagram illustrating in more detail the hardware instruction translator of FIG. 1.

Referring now to FIG. 2, a block diagram illustrating in more detail the hardware instruction translator 104 of FIG. 1 is shown. The hardware instruction translator 104 comprises hardware, more specifically a collection of transistors. The hardware instruction translator 104 includes an instruction formatter 202 that receives the instruction mode indicator 132 and the blocks of x86 ISA and ARM ISA instruction bytes 124 from the instruction cache 102 of FIG. 1 and outputs formatted x86 ISA and ARM ISA instructions 242; a simple instruction translator (SIT) 204 that receives the instruction mode indicator 132 and environment mode indicator 136 and outputs implementing microinstructions 244 and a microcode address 252; a complex instruction translator (CIT) 206 (also referred to as a microcode unit) that receives the microcode address 252 and the environment mode indicator 136 and provides implementing microinstructions 246; and a mux 212 that receives microinstructions 244 from the simple instruction translator 204 on one input and that receives the microinstructions 246 from the complex instruction translator 206 on the other input and that provides the implementing microinstructions 126 to the execution pipeline 112 of FIG. 1. The instruction formatter 202 is described in more detail with respect to FIG. 3. The simple instruction translator 204 includes an x86 SIT 222 and an ARM SIT 224. The complex instruction translator 206 includes a micro-program counter (micro-PC) 232 that receives the microcode address 252, a microcode read only memory (ROM) 234 that receives a ROM address 254 from the micro-PC 232, a microsequencer 236 that updates the micro-PC 232, an instruction indirection register (IIR) 235, and a microtranslator 237 that generates the implementing microinstructions 246 output by the complex instruction translator 206. Both the implementing microinstructions 244 generated by the simple instruction translator 204 and the implementing microinstructions 246 generated by the complex instruction translator 206 are microinstructions 126 of the microinstruction set of the microarchitecture of the microprocessor 100 and which are directly executable by the execution pipeline 112.

The mux 212 is controlled by a select input 248. Normally, the mux 212 selects the microinstructions from the simple instruction translator 204; however, when the simple instruction translator 204 encounters a complex x86 or ARM ISA instruction 242 and transfers control, or traps, to the complex instruction translator 206, the simple instruction translator 204 controls the select input 248 to cause the mux 212 to select microinstructions 246 from the complex instruction translator 206. When the RAT 402 (of FIG. 4) encounters a microinstruction 126 with a special bit set to indicate it is the last microinstruction 126 in the sequence implementing the complex ISA instruction 242, the RAT 402 controls the select input 248 to cause the mux 212 to return to selecting microinstructions 244 from the simple instruction translator 204. Additionally, the reorder buffer 422 controls the select input 248 to cause the mux 212 to select microinstructions 246 from the complex instruction translator 206 when the reorder buffer 422 (see FIG. 4) is ready to retire a microinstruction 126 whose status requires such, for example if the status indicates the microinstruction 126 has caused an exception condition.

The simple instruction translator 204 receives the ISA instructions 242 and decodes them as x86 ISA instructions if the instruction mode indicator 132 indicate x86 and decodes them as ARM ISA instructions if the instruction mode indicator 132 indicates ARM. The simple instruction translator 204 also determines whether the ISA instructions 242 are simple or complex ISA instructions. A simple ISA instruction 242 is one for which the simple instruction translator 204 can emit all the implementing microinstructions 126 that implement the ISA instruction 242; that is, the complex instruction translator 206 does not provide any of the implementing microinstructions 126 for a simple ISA instruction 124. In contrast, a complex ISA instruction 124 requires the complex instruction translator 206 to provide at least some, if not all, of the implementing microinstructions 126. In one embodiment, for a subset of the instructions 124 of the ARM and x86 ISA instruction sets, the simple instruction translator 204 emits a portion of the microinstructions 244 that implement the x86/ARM ISA instruction 126 and then transfers control to the complex instruction translator 206 which subsequently emits the remainder of the microinstructions 246 that implement the x86/ARM ISA instruction 126. The mux 212 is controlled to first provide the implementing microinstructions 244 from the simple instruction translator 204 as microinstructions 126 to the execution pipeline 112 and second to provide the implementing microinstructions 246 from the complex instruction translator 206 as microinstructions 126 to the execution pipeline 112. The simple instruction translator 204 knows the starting microcode ROM 234 address of the various microcode routines employed by the hardware instruction translator 104 to generate the implementing microinstructions 126 for various complex ISA instructions 124, and when the simple instruction translator 204 decodes a complex ISA instruction 242, it provides the relevant microcode routine address 252 to the micro-PC 232 of the complex instruction translator 206. The simple instruction translator 204 emits all the microinstructions 244 needed to implement a relatively large percentage of the instructions 124 of the ARM and x86 ISA instruction sets, particularly ISA instructions 124 that tend to be performed by x86 ISA and ARM ISA machine language programs with a high frequency, and only a relatively small percentage requires the complex instruction translator 206 to provide implementing microinstructions 246. According to one embodiment, examples of x86 instructions that are primarily implemented by the complex instruction translator 206 are the RDMSR/WRMSR, CPUID, complex mathematical instructions (e.g., FSQRT and transcendental instructions), and IRET instructions; and examples of ARM instructions that are primarily implemented by the complex instruction translator 206 are the MCR, MRC, MSR, MRS, SRS, and RFE instructions. The preceding list is by no means exhaustive, but provides an indication of the type of ISA instructions implemented by the complex instruction translator 206.

When the instruction mode indicator 132 indicates x86, the x86 SIT 222 decodes the x86 ISA instructions 242 and translates them into the implementing microinstructions 244; when the instruction mode indicator 132 indicates ARM, the ARM SIT 224 decodes the ARM ISA instructions 242 and translates them into the implementing microinstructions 244. In one embodiment, the simple instruction translator 204 is a block of Boolean logic gates synthesized using well-known synthesis tools. In one embodiment, the x86 SIT 222 and the ARM SIT 224 are separate blocks of Boolean logic gates; however, in another embodiment, the x86 SIT 222 and the ARM SIT 224 are a single block of Boolean logic gates. In one embodiment, the simple instruction translator 204 translates up to three ISA instructions 242 and provides up to six implementing microinstructions 244 to the execution pipeline 112 per clock cycle. In one embodiment, the simple instruction translator 204 comprises three sub-translators (not shown) that each translate a single formatted ISA instruction 242: the first sub-translator is capable of translating a formatted ISA instruction 242 that requires no more than three implementing microinstructions 126; the second sub-translator is capable of translating a formatted ISA instruction 242 that requires no more than two implementing microinstructions 126; and the third sub-translator is capable of translating a formatted ISA instruction 242 that requires no more than one implementing microinstruction 126. In one embodiment, the simple instruction translator 204 includes a hardware state machine that enables it to output multiple microinstructions 244 that implement an ISA instruction 242 over multiple clock cycles.

In one embodiment, the simple instruction translator 204 also performs various exception checks based on the instruction mode indicator 132 and/or environment mode indicator 136. For example, if the instruction mode indicator 132 indicates x86 and the x86 SIT 222 decodes an ISA instruction 124 that is invalid for the x86 ISA, then the simple instruction translator 204 generates an x86 invalid opcode exception; similarly, if the instruction mode indicator 132 indicates ARM and the ARM SIT 224 decodes an ISA instruction 124 that is invalid for the ARM ISA, then the simple instruction translator 204 generates an ARM undefined instruction exception. For another example, if the environment mode indicator 136 indicates the x86 ISA, then the simple instruction translator 204 checks to see whether each x86 ISA instruction 242 it encounters requires a particular privilege level and, if so, checks whether the CPL satisfies the required privilege level for the x86 ISA instruction 242 and generates an exception if not; similarly, if the environment mode indicator 136 indicates the ARM ISA, then the simple instruction translator 204 checks to see whether each formatted ARM ISA instruction 242 is a privileged mode instruction and, if so, checks whether the current mode is a privileged mode and generates an exception if the current mode is user mode. The complex instruction translator 206 performs a similar function for certain complex ISA instructions 242.

The complex instruction translator 206 outputs a sequence of implementing microinstructions 246 to the mux 212. The microcode ROM 234 stores ROM instructions 247 of microcode routines. The microcode ROM 234 outputs the ROM instructions 247 in response to the address of the next ROM instruction 247 to be fetched from the microcode ROM 234, which is held by the micro-PC 232. Typically, the micro-PC 232 receives its initial value 252 from the simple instruction translator 204 in response to the simple instruction translator 204 decoding a complex ISA instruction 242. In other cases, such as in response to a reset or exception, the micro-PC 232 receives the address of the reset microcode routine address or appropriate microcode exception handler address, respectively. The microsequencer 236 updates the micro-PC 232 normally by the size of a ROM instruction 247 to sequence through microcode routines and alternatively to a target address generated by the execution pipeline 112 in response to execution of a control type microinstruction 126, such as a branch instruction, to effect branches to non-sequential locations in the microcode ROM 234. The microcode ROM 234 is manufactured within the semiconductor die of the microprocessor 100.

In addition to the microinstructions 244 that implement a simple ISA instruction 124 or a portion of a complex ISA instruction 124, the simple instruction translator 204 also generates ISA instruction information 255 that is written to the instruction indirection register (IIR) 235. The ISA instruction information 255 stored in the IIR 235 includes information about the ISA instruction 124 being translated, for example, information identifying the source and destination registers specified by the ISA instruction 124 and the form of the ISA instruction 124, such as whether the ISA instruction 124 operates on an operand in memory or in an architectural register 106 of the microprocessor 100. This enables the microcode routines to be generic, i.e., without having to have a different microcode routine for each different source and/or destination architectural register 106. In particular, the simple instruction translator 204 is knowledgeable of the register file 106, including which registers are shared registers 504, and translates the register information provided in the x86 ISA and ARM ISA instructions 124 to the appropriate register in the register file 106 via the ISA instruction information 255. The ISA instruction information 255 also includes a displacement field, an immediate field, a constant field, rename information for each source operand as well as for the microinstruction 126 itself, information to indicate the first and last microinstruction 126 in the sequence of microinstructions 126 that implement the ISA instruction 124, and other bits of useful information gleaned from the decode of the ISA instruction 124 by the hardware instruction translator 104.

The microtranslator 237 receives the ROM instructions 247 from the microcode ROM 234 and the contents of the IIR 235. In response, the microtranslator 237 generates implementing microinstructions 246. The microtranslator 237 translates certain ROM instructions 247 into different sequences of microinstructions 246 depending upon the information received from the IIR 235, such as depending upon the form of the ISA instruction 124 and the source and/or destination architectural register 106 combinations specified by them. In many cases, much of the ISA instruction information 255 is merged with the ROM instruction 247 to generate the implementing microinstructions 246. In one embodiment, each ROM instruction 247 is approximately 40 bits wide and each microinstruction 246 is approximately 200 bits wide. In one embodiment, the microtranslator 237 is capable of generating up to three microinstructions 246 from a ROM instruction 247. The microtranslator 237 comprises Boolean logic gates that generate the implementing microinstructions 246.

An advantage provided by the microtranslator 237 is that the size of the microcode ROM 234 may be reduced since it does not need to store the ISA instruction information 255 provided by the IIR 235 since the simple instruction translator 204 generates the ISA instruction information 255. Furthermore, the microcode ROM 234 routines may include fewer conditional branch instructions because it does not need to include a separate routine for each different ISA instruction form and for each source and/or destination architectural register 106 combination. For example, if the complex ISA instruction 124 is a memory form, the simple instruction translator 204 may generate a prolog of microinstructions 244 that includes microinstructions 244 to load the source operand from memory into a temporary register 106, and the microtranslator 237 may generate a microinstruction 246 to store the result from the temporary register to memory; whereas, if the complex ISA instruction 124 is a register form, the prolog may move the source operand from the source register specified by the ISA instruction 124 to the temporary register 106, and the microtranslator 237 may generate a microinstruction 246 to move the result from a temporary register to the architectural destination register 106 specified by the IIR 235. In one embodiment, the microtranslator 237 is similar in many respects to the microtranslator 237 described in U.S. patent application Ser. No. 12/766,244, filed on Apr. 23, 2010, which is hereby incorporated by reference in its entirety for all purposes, but which is modified to translate ARM ISA instructions 124 in addition to x86 ISA instructions 124.

It is noted that the micro-PC 232 is distinct from the ARM PC 116 and the x86 IP 118; that is, the micro-PC 232 does not hold the address of ISA instructions 124, and the addresses held in the micro-PC 232 are not within the system memory address space. It is further noted that the microinstructions 246 are produced by the hardware instruction translator 104 and provided directly to the execution pipeline 112 for execution rather than being results 128 of the execution pipeline 112.

Figure 3:
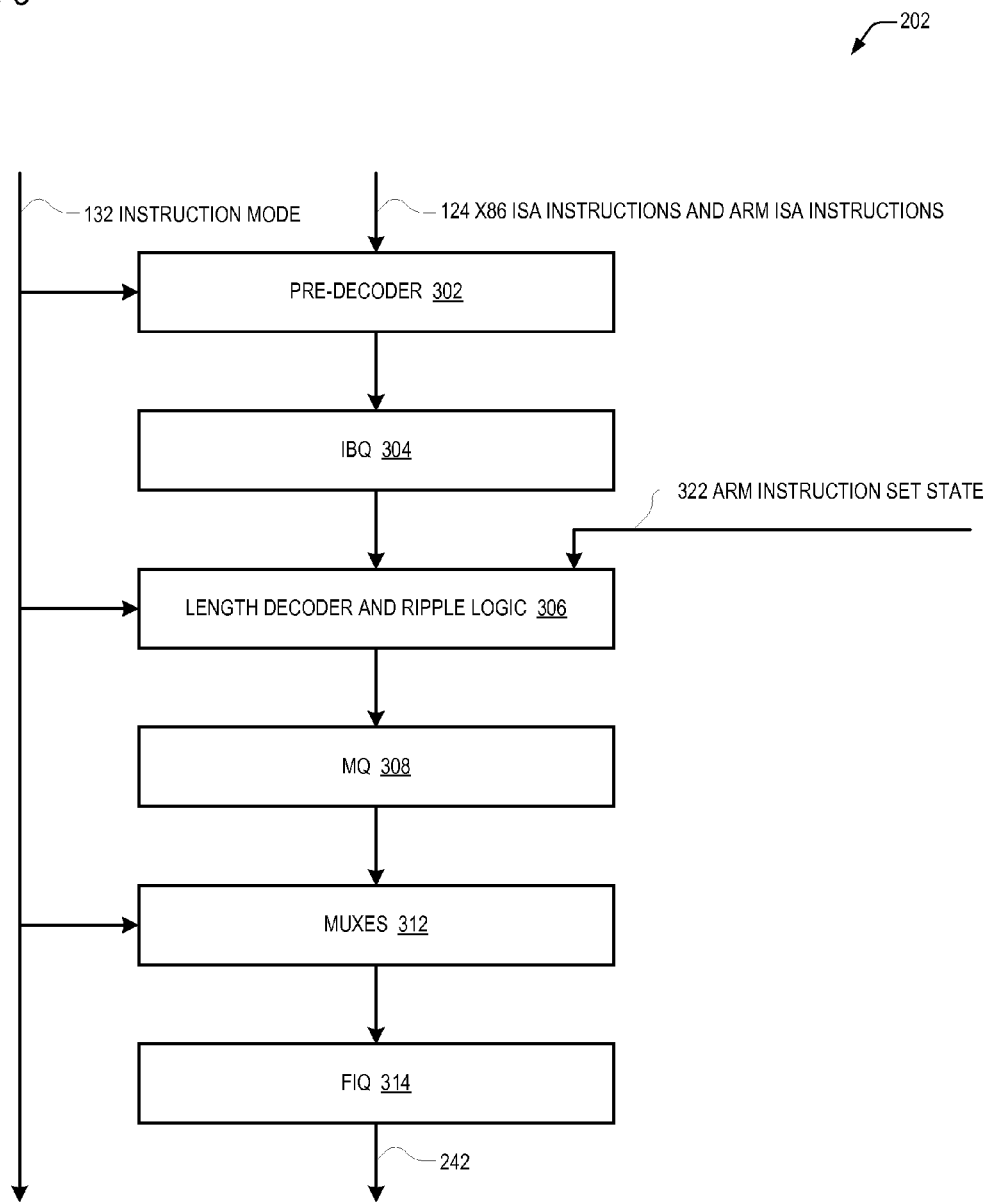
FIG. 3 is a block diagram illustrating in more detail the instruction formatter of FIG. 2.

Referring now to FIG. 3, a block diagram illustrating in more detail the instruction formatter 202 of FIG. 2 is shown. The instruction formatter 202 receives a block of the x86 ISA and ARM ISA instruction bytes 124 from the instruction cache 102 of FIG. 1. By virtue of the variable length nature of x86 ISA instructions, an x86 instruction 124 may begin in any byte within a block of instruction bytes 124. The task of determining the length and location of an x86 ISA instruction within a cache block is further complicated by the fact that the x86 ISA allows prefix bytes and the length may be affected by current address length and operand length default values. Furthermore, ARM ISA instructions are either 2-byte or 4-byte length instructions and are 2-byte or 4-byte aligned, depending upon the current ARM instruction set state 322 and the opcode of the ARM ISA instruction 124. Therefore, the instruction formatter 202 extracts distinct x86 ISA and ARM ISA instructions from the stream of instruction bytes 124 made up of the blocks received from the instruction cache 102. That is, the instruction formatter 202 formats the stream of x86 ISA and ARM ISA instruction bytes, which greatly simplifies the already difficult task of the simple instruction translator 204 of FIG. 2 to decode and translate the ISA instructions 124.

The instruction formatter 202 includes a pre-decoder 302 that pre-decodes the instruction bytes 124 as x86 instruction bytes if the instruction mode indicator 132 indicates x86 and pre-decodes the instruction bytes 124 as ARM instruction bytes if the instruction mode indicator 132 indicates ARM to generate pre-decode information. An instruction byte queue (IBQ) 304 receives the block of ISA instruction bytes 124 and associated pre-decode information generated by the pre-decoder 302.

An array of length decoders and ripple logic 306 receives the contents of the bottom entry of the IBQ 304, namely a block of ISA instruction bytes 124 and associated pre-decode information. The length decoders and ripple logic 306 also receives the instruction mode indicator 132 and the ARM ISA instruction set state 322. In one embodiment, the ARM ISA instruction set state 322 comprises the J and T bits of the ARM ISA CPSR register. In response to its inputs, the length decoders and ripple logic 306 generates decode information including the length of x86 and ARM instructions in the block of ISA instruction bytes 124, x86 prefix information, and indicators associated with each of the ISA instruction bytes 124 indicating whether the byte is the start byte of an ISA instruction 124, the end byte of an ISA instruction 124, and/or a valid byte of an ISA instruction 124. A mux queue (MQ) 308 receives a block of the ISA instruction bytes 126, its associated pre-decode information generated by the pre-decoder 302, and the associated decode information generated by the length decoders and ripple logic 306.

Control logic (not shown) examines the contents of the bottom MQ 308 entries and controls muxes 312 to extract distinct, or formatted, ISA instructions and associated pre-decode and decode information, which are provided to a formatted instruction queue (FIQ) 314. The FIQ 314 buffers the formatted ISA instructions 242 and related information for provision to the simple instruction translator 204 of FIG. 2. In one embodiment, the muxes 312 extract up to three formatted ISA instructions and related information per clock cycle.

In one embodiment, the instruction formatter 202 is similar in many ways to the XIBQ, instruction formatter, and FIQ collectively as described in U.S. patent application Ser. Nos. 12/571,997; 12/572,002; 12/572,045; 12/572,024; 12/572,052; 12/572,058, each filed on Oct. 1, 2009, which are hereby incorporated by reference herein for all purposes. However, the XIBQ, instruction formatter, and FIQ of the above patent applications are modified to format ARM ISA instructions 124 in addition to x86 ISA instructions 124. The length decoder 306 is modified to decode ARM ISA instructions 124 to generate their length and start, end, and valid byte indicators. In particular, if the instruction mode indicator 132 indicates ARM ISA, the length decoder 306 examines the current ARM instruction set state 322 and the opcode of the ARM ISA instruction 124 to determine whether the ARM instruction 124 is a 2-byte or 4-byte length instruction. In one embodiment, the length decoder 306 includes separate length decoders for generating the length of x86 ISA instructions 124 and for generating the length of ARM ISA instructions 124, and outputs of the separate length decoders are wire-ORed together for provision to the ripple logic 306. In one embodiment, the formatted instruction queue (FIQ) 314 comprises separate queues for holding separate portions of the formatted instructions 242. In one embodiment, the instruction formatter 202 provides the simple instruction translator 204 up to three formatted ISA instructions 242 per clock cycle.

Figure 4:
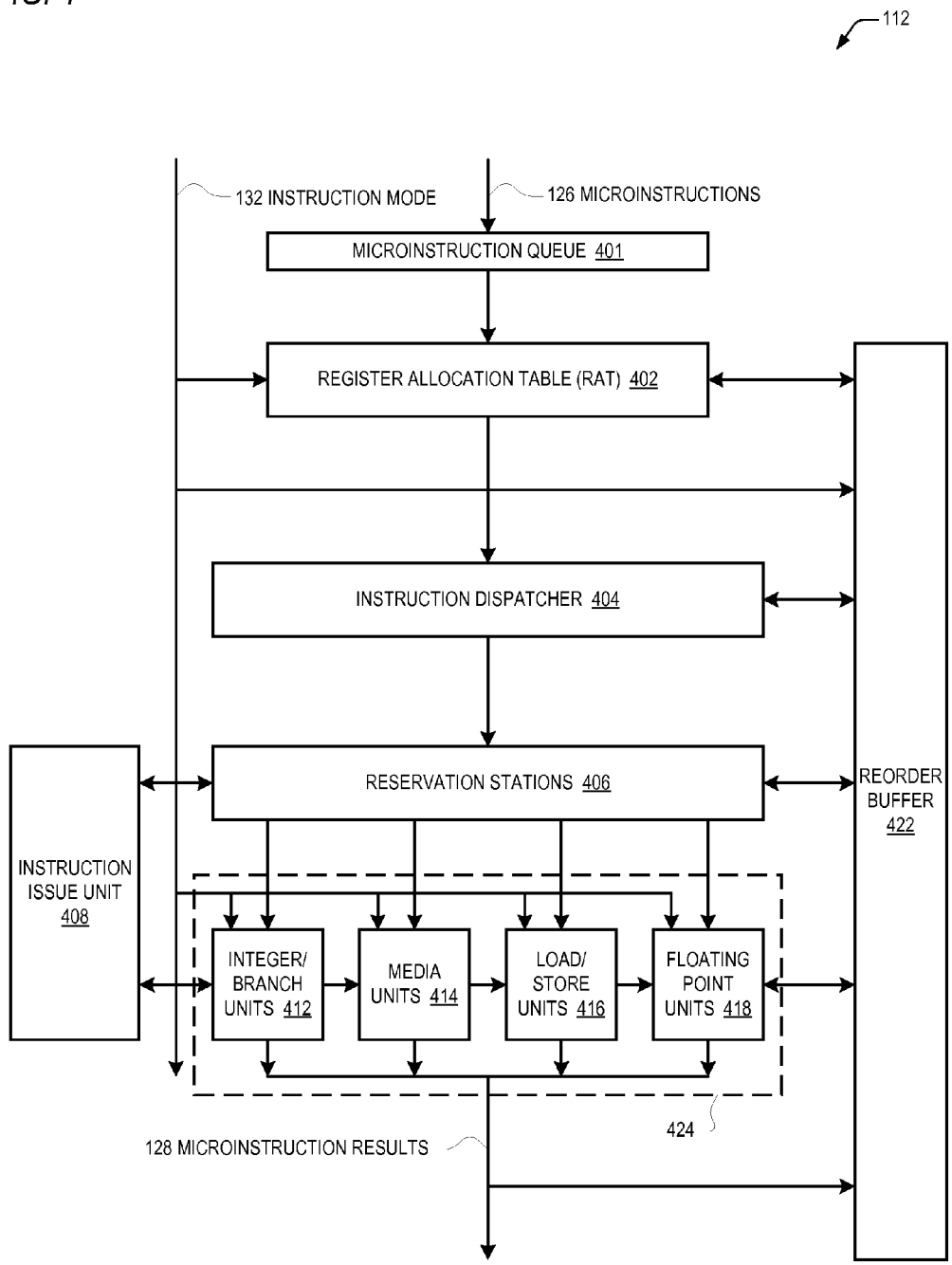
FIG. 4 is a block diagram illustrating in more detail the execution pipeline of FIG. 1.

Referring now to FIG. 4, a block diagram illustrating in more detail the execution pipeline 112 of FIG. 1 is shown. The execution pipeline 112 is coupled to receive the implementing microinstructions 126 directly from the hardware instruction translator 104 of FIG. 2. The execution pipeline 112 includes a microinstruction queue 401 that receives the microinstructions 126; a register allocation table (RAT) 402 that receives the microinstructions from the microinstruction queue 401; an instruction dispatcher 404 coupled to the RAT 402; reservation stations 406 coupled to the instruction dispatcher 404; an instruction issue unit 408 coupled to the reservation stations 406; a reorder buffer (ROB) 422 coupled to the RAT 402, instruction dispatcher 404, and reservation stations 406, and execution units 424 coupled to the reservation stations 406, instruction issue unit 408, and ROB 422. The RAT 402 and execution units 424 receive the instruction mode indicator 132.

The microinstruction queue 401 operates as a buffer in circumstances where the rate at which the hardware instruction translator 104 generates the implementing microinstructions 126 differs from the rate at which the execution pipeline 112 executes them. In one embodiment, the microinstruction queue 401 comprises an M-to-N compressible microinstruction queue that enables the execution pipeline 112 to receive up to M (in one embodiment M is six) microinstructions 126 from the hardware instruction translator 104 in a given clock cycle and yet store the received microinstructions 126 in an N-wide queue (in one embodiment N is three) structure in order to provide up to N microinstructions 126 per clock cycle to the RAT 402, which is capable of processing up to N microinstructions 126 per clock cycle. The microinstruction queue 401 is compressible in that it does not leave holes among the entries of the queue, but instead sequentially fills empty entries of the queue with the microinstructions 126 as they are received from the hardware instruction translator 104 regardless of the particular clock cycles in which the microinstructions 126 are received. This advantageously enables high utilization of the execution units 424 (of FIG. 4) in order to achieve high instruction throughput while providing advantages over a non-compressible M-wide or N-wide instruction queue. More specifically, a non-compressible N-wide queue would require the hardware instruction translator 104, in particular the simple instruction translator 204, to re-translate in a subsequent clock cycle one or more ISA instructions 124 that it already translated in a previous clock cycle because the non-compressible N-wide queue could not receive more than N microinstructions 126 per clock cycle, and the re-translation wastes power; whereas, a non-compressible M-wide queue, although not requiring the simple instruction translator 204 to re-translate, would create holes among the queue entries, which is wasteful and would require more rows of entries and thus a larger and more power-consuming queue in order to accomplish comparable buffering capability.

The RAT 402 receives the microinstructions 126 from the microinstruction queue 401 and generates dependency information regarding the pending microinstructions 126 within the microprocessor 100 and performs register renaming to increase the microinstruction parallelism to take advantage of the superscalar, out-of-order execution ability of the execution pipeline 112. If the ISA instructions 124 indicates x86, then the RAT 402 generates the dependency information and performs the register renaming with respect to the x86 ISA registers 106 of the microprocessor 100; whereas, if the ISA instructions 124 indicates ARM, then the RAT 402 generates the dependency information and performs the register renaming with respect to the ARM ISA registers 106 of the microprocessor 100; however, as mentioned above, some of the registers 106 may be shared by the x86 ISA and ARM ISA. The RAT 402 also allocates an entry in the ROB 422 for each microinstruction 126 in program order so that the ROB 422 can retire the microinstructions 126 and their associated x86 ISA and ARM ISA instructions 124 in program order, even though the microinstructions 126 may execute out of program order with respect to the x86 ISA and ARM ISA instructions 124 they implement. The ROB 422 comprises a circular queue of entries, each for storing information related to a pending microinstruction 126. The information includes, among other things, microinstruction 126 execution status, a tag that identifies the x86 or ARM ISA instruction 124 from which the microinstruction 126 was translated, and storage for storing the results of the microinstruction 126.

The instruction dispatcher 404 receives the register-renamed microinstructions 126 and dependency information from the RAT 402 and, based on the type of instruction and availability of the execution units 424, dispatches the microinstructions 126 and their associated dependency information to the reservation station 406 associated with the appropriate execution unit 424 that will execute the microinstruction 126.

The instruction issue unit 408, for each microinstruction 126 waiting in a reservation station 406, detects that the associated execution unit 424 is available and the dependencies are satisfied (e.g., the source operands are available) and issues the microinstruction 126 to the execution unit 424 for execution. As mentioned, the instruction issue unit 408 can issue the microinstructions 126 for execution out of program order and in a superscalar fashion.

In one embodiment, the execution units 424 include integer/branch units 412, media units 414, load/store units 416, and floating point units 418. The execution units 424 execute the microinstructions 126 to generate results 128 that are provided to the ROB 422. Although the execution units 424 are largely agnostic of whether the microinstructions 126 they are executing were translated from an x86 or ARM ISA instruction 124, the execution units 424 use the instruction mode indicator 132 and environment mode indicator 136 to execute a relatively small subset of the microinstructions 126. For example, the execution pipeline 112 handles the generation of flags slightly differently based on whether the instruction mode indicator 132 indicates the x86 ISA or the ARM ISA and updates the x86 EFLAGS register or ARM condition code flags in the PSR depending upon whether the instruction mode indicator 132 indicates the x86 ISA or the ARM ISA. For another example, the execution pipeline 112 samples the instruction mode indicator 132 to decide whether to update the x86 IP 118 or the ARM PC 116, or common instruction address register, and whether to use x86 or ARM semantics to do so. Once a microinstruction 126 becomes the oldest completed microinstruction 126 in the microprocessor 100 (i.e., at the head of the ROB 422 queue and having a completed status), the ROB 422 retires the ISA instruction 124 and frees up the entries associated with the implementing microinstructions 126. In one embodiment, the microprocessor 100 can retire up to three ISA instructions 124 per clock cycle. Advantageously, the execution pipeline 112 is a high performance, general purpose execution engine that executes microinstructions 126 of the microarchitecture of the microprocessor 100 that supports both x86 ISA and ARM ISA instructions 124.

Figure 5:
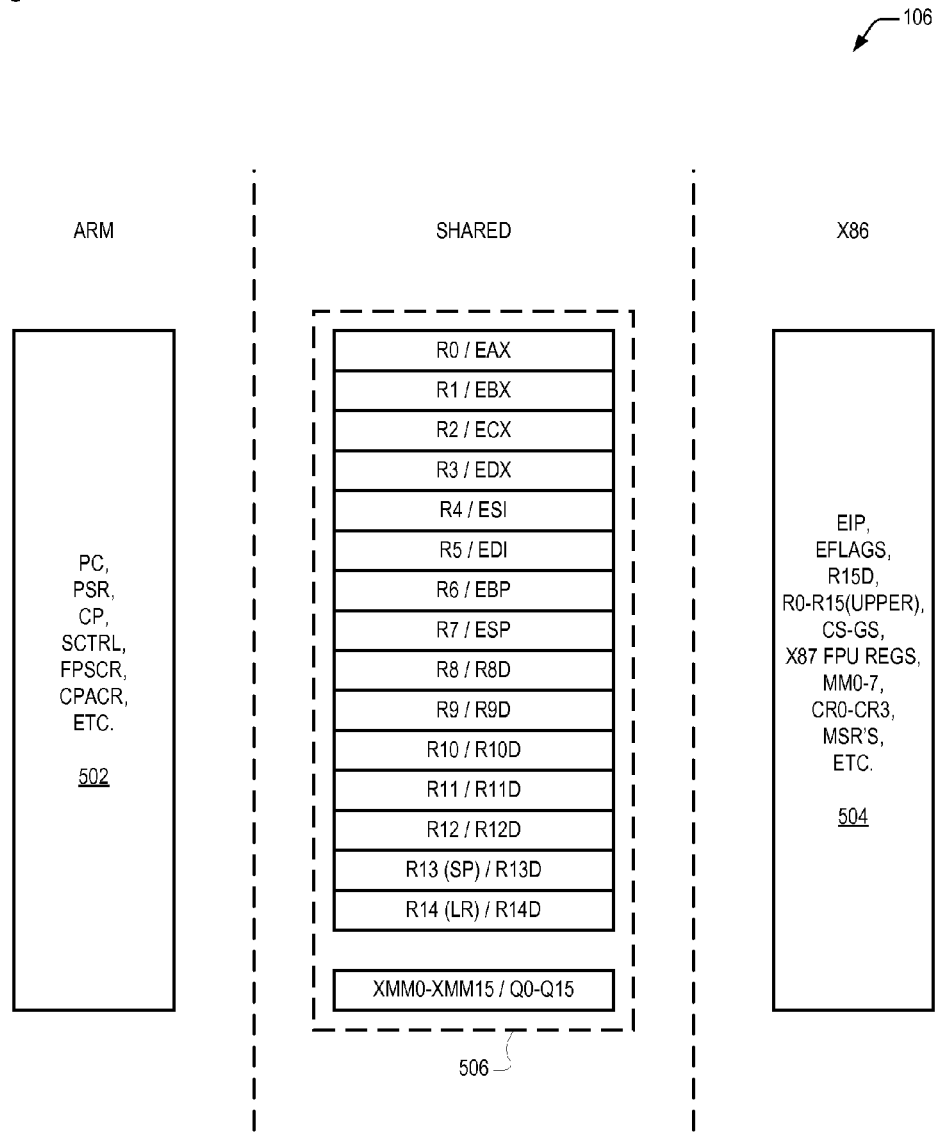
FIG. 5 is a block diagram illustrating in more detail the register file of FIG. 1.

Referring now to FIG. 5, a block diagram illustrating in more detail the register file 106 of FIG. 1 is shown. Preferably register file 106 is implemented as separate physical blocks of registers. In one embodiment, the general purpose registers are implemented in one physical register file having a plurality of read ports and write ports; whereas, other registers may be physically located apart from the general purpose register file and proximate functional blocks which access them and may have fewer read/write ports than the general purpose register file. In one embodiment, some of the non-general purpose registers, particularly those that do not directly control hardware of the microprocessor 100 but simply store values used by microcode 234 (e.g., some x86 MSR or ARM coprocessor registers), are implemented in a private random access memory (PRAM) accessible by the microcode 234 but invisible to the x86 ISA and ARM ISA programmer, i.e., not within the ISA system memory address space.

Broadly speaking, the register file 106 is separated logically into three categories, as shown in FIG. 5, namely the ARM-specific registers 502, the x86-specific register 504, and the shared registers 506. In one embodiment, the shared registers 506 include fifteen 32-bit registers that are shared by the ARM ISA registers R0 through R14 and the x86 ISA EAX through R14D registers as well as sixteen 128-bit registers shared by the x86 ISA XMM0 through XMM15 registers and the ARM ISA Advanced SIMD (Neon) registers, a portion of which are also overlapped by the thirty-two 32-bit ARM VFPv3 floating-point registers. As mentioned above with respect to FIG. 1, the sharing of the general purpose registers implies that a value written to a shared register by an x86 ISA instruction 124 will be seen by an ARM ISA instruction 124 that subsequently reads the shared register, and vice versa. This advantageously enables x86 ISA and ARM ISA routines to communicate with one another through registers. Additionally, as mentioned above, certain bits of architectural control registers of the x86 ISA and ARM ISA are also instantiated as shared registers 506. As mentioned above, in one embodiment, the x86 MSRs may be accessed by ARM ISA instructions 124 via an implementation-defined coprocessor register, and are thus shared by the x86 ISA and ARM ISA. The shared registers 506 may also include non-architectural registers, for example non-architectural equivalents of the condition flags, that are also renamed by the RAT 402. The hardware instruction translator 104 is aware of which registers are shared by the x86 ISA and ARM ISA so that it may generate the implementing microinstructions 126 that access the correct registers.

The ARM-specific registers 502 include the other registers defined by the ARM ISA that are not included in the shared registers 506, and the x86-specific registers 504 include the other registers defined by the x86 ISA that are not included in the shared registers 506. Examples of the ARM-specific registers 502 include the ARM PC 116, CPSR, SCTRL, FPSCR, CPACR, coprocessor registers, banked general purpose registers and SPSRs of the various exception modes, and so forth. The foregoing is not intended as an exhaustive list of the ARM-specific registers 502, but is merely provided as an illustrative example. Examples of the x86-specific registers 504 include the x86 EIP 118, EFLAGS, R15D, upper 32 bits of the 64-bit R0-R15 registers (i.e., the portion not in the shared registers 506), segment registers (SS, CS, DS, ES, FS, GS), x87 FPU registers, MMX registers, control registers (e.g., CR0-CR3, CR8), and so forth. The foregoing is not intended as an exhaustive list of the x86-specific registers 504, but is merely provided as an illustrative example.

In one embodiment, the microprocessor 100 includes new implementation-defined ARM coprocessor registers that may be accessed when the instruction mode indicator 132 indicates the ARM ISA in order to perform x86 ISA-related operations, including but not limited to: the ability to reset the microprocessor 100 to an x86 ISA processor (reset-to-x86 instruction); the ability to initialize the x86-specific state of the microprocessor 100, switch the instruction mode indicator 132 to x86, and begin fetching x86 instructions 124 at a specified x86 target address (launch-x86 instruction); the ability to access the global configuration register discussed above; the ability to access x86-specific registers (e.g., EFLAGS), in which the x86 register to be accessed is identified in the ARM R0 register, power management (e.g., P-state and C-state transitions), processor bus functions (e.g., I/O cycles), interrupt controller access, and encryption acceleration functionality access, as discussed above. Furthermore, in one embodiment, the microprocessor 100 includes new x86 non-architectural MSRs that may be accessed when the instruction mode indicator 132 indicates the x86 ISA in order to perform ARM ISA-related operations, including but not limited to: the ability to reset the microprocessor 100 to an ARM ISA processor (reset-to-ARM instruction); the ability to initialize the ARM-specific state of the microprocessor 100, switch the instruction mode indicator 132 to ARM, and begin fetching ARM instructions 124 at a specified ARM target address (launch-ARM instruction); the ability to access the global configuration register discussed above; the ability to access ARM-specific registers (e.g., the CPSR), in which the ARM register to be accessed is identified in the EAX register.

Figure 6A:
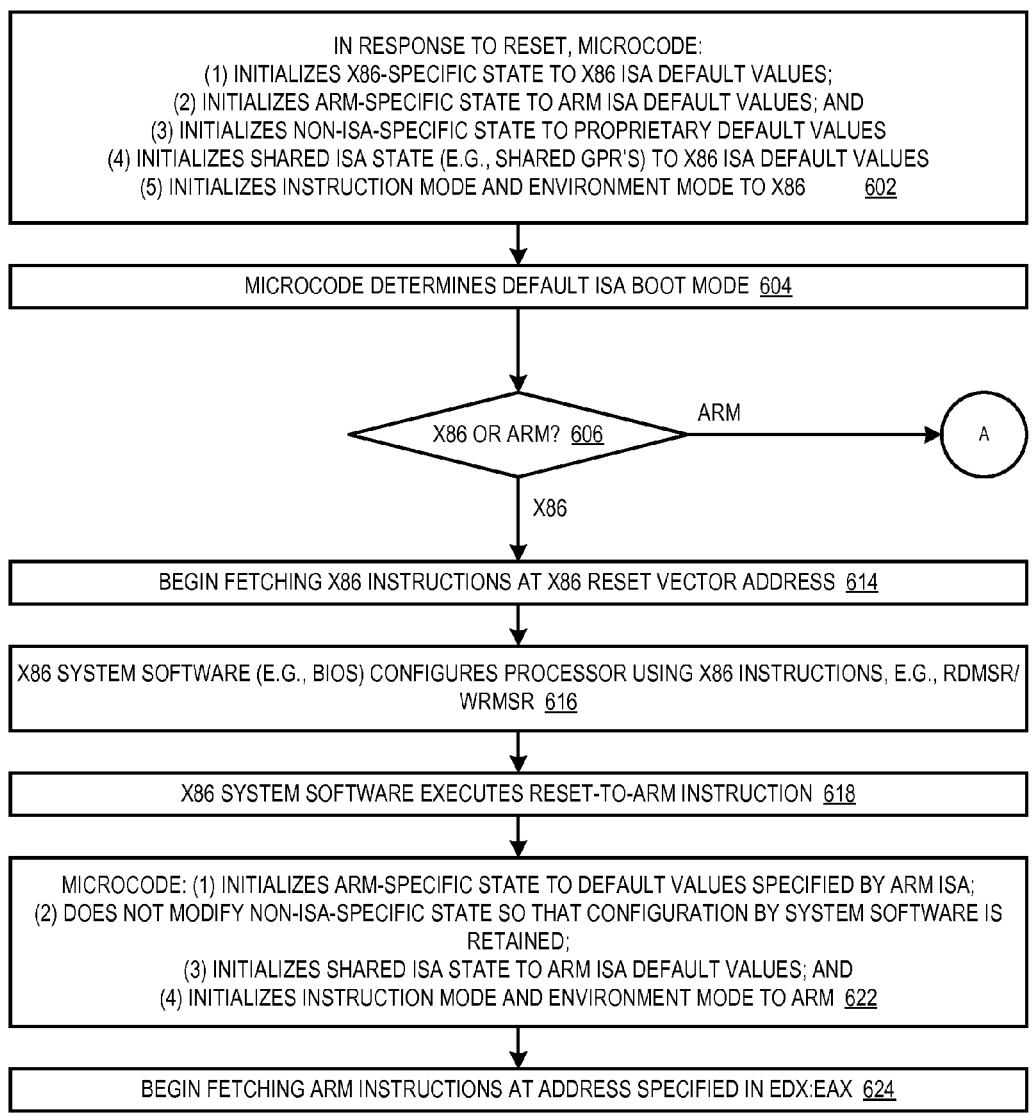
FIG. 6 is a flowchart illustrating operation of the microprocessor of FIG. 1.
Figure 6B:
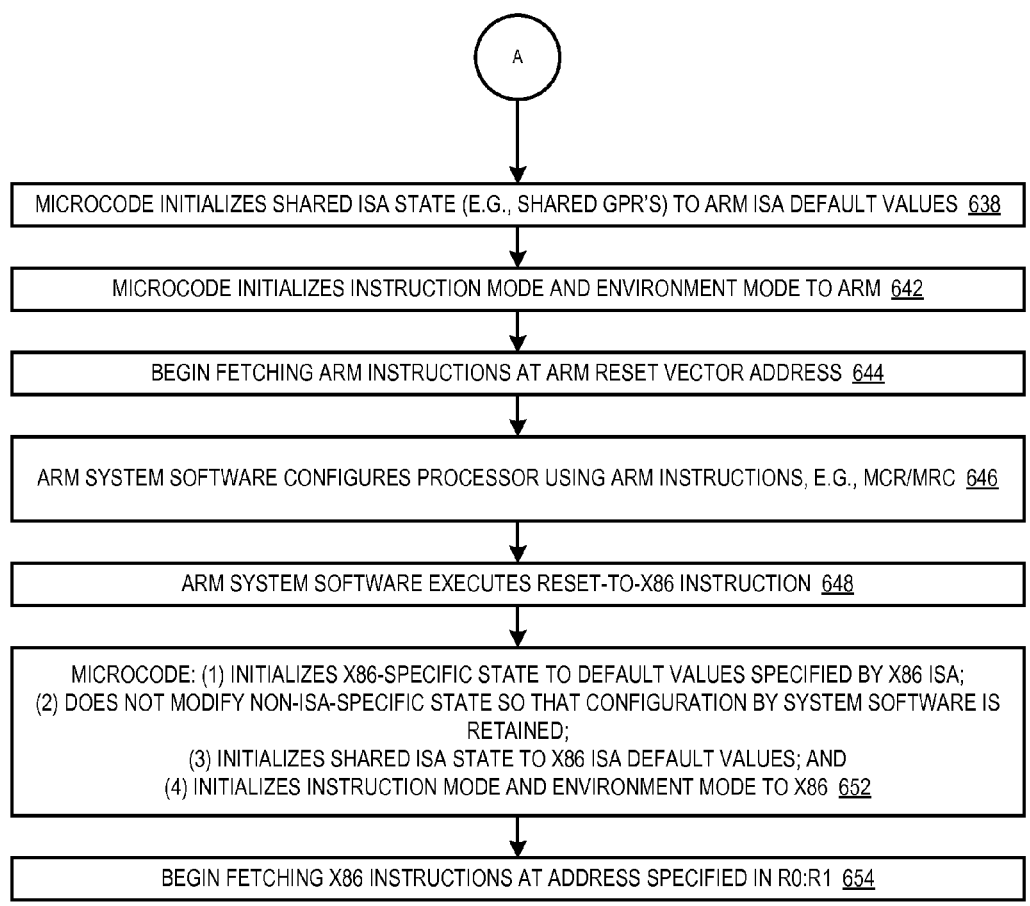

Referring now to FIG. 6, comprising FIGS. 6A and 6B, a flowchart illustrating operation of the microprocessor 100 of FIG. 1 is shown. Flow begins at block 602.

At block 602, the microprocessor 100 is reset. The reset may be signaled on the reset input to the microprocessor 100. Additionally, in an embodiment in which the processor bus is an x86 style processor bus, the reset may be signaled by an x86-style INIT. In response to the reset, the reset routines in the microcode 234 are invoked. The reset microcode: (1) initializes the x86-specific state 504 to the default values specified by the x86 ISA; (2) initializes the ARM-specific state 502 to the default values specified by the ARM ISA; (3) initializes the non-ISA-specific state of the microprocessor 100 to the default values specified by the microprocessor 100 manufacturer; (4) initializes the shared ISA state 506, e.g., the GPRs, to the default values specified by the x86 ISA; and (5) sets the instruction mode indicator 132 and environment mode indicator 136 to indicate the x86 ISA. In an alternate embodiment, instead of actions (4) and (5) above, the reset microcode initializes the shared ISA state 506 to the default values specified by the ARM ISA and sets the instruction mode indicator 132 and environment mode indicator 136 to indicate the ARM ISA. In such an embodiment, the actions at blocks 638 and 642 would not need to be performed, and before block 614 the reset microcode would initialize the shared ISA state 506 to the default values specified by the x86 ISA and set the instruction mode indicator 132 and environment mode indicator 136 to indicate the x86 ISA. Flow proceeds to block 604.

At block 604, the reset microcode determines whether the microprocessor 100 is configured to boot as an x86 processor or as an ARM processor. In one embodiment, as described above, the default ISA boot mode is hardcoded in microcode but may be modified by blowing a configuration fuse and/or by a microcode patch. In another embodiment, the default ISA boot mode is provided as an external input to the microprocessor 100, such as an external input pin. Flow proceeds to decision block 606. At decision block 606, if the default ISA boot mode is x86, flow proceeds to block 614; whereas, if the default ISA boot mode is ARM, flow proceeds to block 638.

At block 614, the reset microcode causes the microprocessor 100 to begin fetching x86 instructions 124 at the reset vector address specified by the x86 ISA. Flow proceeds to block 616.

At block 616, the x86 system software, e.g., BIOS, configures the microprocessor 100 using, for example, x86 ISA RDMSR and WRMSR instructions 124. Flow proceeds to block 618.

At block 618, the x86 system software does a reset-to-ARM instruction 124. The reset-to-ARM instruction causes the microprocessor 100 to reset and to come out of the reset as an ARM processor. However, because no x86-specific state 504 and no non-ISA-specific configuration state is changed by the reset-to-ARM instruction 126, it advantageously enables x86 system firmware to perform the initial configuration of the microprocessor 100 and then reboot the microprocessor 100 as an ARM processor while keeping intact the non-ARM configuration of the microprocessor 100 performed by the x86 system software. This enables "thin" micro-boot code to boot an ARM operating system without requiring the micro-boot code to know the complexities of how to configure the microprocessor 100. In one embodiment, the reset-to-ARM instruction is an x86 WRMSR instruction to a new non-architectural MSR. Flow proceeds to block 622.

At block 622, the simple instruction translator 204 traps to the reset microcode in response to the complex reset-to-ARM instruction 124. The reset microcode initializes the ARM-specific state 502 to the default values specified by the ARM ISA. However, the reset microcode does not modify the non-ISA-specific state of the microprocessor 100, which advantageously preserves the configuration performed at block 616. Additionally, the reset microcode initializes the shared ISA state 506 to the default values specified by the ARM ISA. Finally, the reset microcode sets the instruction mode indicator 132 and environment mode indicator 136 to indicate the ARM ISA. Flow proceeds to block 624.

At block 624, the reset microcode causes the microprocessor 100 to begin fetching ARM instructions 124 at the address specified in the x86 ISA EDX:EAX registers. Flow ends at block 624.

At block 638, the reset microcode initializes the shared ISA state 506, e.g., the GPRs, to the default values specified by the ARM ISA. Flow proceeds to block 642.

At block 642, the reset microcode sets the instruction mode indicator 132 and environment mode indicator 136 to indicate the ARM ISA. Flow proceeds to block 644.

At block 644, the reset microcode causes the microprocessor 100 to begin fetching ARM instructions 124 at the reset vector address specified by the ARM ISA. The ARM ISA defines two reset vector addresses selected by an input. In one embodiment, the microprocessor 100 includes an external input to select between the two ARM ISA-defined reset vector addresses. In another embodiment, the microcode 234 includes a default selection between the two ARM ISA-defined reset vector addresses, which may be modified by a blown fuse and/or microcode patch. Flow proceeds to block 646.

At block 646, the ARM system software configures the microprocessor 100 using, for example, ARM ISA MCR and MRC instructions 124. Flow proceeds to block 648.

At block 648, the ARM system software does a reset-to-x86 instruction 124. The reset-to-x86 instruction causes the microprocessor 100 to reset and to come out of the reset as an x86 processor. However, because no ARM-specific state 502 and no non-ISA-specific configuration state is changed by the reset-to-x86 instruction 126, it advantageously enables ARM system firmware to perform the initial configuration of the microprocessor 100 and then reboot the microprocessor 100 as an x86 processor while keeping intact the non-x86 configuration of the microprocessor 100 performed by the ARM system software. This enables "thin" micro-boot code to boot an x86 operating system without requiring the micro-boot code to know the complexities of how to configure the microprocessor 100. In one embodiment, the reset-to-x86 instruction is an ARM MRC/MRCC instruction to a new implementation-defined coprocessor register. Flow proceeds to block 652.

At block 652, the simple instruction translator 204 traps to the reset microcode in response to the complex reset-to-x86 instruction 124. The reset microcode initializes the x86-specific state 504 to the default values specified by the x86 ISA. However, the reset microcode does not modify the non-ISA-specific state of the microprocessor 100, which advantageously preserves the configuration performed at block 646. Additionally, the reset microcode initializes the shared ISA state 506 to the default values specified by the x86 ISA. Finally, the reset microcode sets the instruction mode indicator 132 and environment mode indicator 136 to indicate the x86 ISA. Flow proceeds to block 654.

At block 654, the reset microcode causes the microprocessor 100 to begin fetching x86 instructions 124 at the address specified in the ARM ISA R1:R0 registers. Flow ends at block 654.

Referring now to FIG. 7, a block diagram illustrating a dual-core microprocessor 700 according to the present invention is shown. The dual-core microprocessor 700 includes two processing cores 100 in which each core 100 includes the elements of the microprocessor 100 of FIG. 1 such that it can perform both x86 ISA and ARM ISA machine language programs. The cores 100 may be configured such that both cores 100 are running x86 ISA programs, both cores 100 are running ARM ISA programs, or one core 100 is running x86 ISA programs while the other core 100 is running ARM ISA programs, and the mix between these three configurations may change dynamically during operation of the microprocessor 700. As discussed above with respect to FIG. 6, each core 100 has a default value for its instruction mode indicator 132 and environment mode indicator 136, which may be inverted by a fuse and/or microcode patch, such that each core 100 may individually come out of reset as an x86 or an ARM processor. Although the embodiment of FIG. 7 includes two cores 100, in other embodiments the microprocessor 700 includes more than two cores 100, each capable of running both x86 ISA and ARM ISA machine language programs.

Figure 8:
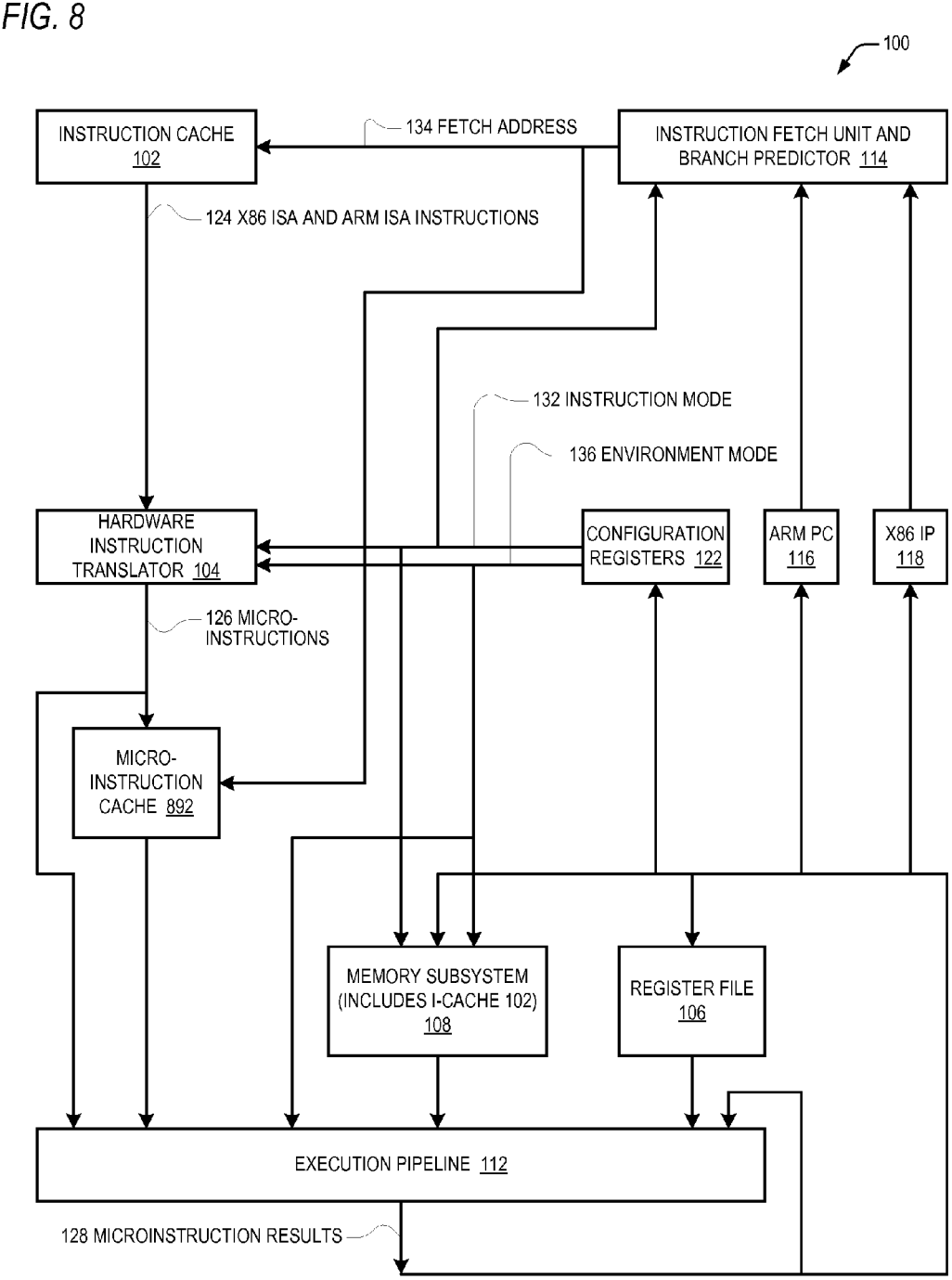
FIG. 8 is a block diagram illustrating a microprocessor that runs x86 ISA and ARM ISA machine language programs according to an alternate embodiment of the present invention.

Referring now to FIG. 8, a block diagram illustrating a microprocessor 100 that can perform x86 ISA and ARM ISA machine language programs according to an alternate embodiment of the present invention is shown. The microprocessor 100 of FIG. 8 is similar to the microprocessor 100 of FIG. 1 and like-numbered elements are similar. However, the microprocessor 100 of FIG. 8 also includes a microinstruction cache 892. The microinstruction cache 892 caches microinstructions 126 generated by the hardware instruction translator 104 that are provided directly to the execution pipeline 112. The microinstruction cache 892 is indexed by the fetch address 134 generated by the instruction fetch unit 114. If the fetch address 134 hits in the microinstruction cache 892, then a mux (not shown) within the execution pipeline 112 selects the microinstructions 126 from the microinstruction cache 892 rather than from the hardware instruction translator 104; otherwise, the mux selects the microinstructions 126 provided directly from the hardware instruction translator 104. The operation of a microinstruction cache, also commonly referred to as a trace cache, is well-known in the art of microprocessor design. An advantage provided by the microinstruction cache 892 is that the time required to fetch the microinstructions 126 from the microinstruction cache 892 is typically less than the time required to fetch the ISA instructions 124 from the instruction cache 102 and translate them into the microinstructions 126 by the hardware instruction translator 104. In the embodiment of FIG. 8, as the microprocessor 100 runs an x86 or ARM ISA machine language program, the hardware instruction translator 104 may not need to perform the hardware translation each time it performs an x86 or ARM ISA instruction 124, namely if the implementing microinstructions 126 are already present in the microinstruction cache 892.

Advantageously, embodiments of a microprocessor are described herein that can run both x86 ISA and ARM ISA machine language programs by including a hardware instruction translator that translates both x86 ISA and ARM ISA instructions into microinstructions of a microinstruction set distinct from the x86 ISA and ARM ISA instruction sets, which microinstructions are executable by a common execution pipeline of the microprocessor to which the implementing microinstructions are provided. An advantage of embodiments of the microprocessor described herein is that, by synergistically utilizing the largely ISA-agnostic execution pipeline to execute microinstructions that are hardware translated from both x86 ISA and ARM ISA instructions, the design and manufacture of the microprocessor may require fewer resources than two separately designed and manufactured microprocessors, i.e., one that can perform x86 ISA machine language programs and one that can perform ARM ISA machine language programs. Additionally, embodiments of the microprocessor, particularly those which employ a superscalar out-of-order execution pipeline, potentially provide a higher performance ARM ISA processor than currently exists. Furthermore, embodiments of the microprocessor potentially provide higher x86 and ARM performance than a system that employs a software translator. Finally, the microprocessor may be included in a system on which both x86 and ARM machine language programs can be run concurrently with high performance due to its ability to concurrently run both x86 ISA and ARM ISA machine language programs.

Conditional Load/Store Instructions

It may be desirable for a microprocessor to include in its instruction set the ability for load/store instructions to be conditionally executed. That is, the load/store instruction may specify a condition (e.g., zero, or negative, or greater than) which if satisfied by condition flags is executed by the microprocessor and which if not satisfied by condition flags is not executed. More specifically, in the case of a conditional load instruction, if the condition is satisfied then the data is loaded from memory into an architectural register and otherwise the microprocessor treats the conditional load instruction as a no-operation instruction; in the case of a conditional store instruction, if the condition is satisfied then the data is stored from an architectural register to memory and otherwise the microprocessor treats the conditional store instruction as a no-operation instruction.

As mentioned above, the ARM ISA provides conditional instruction execution capability, including for load/store instructions, as described in the ARM Architecture Reference Manual, for example at pages A8-118 through A8-125 (Load Register instruction, which may be conditionally executed) and at pages A8-382 through A8-387 (Store Register instruction, which may be conditionally executed). U.S. Pat. No. 5,961,633, listing its Assignee as ARM Limited, of Cambridge, United Kingdom, describes embodiments of a data processor that provides conditional execution of its entire instruction set. The data processor performs memory read/write operations. The data processor includes a condition tester and an instruction execution unit, which may be of the same form as an ARM 6 processor. The condition tester tests the state of processor flags, which represent the processor state generated by previously executed instructions. The current instruction is allowed to execute only if the appropriate flags are set to the states specified by the condition field of the instruction. If the condition tester indicates that the current instruction should not be executed, the instruction is cancelled without changing the state of any registers or memory locations associated with the data processor.

Advantageously, embodiments are described herein of an efficient manner of performing ISA conditional load/store instructions in an out-of-order execution microprocessor. Generally speaking, according to embodiments described herein, a hardware instruction translator translates a conditionally executed ISA load/store instruction into a sequence of one or more microinstructions for execution by an out-of-order execution pipeline. The number and types of microinstructions may depend upon whether the instruction is a load or store and upon the addressing mode and address offset source specified by the conditional load/store instruction. The number and types of microinstructions may also depend upon whether the conditional load/store instruction 124 specifies that one of the source operands, namely an offset register value, has a pre-shift operation applied to it. In one embodiment, the pre-shift operations include those described in the ARM Architecture Reference Manual at pages A8-10 through A8-12, for example.

As used herein, a conditional load/store instruction is an ISA instruction that instructs the microprocessor to load data from memory into a destination register (conditional load) or store data to memory from a data register (conditional store) if a condition is satisfied and to otherwise treat the instruction as a no operation instruction. That is, a conditional load instruction loads data into a processor register from a memory location, but only if the processor condition flags satisfy a condition specified by the instruction; and, a conditional store instruction stores data from a processor register to a memory location, but only if the processor condition flags satisfy a condition specified by the instruction.

Figure 9:
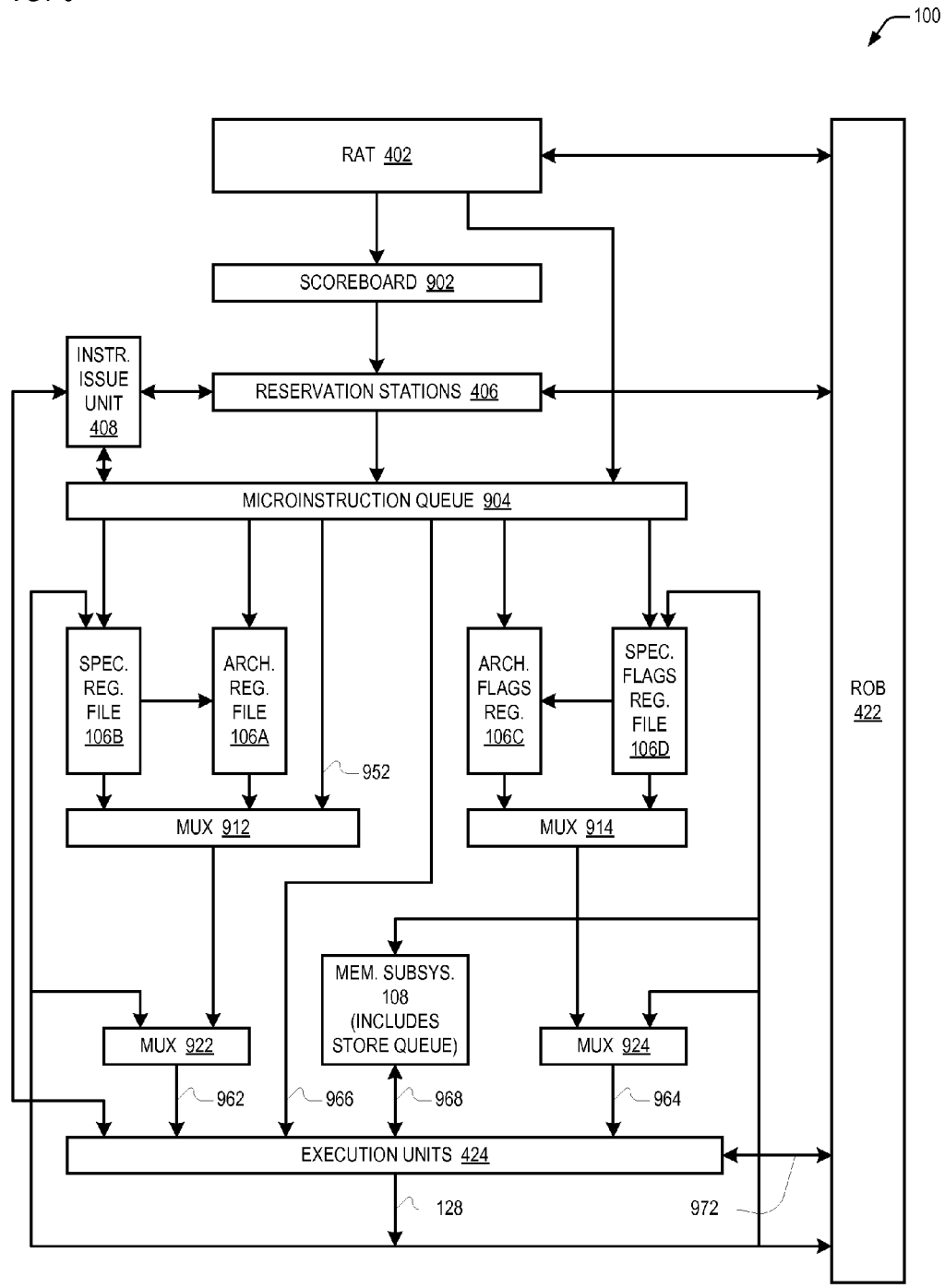
FIG. 9 is a block diagram illustrating in further detail portions of the microprocessor of FIG. 1, and particularly of the execution pipeline.

Referring now to FIG. 9, a block diagram illustrating in further detail portions of the microprocessor 100 of FIG. 1, and particularly of the execution pipeline 112, is shown. The RAT 402 of FIG. 4 is coupled to a scoreboard 902, a microinstruction queue 904 and ROB 422 of FIG. 4. The microinstruction queue 904 is part of the reservation stations 406 of FIG. 4. In FIG. 9, the reservation stations 406 are shown separately and are the portion of the reservation stations 406 of FIG. 4 that hold the ROB tags and register rename tags of source operands, as discussed below. The scoreboard 902 is coupled to the reservation stations 406. The reservation stations are coupled to the microinstruction queue 904, the RAT 402, and the instruction issue unit 408 of FIG. 4. The instruction issue unit 408 is also coupled to the microinstruction queue 904 and to the execution units 424 of FIG. 4. The memory subsystem 108 of FIG. 1 is coupled to the execution units 424 by a bus 968. The bus 968 enables transfers of data, addresses and control signals between the memory subsystem 108 and the execution units 424, such as store data written by the store unit 416 of FIG. 4 to the store queue of the memory subsystem 108. The microinstruction queue 904 provides microinstructions 126 to the execution units 424 via a bus 966. The ROB 422 is coupled to the execution units 424 by a bus 972. The bus 972 includes control signals between the ROB 422 and the execution units 424, such as microinstruction 126 execution status updates to the ROB 422.

The register files 106 of FIG. 1 are shown distinctly as: architectural register file 106A, speculative register file 106B, architectural flags register 106C, and speculative flags register file 106D. The register files 106 are coupled to the microinstruction queue 904 and execution units 424 of FIG. 4. The architectural register file 106A is also coupled to receive updates from the speculative register file 106B, and the architectural flags register 106C is coupled to receive updates from the speculative flags register file 106D. Each of a plurality of muxes 912 (a single mux 912 is shown in FIG. 9 for simplicity and clarity) receives on its inputs a source operand from a read port of the architectural register file 106A, a read port of the speculative register file 106B, and constant buses 952 coupled to the microinstruction queue 904. Each mux 912 selects for output an operand from one of the operand sources for provision as an input to a plurality of corresponding muxes 922 (a single mux 922 is shown in FIG. 9 for simplicity and clarity). Each of a plurality of muxes 914 (a single mux 914 is shown in FIG. 9 for simplicity and clarity) receives on its inputs condition flags from a read port of the architectural flags register 106C and a read port of the speculative flags register file 106D. Each mux 914 selects for output the condition flags from one of the sources for provision as an input to a plurality of corresponding muxes 924 (a single mux 924 is shown in FIG. 9 for simplicity and clarity). That is, although only one set of muxes 912 and 922 are shown, the microprocessor 100 includes a set of the muxes 912/922 for each source operand that may be provided to the execution units 424. Thus, in one embodiment, for example, there are six execution units 424 and the architectural register file 106A and/or speculative register file 106B can supply two source operands to each execution unit 424, so the microprocessor 100 includes twelve sets of the muxes 912/922, i.e., one for each source operand for each execution unit 424. Additionally, although only one set of muxes 914 and 924 are shown, the microprocessor 100 includes a set of the muxes 914/924 for each execution unit 424. In some embodiments, some of the execution units 424 do not receive the condition flags 964 and some of the execution units 424 are configured to receive less than two source operands from the architectural register file 106A and/or speculative register file 106B.

The architectural register file 106A holds architectural state of the general purpose registers of the microprocessor 100, such as the ARM and/or x86 ISA general purpose registers, as discussed above. The architectural register file 106A may also include non-ISA temporary registers that may be used by the instruction translator 104, such as by microcode of the complex instruction translator 206 of FIG. 2, but which are not specifiable by ISA instructions 124. In one embodiment, the microprocessor 100 includes an integer architectural register file and a separate media architectural register file both included in architectural register file 106A. In one embodiment, the integer architectural register file 106A includes three write ports and eight read ports (two read ports per four execution units 424 that read the integer architectural register file 106A), and the media architectural register file 106A includes three write ports and four read ports (two read ports per two execution units 424 that read the media architectural register file 106A). The architectural register file 106A is indexed by architectural register tags provided by the microinstruction queue 904, as described in more detail below.

The speculative register file 106B, also referred to as the ROB register file, includes a plurality of registers corresponding to the entries of the ROB 422. In one embodiment, the microprocessor 100 includes an integer speculative register file and a separate media speculative register file both included in speculative register file 106B. Each register of the speculative register file 106B is available to receive from an execution unit 424 a speculative (i.e., unretired to architectural state) result of a microinstruction 126 whose corresponding entry in the ROB 422 has been allocated by the RAT 402 to the microinstruction 126. When the microprocessor 100 retires a microinstruction 126, it copies its result from the speculative register file 106B to the appropriate register of the architectural register file 106A. In one embodiment, up to three microinstructions 126 may be retired per clock cycle. In one embodiment, the speculative register file 106B includes six write ports (one per each of six execution units 424) and fifteen read ports (two per each of six execution units 424 and three for retiring results to the architectural register file 106A). The speculative register file 106B is indexed by register rename tags provided by the microinstruction queue 904, as described in more detail below.

The architectural flags register 106C holds architectural state of the condition flags of the microprocessor 100, such as the ARM PSR and/or x86 EFLAGS registers, as discussed above. The architectural flags register 106C comprise storage locations for storing architectural state of the microprocessor 100 that may be affected by some of the instructions of the instruction set architecture. For example, in one embodiment, the architectural flags register 106C includes four state bits, namely: a negative (N) bit (set to 1 if the instruction result is negative), a zero (Z) bit (set to 1 if the instruction result is zero), a carry (C) bit (set to 1 if the instruction generates a carry), and an overflow (V) bit (set to 1 if the instruction results in an overflow condition), according to the ARM ISA. In the x86 instruction set architecture, the architectural flags register 106C comprises the bits of the well-known x86 EFLAGS registers. The conditional load/store instruction 124 specifies a condition upon which the memory load/store operation will be selectively performed depending upon whether the current value of the condition flags satisfies the condition. According to one embodiment compatible with the ARM ISA, the condition code field of a conditional load/store instruction 124 is specified in the upper four bits (i.e., bits [31:28]) to enable the coding of sixteen different possible values according to Table 1 below. With respect to the architecture version-dependent value (0b1111), the instruction is unpredictable according to one architecture version and is used to indicate an unconditional instruction extension space in other versions.

TABLE 1

| condition field value | mnemonic | meaning | condition flags value |
|---|---|---|---|
| 0000 | EQ | Equal | Z set |
| 0001 | NE | Not Equal | Z clear |
| 0010 | CS/HS | Carry set/unsigned higher or same | C set |
| 0011 | CC/LO | Carry clear/unsigned lower | C clear |
| 0100 | MI | Minus/negative | N set |
| 0101 | PL | Plus/positive or zero | N clear |
| 0110 | VS | Overflow | V set |
| 0111 | VC | No overflow | V clear |
| 1000 | HI | Unsigned higher | C set and Z clear |
| 1001 | LS | Unsigned lower or same | C clear or Z set |
| 1010 | GE | Signed greater than or equal | N set and V set, or N clear and V clear (N == V) |
| 1011 | LT | Signed less than | N set and V clear, or N clear and V set (N != V) |

TABLE 1-continued

| condition field value | mnemonic | meaning | condition flags value |
|---|---|---|---|
| 1100 | GT | Signed greater than | Z clear, and either N set and V set, or N clear and V clear (Z == 0, N == V) |
| 1101 | LE | Signed less than or equal | Z set, or N set and V clear, or N clear and V set (Z == 1 or N !– V) |
| 1110 | AL | Always (unconditional) | — |
| 1111 | — | Architecture version-dependent | — |

The speculative flags register file 106D, also referred to as the ROB flags file, includes a plurality of registers corresponding to the entries of the ROB 422. Each register of the speculative flags register file 106D is available to receive from an execution unit 424 a speculative (i.e., unretired to architectural state) condition flags result of a microinstruction 126 whose corresponding entry in the ROB 422 has been allocated by the RAT 402 to the microinstruction 126. When the microprocessor 100 retires a microinstruction 126, it copies its condition flags result from the speculative flags register file 106D to the architectural flags register 106C, if the microinstruction 126 is one that writs the condition flags. In one embodiment, the speculative flags register file 106D includes six write ports (one per each of six execution units 424) and seven read ports (one per each of six execution units 424 and one for retiring results to the architectural flags register 106C). The speculative flags register file 106D is indexed by register rename tags provided by the microinstruction queue 904, as described in more detail below.

The result bus 128 provides from each of the execution units 424 both a result value (such as a integer/floating point arithmetic operation result, Boolean operation result, shift/rotate operation result, media operation result, load/store data, and so forth) and a condition flags result. In one embodiment, not all execution units 424 generate and/or consume a condition flags result. Each of the plurality of muxes 922 receives on its other inputs source operands from the execution units 424 via the result bus 128 and selects for output an operand from one of the operand sources for provision as an input to a corresponding execution unit 424. Each of the plurality of muxes 924 receives on its other inputs condition flags from the execution units 424 via the result bus 128 and selects for output the condition flags from one of the sources for provision as an input to a corresponding execution unit 424. Additionally, the speculative register file 106B is written with execution unit 424 results via the result bus 128, and the speculative flags register file 106D is written with execution unit 424 condition flags results via the result bus 128. Preferably, each source operand input of each execution unit 424 is coupled to receive a source operand from a corresponding mux 922, which receives a source operand from a corresponding mux 912; similarly, the condition flags input of each execution unit 424 (that receives a condition flag) is coupled to receive condition flags from a corresponding mux 924, which receives condition flags from a corresponding mux 914.

The ROB 422, as discussed above, includes entries for holding information associated with microinstructions 126, including control/status information such as valid, complete, exception, and fused bits. As mentioned above, the speculative register file 106B holds the execution result for a corresponding microinstruction 126 and the speculative flags register file 106D holds the condition flags result for the corresponding microinstruction 126.

The RAT 402 outputs microinstructions 126 in program order. The ISA instructions 124 have an order in which they appear in the program. The instruction translator 104 translates an ISA instruction 124 into one or more microinstructions 126 in the order the ISA instructions 124 appear in the program, i.e., in program order. If an ISA instruction 124 is translated into more than one microinstruction 126, the microinstructions 126 have an order determined by the instruction translator 104. The program order of microinstructions 126 is such that the microinstructions 126 associated with a given ISA instruction 124 are maintained in the program order of the ISA instructions 124, and the microinstructions 126 associated with a given ISA instruction 124 are maintained in the order dictated by the instruction translator 104. As the RAT 402 receives microinstructions 126 from the instruction translator 104, it sequentially allocates ROB 422 entries for the microinstructions 126 in program order in a circular queue fashion. The ROB 422 is arranged as a circular queue of entries, and each entry has an index value, referred to as the ROB tag or ROB index. Thus, each microinstruction 126 has a ROB tag having a value that is the index of the ROB entry which the RAT 402 allocated for the microinstruction 126. When an execution unit 424 executes a microinstruction 126 it outputs the ROB tag of the microinstruction 126 along with the execution result. This enables the execution result to be written to the register in the speculative register file 106B specified by the ROB tag and the condition flags result (if produced) to be written to the register of the speculative flags register file 106D specified by the ROB tag. It also enables the instruction issue unit 408 to determine which execution results are available as source operands for dependent microinstructions 126. If the ROB 422 becomes full, the RAT 402 stalls from outputting microinstructions 126.

When the RAT 402 allocates an entry in the ROB 422 for a microinstruction 126, it provides the microinstruction 126 to the microinstruction queue 904. In one embodiment, the RAT 402 may provide up to three microinstructions 126 to the microinstruction queue 904 per clock cycle. In one embodiment, the microinstruction queue 904 includes three write ports (one for each of the microinstructions 126 the RAT 402 may output) and six read ports (one for each execution unit 424 result). Each microinstruction queue 904 entry holds information about each microinstruction 126, including two tag fields for each source operand: an architectural register tag and a rename register tag. The architectural register tag is used to index into the architectural register file 106A to cause the architectural register file 106A to produce the desired source operand. The architectural register tag is populated by the instruction translator 104 with a value from the ISA instruction 124 from which the microinstruction 126 was translated. The rename register tag is used to index into the speculative register file 106B and the speculative flags register file 106D. The rename register tag is empty when received from the instruction translator 104 and is populated by the RAT 402 when it performs register renaming. The RAT 402 maintains a rename table. When the RAT 402 receives a microinstruction 126 from the instruction translator 104, for each architectural source register specified by the microinstruction 126, the RAT 402 looks up the architectural source register tag value in the rename table to determine the ROB tag of the most recent in-order previous writer of the architectural source register and populates the rename register tag field with the ROB tag of the most recent in-order previous writer. The most recent in-order previous writer with respect to a given microinstruction A that specifies a source operand register Q is the microinstruction B that meets the following criteria: (1) microinstruction B is previous in program order to microinstruction A, i.e., is older than A in program order; (2) microinstruction B writes to register Q; and (3) microinstruction B is the most recent (i.e., newest in program order) microinstruction that satisfies (1) and (2). In this sense, the RAT 402 renames the architectural source register. In this manner, the RAT 402 creates a dependency of microinstruction A upon microinstruction B because the instruction issue unit 408 of FIG. 4 will not issue microinstruction A to an execution unit 424 for execution until all of the source operands of a microinstruction 126 are available. (In this example, microinstruction A is referred to as the dependent microinstruction.) When the instruction issue unit 408 snoops a ROB tag output by an execution unit 424 that matches the rename register tag of the source operand, the instruction issue unit 408 notes that the source operand is available. If the lookup of the architectural register tag in the rename table indicates there is no most recent in-order previous writer, then the RAT 402 does not generate a dependency (in one embodiment, if writes a predetermined value in the rename register tag to indicate no dependency), and the source operand will be obtained from the architectural register file 106A instead (using the architectural register tag).

A reservation station 406 is associated with each execution unit 424, as described above. A reservation station 406 holds the ROB tag of each microinstruction 126 waiting to be issued to its associated execution unit 424. Each reservation station 406 entry also holds the rename register tags of the source operands of the microinstruction 126. Each clock cycle, the instruction issue unit 408 snoops the ROB tags output by the execution units 424 to determine whether a microinstruction 126 is ready to be issued to an execution unit 424 for execution. In particular, the instruction issue unit 408 compares the snooped ROB tags with the rename register tags in the reservation stations 406. A microinstruction 126 in a reservation station 406 entry is ready to be issued when the execution unit 424 is available to execute it and all of its source operands are available. A source operand is available if it will be obtained from the architectural register file 106A because there is no dependency, or by the time the microinstruction 126 will reach the execution unit 424 the result of the most recent in-order previous writer indicated by the rename register tag will be available either from the forwarding result buses 128 or from the speculative register file 106B. If there are multiple ready microinstructions 126 in the reservation station 406, the instruction issue unit 408 picks the oldest microinstruction 126 to issue. In one embodiment, because it takes multiple clock cycles (in one embodiment, four) for a microinstruction 126 to reach the execution unit 424 once it leaves the reservation station 406, the instruction issue unit 408 looks ahead to see whether the ready conditions are met, i.e., whether the execution unit 424 and source operands will be available by the time the microinstruction 126 reaches the execution unit 424.

When the RAT 402 writes a microinstruction 126 to the microinstruction queue 904, the RAT 402 also writes, via the scoreboard 902, the ROB tag of the microinstruction 126 to the reservation station 406 associated with the execution unit 424 which will execute the microinstruction 126. The RAT 402 also writes the rename register tags to the reservation station 406 entry. When a microinstruction 126 in a reservation station 406 is ready to be issued to an execution unit 424, the reservation station 406 outputs the ROB tag of the ready microinstruction 126 to index into the microinstruction queue 904, which responsively outputs to the execution unit 424 the microinstruction 126 indexed by the ROB tag. The microinstruction queue 904 also outputs the rename register tags and architectural register tags to the register files 106, which responsively output to the execution unit 424 the source operands specified by the tags. Finally, the microinstruction queue 904 outputs other information related to the microinstruction 126, including constants on the constant buses 952. In one embodiment, the constants may include a 64-bit displacement value, a 64-bit next sequential instruction pointer value, and various arithmetic constants, such as a zero constant.

The scoreboard 902 is an array of bits, each bit corresponding to a ROB index, and therefore with the microinstruction 126 for which the corresponding ROB 422 entry was allocated. A scoreboard 902 bit is set when the RAT 402 writes the microinstruction 126 to the reservation station 406 as it passes through the scoreboard 902. A scoreboard 902 bit is cleared when the microinstruction 126 executes, or when it gets flushed because a branch instruction was mispredicted and is now being corrected. Thus, a set bit in the scoreboard 902 indicates the corresponding microinstruction 126 execution pipeline 112 but has not yet executed, i.e., it is waiting to be executed. When a microinstruction 126 passes through the scoreboard 902 on its way from the RAT 402 to the reservation station 406, the scoreboard 902 bits corresponding to the rename register tags are examined to determine whether the microinstruction(s) 126 on which the instant microinstruction depends (i.e., the most recent in-order previous writer) are waiting. If not, then the microinstruction 126 can be issued next cycle, assuming the execution unit 424 is available and there is not an older ready microinstruction 126 in the reservation station 406. It is noted that if the RAT 402 generated a dependency upon a most recent in-order previous writer, then the most recent in-order previous writer is either waiting or executed and unretired, since the RAT 402 will not generate a dependency upon a retired microinstruction 126.

Although an embodiment of an out-of-order execution pipeline 112 is shown in FIG. 9, it should be understood that other embodiments may be employed to within a microprocessor 100 to execute microinstructions 126 translated from conditional load/store instructions 124 in a manner similar to those described herein. For example, other structures may be employed to accomplish register renaming and out-of-order microinstruction 126 issue and execution.

Figure 10A:
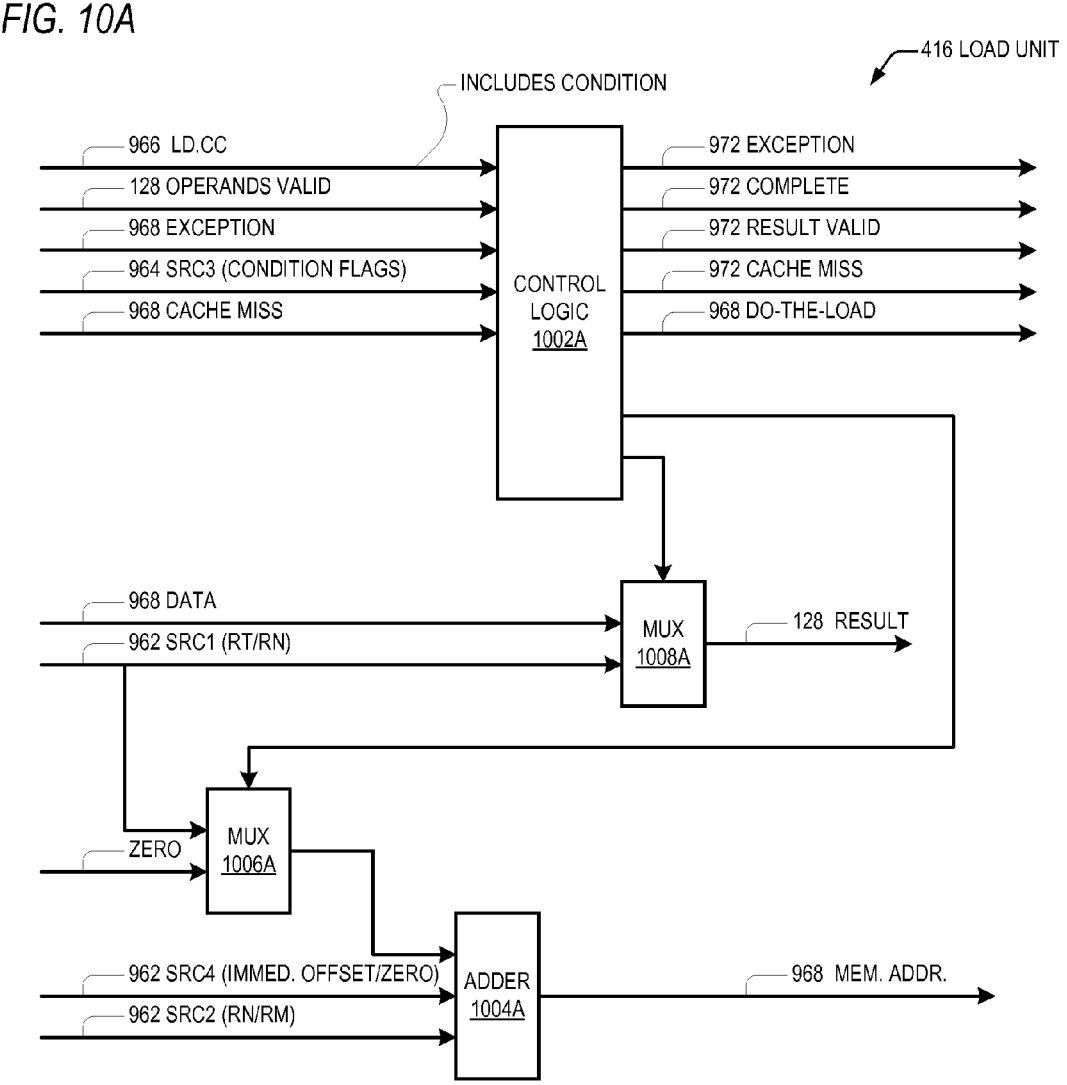
FIG. 10A is a block diagram illustrating in further detail the load unit of FIG. 9.

Referring now to FIG. 10A, a block diagram illustrating in further detail the load unit 416 of FIG. 9 is shown. The load unit 416 includes an adder 1004A and control logic 1002A coupled to control a first mux 1006A and a second mux 1008A. The control logic 1002A receives a microinstruction 126 on the bus 966 from the microinstruction queue 904. FIG. 10A shows a conditional load (LD.CC) microinstruction 126 (described in more detail below with respect to FIGS. 11, 12 and 19) being received by the control logic 1002A. More specifically, the LD.CC microinstruction 126 includes a condition, namely the condition specified by the conditional load instruction 124 from which the LD.CC microinstruction 126 was translated. The control logic 1002A decodes the microinstruction 126 in order to know how to execute it.

Figure 11:
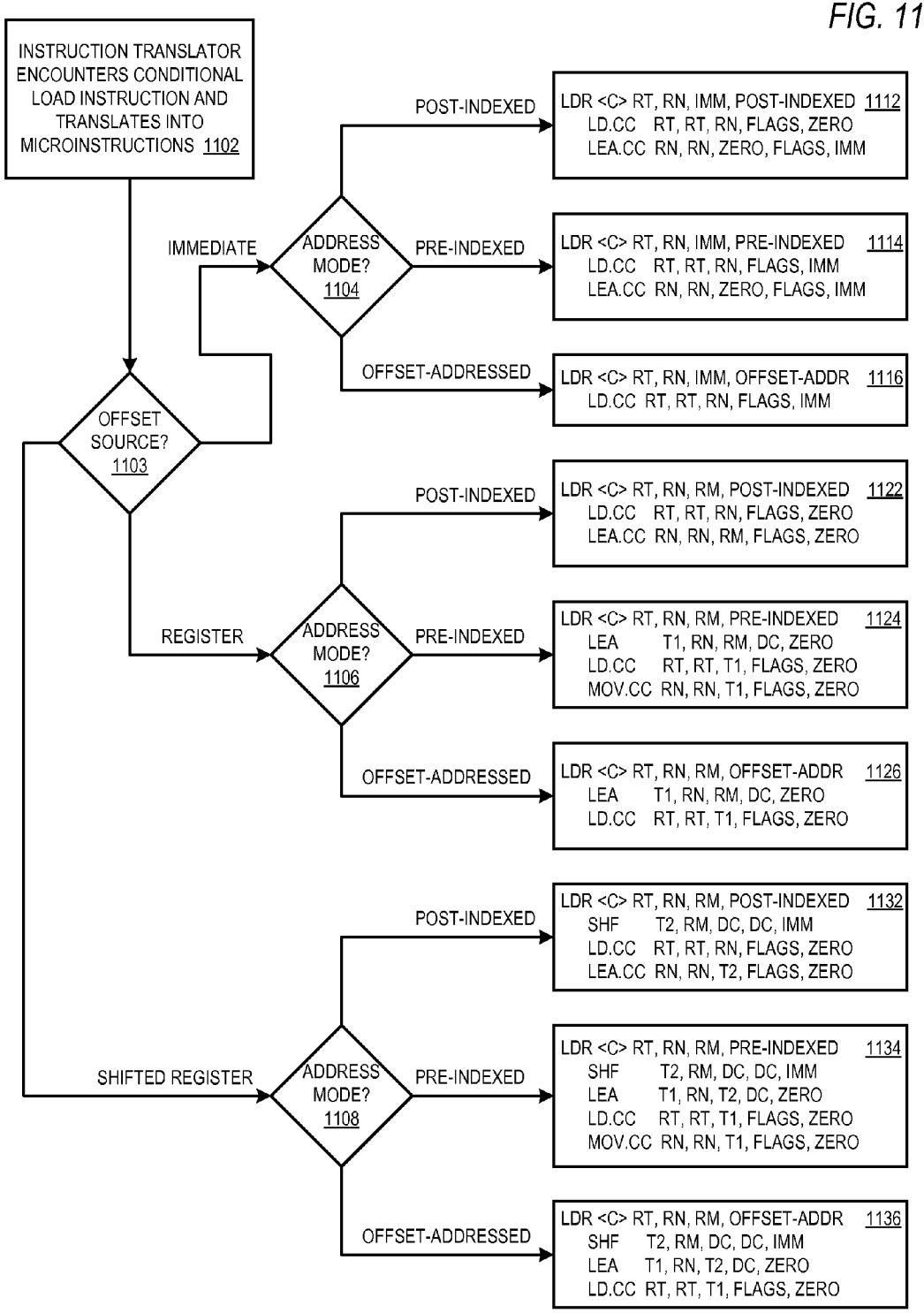
FIG. 11 is a flowchart illustrating operation of the instruction translator of the microprocessor of FIG. 9 to translate a conditional load instruction into microinstructions.
Figure 19:
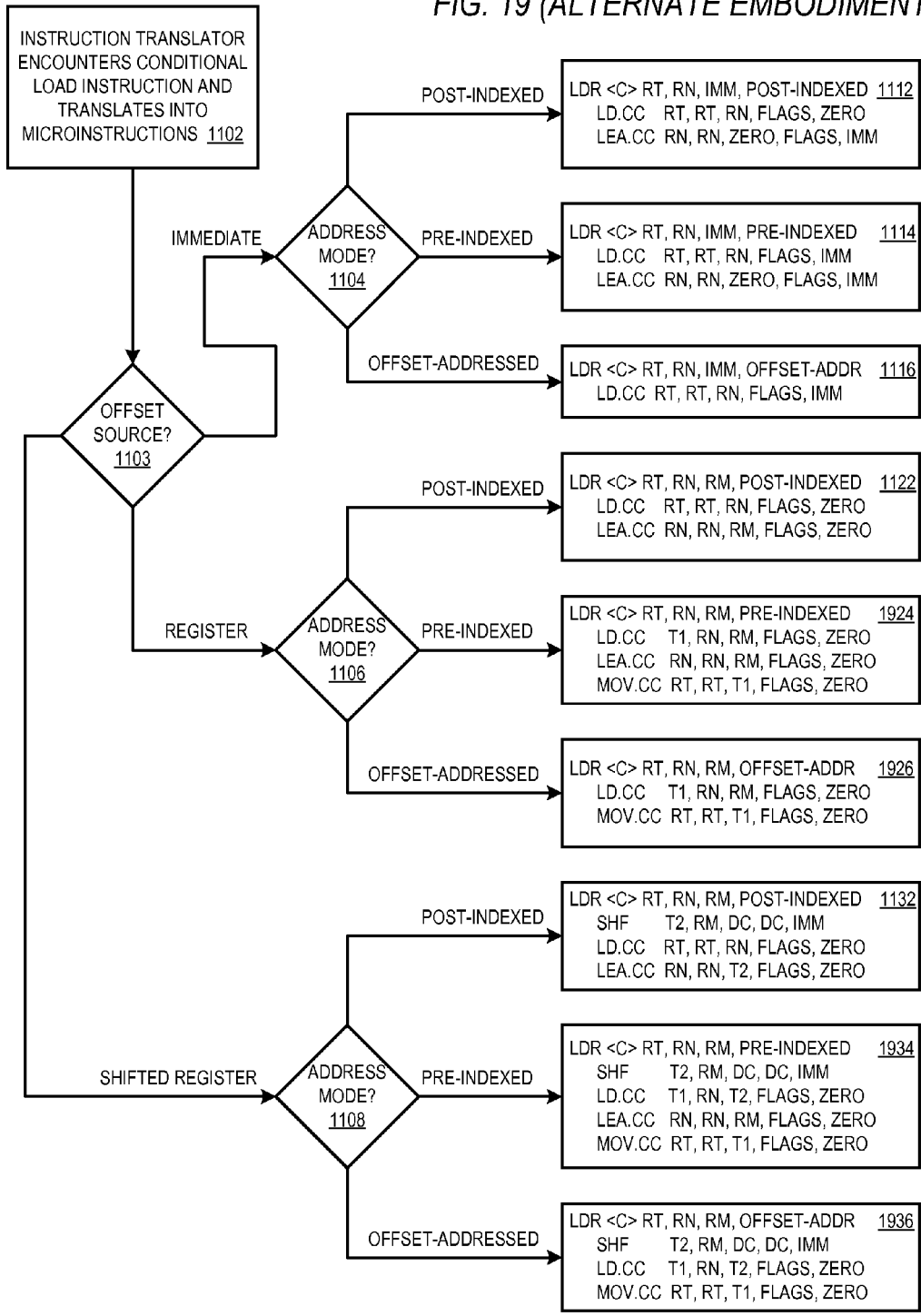
FIG. 19 is a flowchart illustrating operation of the instruction translator of the microprocessor of FIG. 9 to translate a conditional load instruction into microinstructions according to an alternate embodiment.

The adder 1004A adds three addends to generate a memory address provided via bus 968 to the memory subsystem 108. One addend is the second source operand of the microinstruction 126, which in the case of the LD.CC microinstructions of FIGS. 11 and 19 is the previous value of the base register (RN) or the offset register (RM), as described in detail below. A second addend is the fourth source operand of the microinstruction 126, which in the case of the LD.CC microinstructions of FIGS. 11 and 19 is an immediate offset constant or a zero value constant, as described in detail below. A third addend is the output of mux 1006A. Mux 1006A receives a zero constant input and the first source operand 962, which in the case of the LD.CC microinstructions of FIGS. 11 and 19 is the previous value of the destination register (RT) or the base register (RN), as described in detail below. For the embodiments of FIG. 11, the control logic 1002A controls mux 1006A to select the zero constant input. However, in the alternate embodiment of blocks 1924/1926/1934/1936 of FIG. 19, the LD.CC instruction instructs the load unit 416 to select the first source operand 962. In one embodiment, the adder 1004A includes a fourth input which is a segment descriptor value to support generation of addresses when the microprocessor 100 is operating in x86 mode.

The control logic 1002A also receives an operands valid signal from the execution units 424 via the result bus 128 that indicates whether the source operands received by the load unit 416 are valid. The control logic 1002A indicates to the ROB 422 via a result valid output of bus 972 whether the source operands are valid or invalid, as described below with respect to FIG. 12.

The control logic 1002A also receives an exception signal via the bus 968 from the memory subsystem 108 that indicates whether the microinstruction 126 caused an exception condition. The control logic 1002A may also detect an exception condition itself. The control logic 1002A indicates to the ROB 422 via bus 972 whether an exception condition exists, whether detected itself or indicated by the memory subsystem 108, as described below with respect to FIG. 12.

The control logic 1002A receives a cache miss indication via bus 968 from the memory subsystem 108 that indicates whether the load address missed in the data cache (not show) of the memory subsystem 108. The control logic 1002A indicates to the ROB 422 via bus 972 whether or not a cache miss occurred, as described below with respect to FIG. 12.

The control logic 1002A also receives the condition flags 964 as its third source operand. The control logic 1002A determines whether the condition flags satisfy the condition specified in the microinstruction 126, as described below with respect to FIG. 12. If so, the control logic 1002A instructs the memory subsystem 108 to load the data from memory via a do-the-load indication of bus 968. The load data is returned via bus 968 from the memory subsystem 108 to mux 1008A. Additionally, the control logic 1002A controls mux 1008A to select the data for provision on result bus 128. However, if the condition is not satisfied, the control logic 1002A controls mux 1008A to select for provision on result bus 128 the first source operand 962, which in the case of the LD.CC microinstructions of FIGS. 11 and 19 is the previous value of the destination register (RT) or the base register (RN), as described in detail below. Additionally, the control logic 1002A instructs the memory subsystem 108 via the do-the-load indication of bus 968 not to perform any architectural state-changing actions, since the condition is not satisfied, as described in more detail below.

Figure 10B:
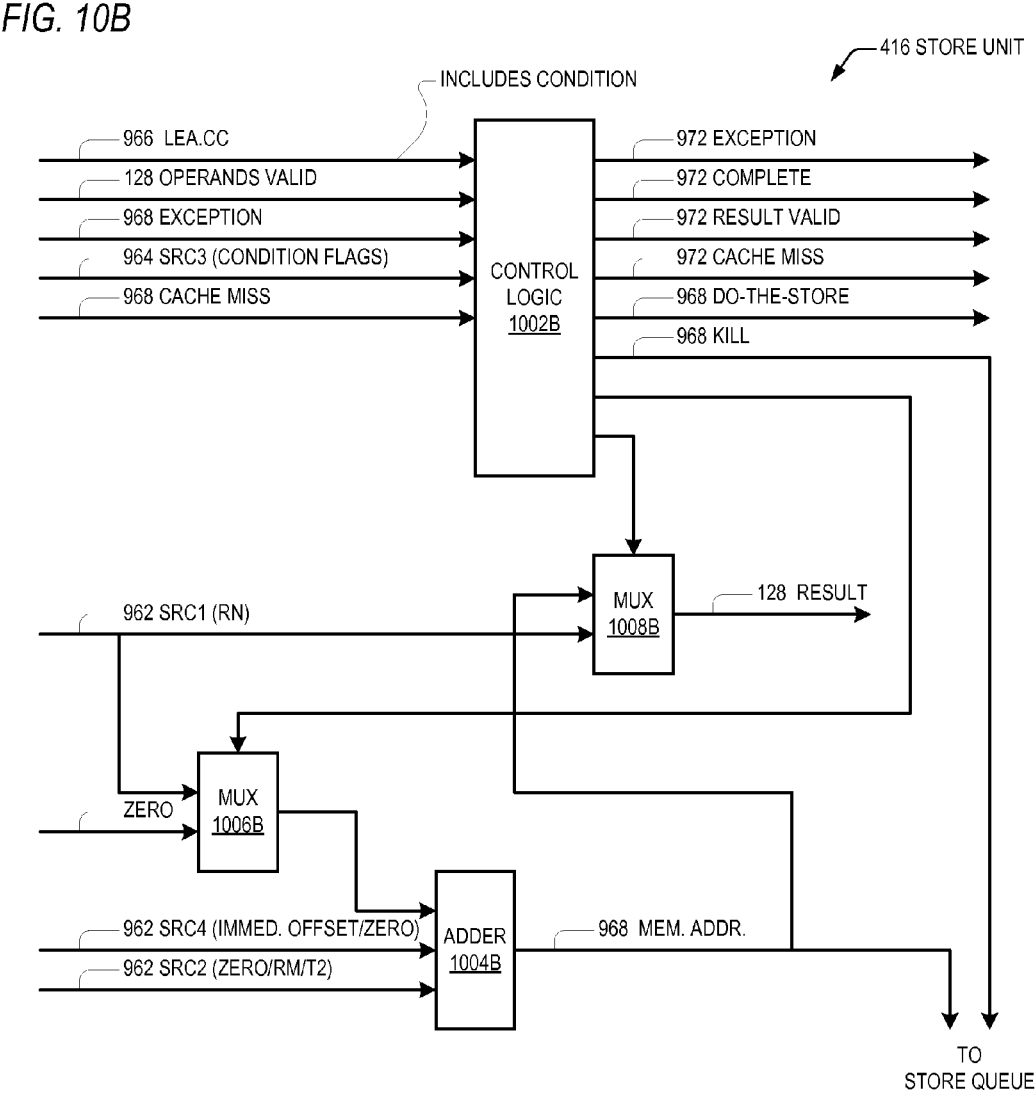
FIGS. 10B and 10D are block diagrams illustrating in further detail the store unit of FIG. 9.

Referring now to FIG. 10B, a block diagram illustrating in further detail the store unit 416 of FIG. 9 is shown. The store unit 416 includes many elements and signals similar to those described with respect to the load unit of FIG. 10A and are similarly numbered, although they may be indicated with a "B" rather than an "A" suffix.

FIG. 10B shows a conditional load effective address (LE-A.CC) microinstruction 126 (described in more detail below with respect to FIGS. 11, 13, 15, 19 and 20) being received by the control logic 1002B. The LEA.CC microinstruction 126 also includes a condition, namely the condition specified by the conditional load instruction 124 from which the LEA.CC microinstruction 126 was translated. The control logic 1002B decodes the microinstruction 126 in order to know how to execute it.

The adder 1004B adds three addends to generate a memory address provided via bus 968 to the memory subsystem 108, and more particularly, to a store queue entry thereof. One addend is the second source operand of the microinstruction 126, which in the case of the LEA.CC microinstructions of FIGS. 11, 15, 19 and 20 is a zero constant, the previous value of the offset register (RM), or a temporary register (T2), as described in detail below. A second addend is the fourth source operand of the microinstruction 126, which in the case of the LEA.CC microinstructions of FIGS. 11, 15, 19 and 20 is an immediate offset constant or a zero value constant, as described in detail below. A third addend is the output of mux 1006B. Mux 1006B receives a zero constant input and the first source operand 962, which in the case of the LEA.CC microinstructions of FIGS. 11, 15, 19 and 20 is the previous value of the base register (RN), as described in detail below. For the embodiments of FIGS. 11, 15, 19 and 20, the control logic 1002B controls mux 1006B to select the first source operand 962, i.e., the previous value of the base register (RN), when it decodes a LEA.CC.

The control logic 1002B also receives an operands valid signal from the execution units 424 via the result bus 128 that indicates whether the source operands received by the load unit 416 are valid. The control logic 1002B indicates to the ROB 422 via a result valid output of bus 972 whether the source operands are valid or invalid, as described below with respect to FIG. 13.

The control logic 1002B also receives an exception signal via the bus 968 from the memory subsystem 108 that indicates whether the microinstruction 126 caused an exception condition. The control logic 1002B may also detect an exception condition itself. The control logic 1002B indicates to the ROB 422 via bus 972 whether an exception condition exists, whether detected itself or indicated by the memory subsystem 108, as described below with respect to FIG. 16.

The control logic 1002B also receives the condition flags 964 as its third source operand. The control logic 1002B determines whether the condition flags satisfy the condition specified in the microinstruction 126, as described below with respect to FIG. 13. If so, the control logic 1002B controls mux 1008B to select the memory address 968 generated by the adder 1004B for provision on result bus 128. However, if the condition is not satisfied, the control logic 1002B controls mux 1008B to select for provision on result bus 128 the first source operand 962, which in the case of the LEA.CC microinstructions of FIGS. 11, 15, 19 and 20 is the previous value of the base register (RN), as described in detail below.

Figure 10C:
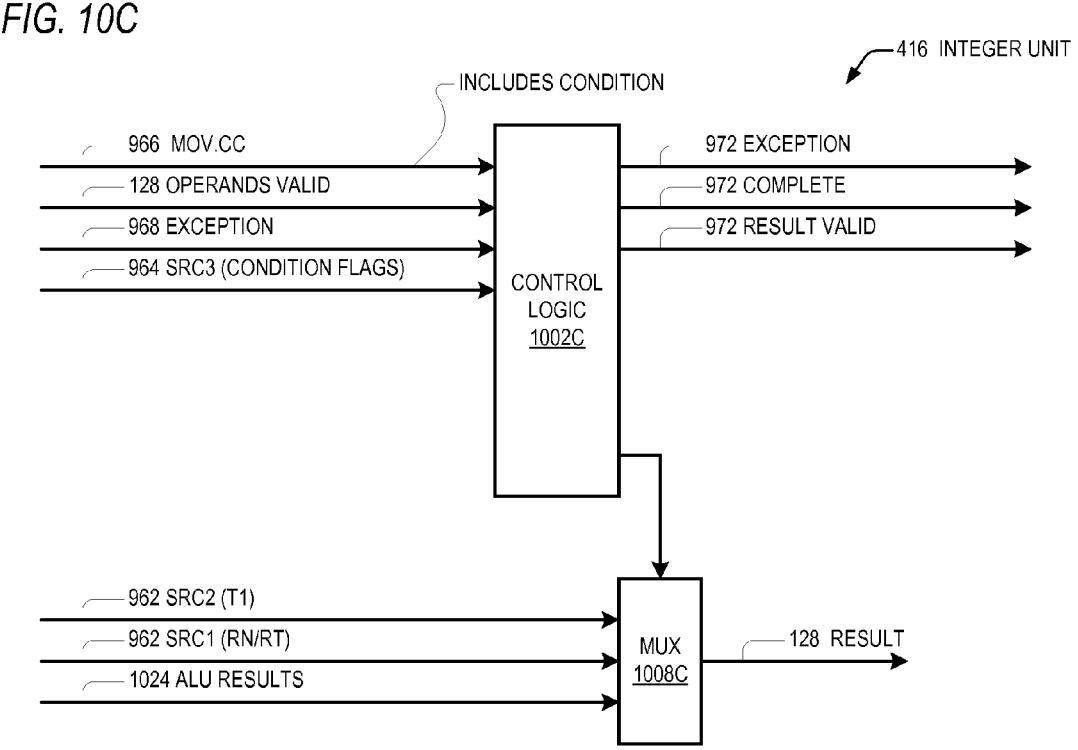
FIGS. 10C and 10E are block diagrams illustrating in further detail the integer unit of FIG. 9.

Referring now to FIG. 10C, a block diagram illustrating in further detail the integer unit 412 of FIG. 9 is shown. The integer unit 412 includes control logic 1002C coupled to control a mux 1008C. The control logic 1002C receives a microinstruction 126 on the bus 966 from the microinstruction queue 904. FIG. 10C shows a conditional move (MOV.CC) microinstruction 126 (described in more detail below with respect to FIGS. 11, 14, 15, 19 and 20) being received by the control logic 1002C. More specifically, the MOV.CC microinstruction 126 includes a condition, namely the condition specified by the conditional load instruction 124 from which the MOV.CC microinstruction 126 was translated. The control logic 1002C decodes the microinstruction 126 in order to know how to execute it.

The control logic 1002C also receives an operands valid signal from the execution units 424 via the result bus 128 that indicates whether the source operands received by the load unit 416 are valid. The control logic 1002C indicates to the ROB 422 via a result valid output of bus 972 whether the source operands are valid or invalid, as described below with respect to FIG. 14.

The control logic 1002C also receives an exception signal via the bus 968 from the memory subsystem 108 that indicates whether the microinstruction 126 caused an exception condition. The control logic 1002C may also detect an exception condition itself. The control logic 1002C indicates to the ROB 422 via bus 972 whether an exception condition exists, whether detected itself or indicated by the memory subsystem 108, as described below with respect to FIG. 14.

The mux 1008C receives as one input the second source operand of the microinstruction 126, which in the case of the MOV.CC microinstructions 126 of the embodiments of FIGS. 11, 15, 19 and 20, is a temporary register (T1). The mux 1008C receives as a second input the first source operand of the microinstruction 126, which in the case of the MOV.CC microinstructions 126 of the embodiments of FIGS. 11, 15, 19 and 20, is the previous value of the data register (RT) or the previous value of the base register value (RN). The mux 1008C receives as a third input, or preferably multiple other inputs, the outputs of various arithmetic logic units, which in the case of the MOV.CC microinstructions 126 of the embodiments of FIGS. 11, 15, 19 and 20, are not used.

The control logic 1002C also receives the condition flags 964 as its third source operand. The control logic 1002C determines whether the condition flags satisfy the condition specified in the microinstruction 126, as described below with respect to FIG. 14. If so, the control logic 1002C controls mux 1008C to select the second source operand for provision on result bus 128 which in the case of the MOV.CC microinstructions 126 of the embodiments of FIGS. 11, 15, 19 and 20, is a temporary register (T1); however, if the condition is not satisfied, the control logic 1002C controls mux 1008C to select for provision on result bus 128 the first source operand 962, which in the case of the MOV.CC microinstructions 126 of the embodiments of FIGS. 11, 15, 19 and 20, is the previous value of the data register (RT) or the previous value of the base register value (RN), as described with respect to FIG. 14.

Figure 10D:
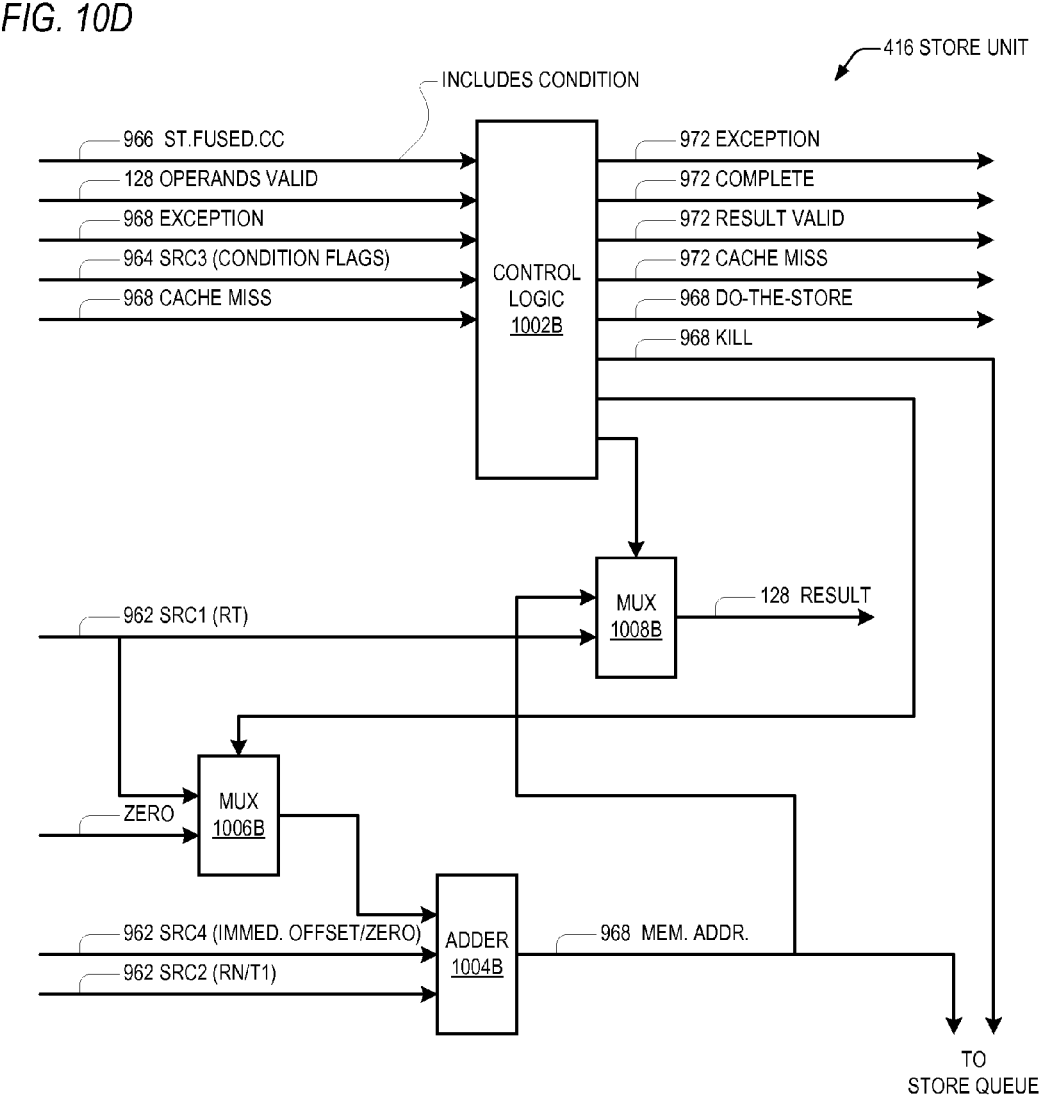

Referring now to FIG. 10D, a block diagram illustrating in further detail the store unit 416 of FIG. 9 is shown. The store unit 416 of FIG. 10D is the same as the store unit 416 of FIG. 10B; however, FIG. 10D illustrates operation of the store unit 416 when receiving a conditional store fused (ST.FUSED.CC) microinstruction 126, as shown, rather than when receiving a LEA. CC microinstruction 126.

Figure 15:
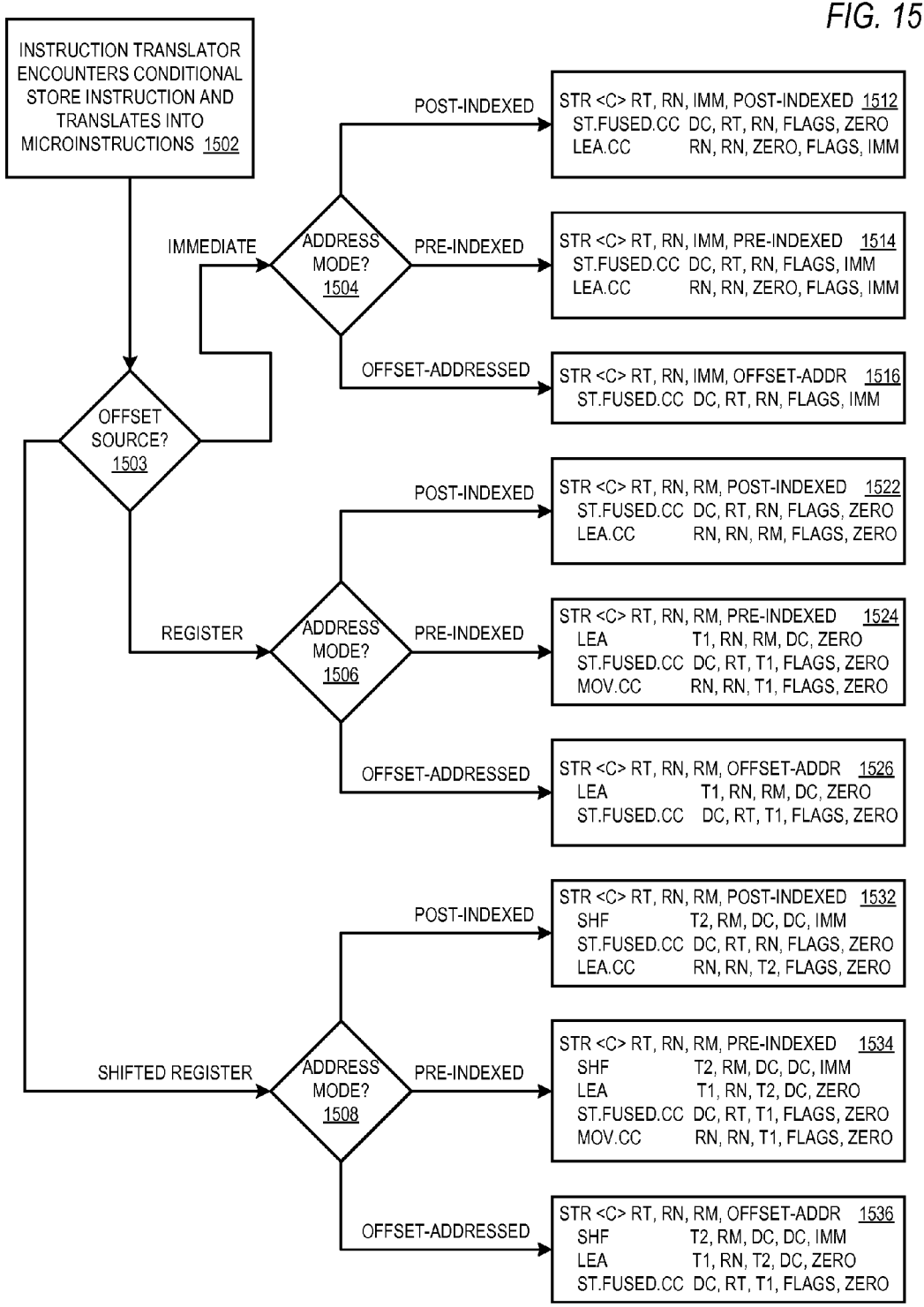
FIG. 15 is a flowchart illustrating operation of the instruction translator of the microprocessor of FIG. 9 to translate a conditional store instruction into microinstructions.
Figure 16:
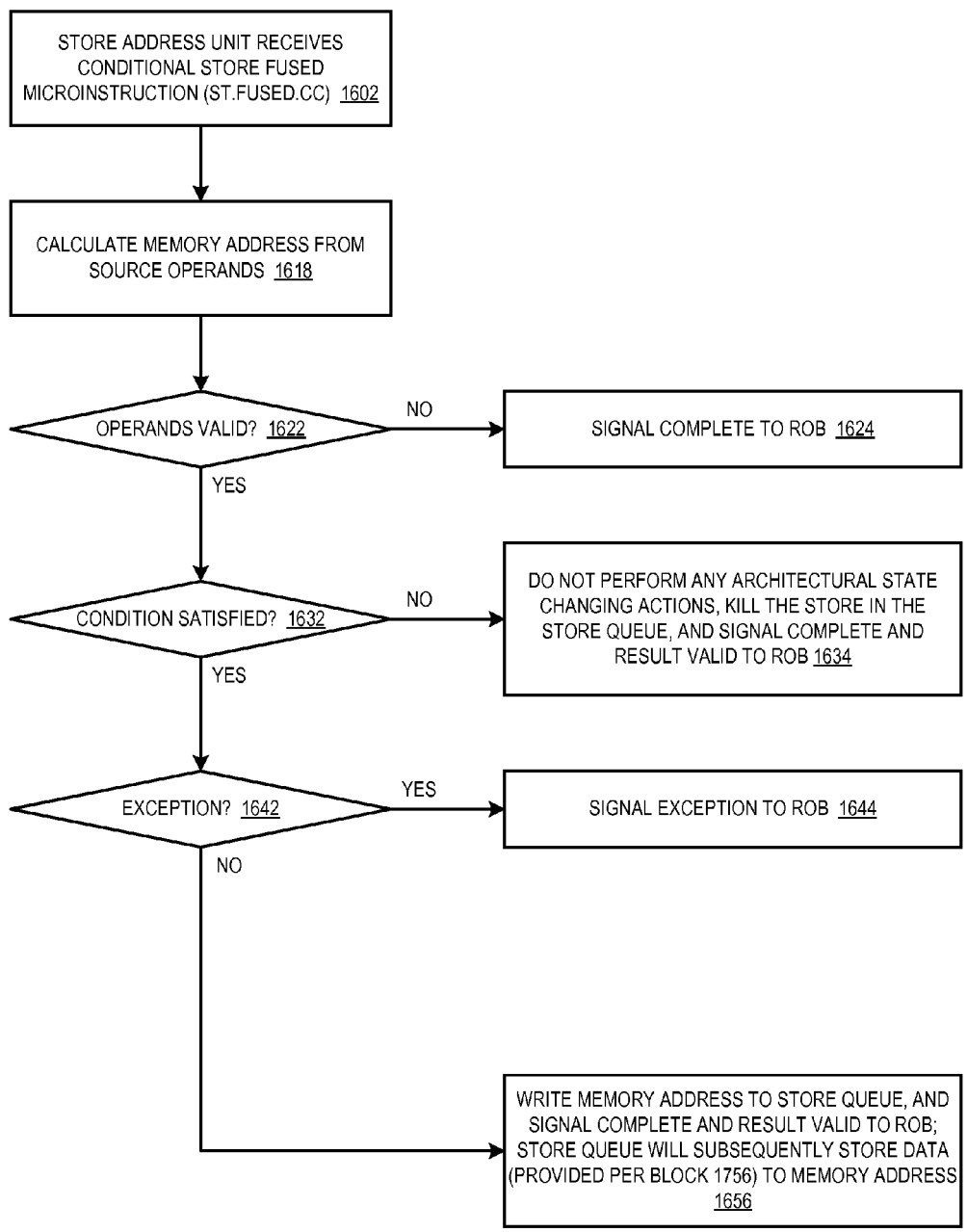
FIGS. 16 and 17 are flowcharts illustrating operation of the microprocessor of FIG. 9 to execute a conditional store fused microinstruction.

The adder 1004B adds three addends to generate a memory address provided via bus 968 to the memory subsystem 108, and more particularly, to a store queue entry thereof, as described in more detail with respect to FIGS. 15 and 16. One addend is the second source operand of the microinstruction 126, which in the case of the ST.FUSED.CC microinstructions of FIGS. 11, 15, 19 and 20 is the previous value of the base register (RN) or a temporary register (T1), as described in detail below. A second addend is the fourth source operand of the microinstruction 126, which in the case of the ST.FUSED.CC microinstructions of FIGS. 11, 15, 19 and 20 is an immediate offset constant or a zero value constant, as described in detail below. A third addend is the output of mux 1006B. Mux 1006B receives a zero constant input and the first source operand 962, which in the case of the ST.FUSED.CC microinstructions of FIGS. 11, 15, 19 and 20 is the previous value of the data register (RT), as described in detail below. For the embodiments of FIGS. 11, 15, 19 and 20, the control logic 1002B controls mux 1006B to select the zero constant input when it decodes a ST.FUSED.CC. In one embodiment, the adder 1004B includes a fourth input which is a segment descriptor value to support generation of addresses when the microprocessor 100 is operating in x86 mode.

The control logic 1002B also receives an operands valid signal from the execution units 424 via the result bus 128 that indicates whether the source operands received by the load unit 416 are valid. The control logic 1002B indicates to the ROB 422 via a result valid output of bus 972 whether the source operands are valid or invalid, as described below with respect to FIG. 16.

The control logic 1002B also receives an exception signal via the bus 968 from the memory subsystem 108 that indicates whether the microinstruction 126 caused an exception condition. The control logic 1002B may also detect an exception condition itself. The control logic 1002B indicates to the ROB 422 via bus 972 whether an exception condition exists, whether detected itself or indicated by the memory subsystem 108, as described below with respect to FIG. 16.

The control logic 1002B also receives the condition flags 964 as its third source operand. The control logic 1002B determines whether the condition flags satisfy the condition specified in the microinstruction 126, as described below with respect to FIG. 16. If so, the control logic 1002B generates a value on the do-the-store indication of bus 968 to the memory subsystem 108 to instruct it to write the memory address 968 to the store queue entry and to subsequently store to memory the data written by the store data portion of the ST.FUSED.CC microinstruction 126, as described below with respect to FIGS. 10E, 15 and 17. However, if the condition is not satisfied, the control logic 1002B instructs the memory subsystem 108 via the do-the-store indication 968 not to perform any architectural state-changing actions, since the condition is not satisfied, as described in more detail below. An alternate embodiment of the store unit 416 for executing a conditional store fused update (ST.FUSED.UPDATE.CC) microinstruction 126 is described with respect to FIG. 10F below.

Figure 10E:
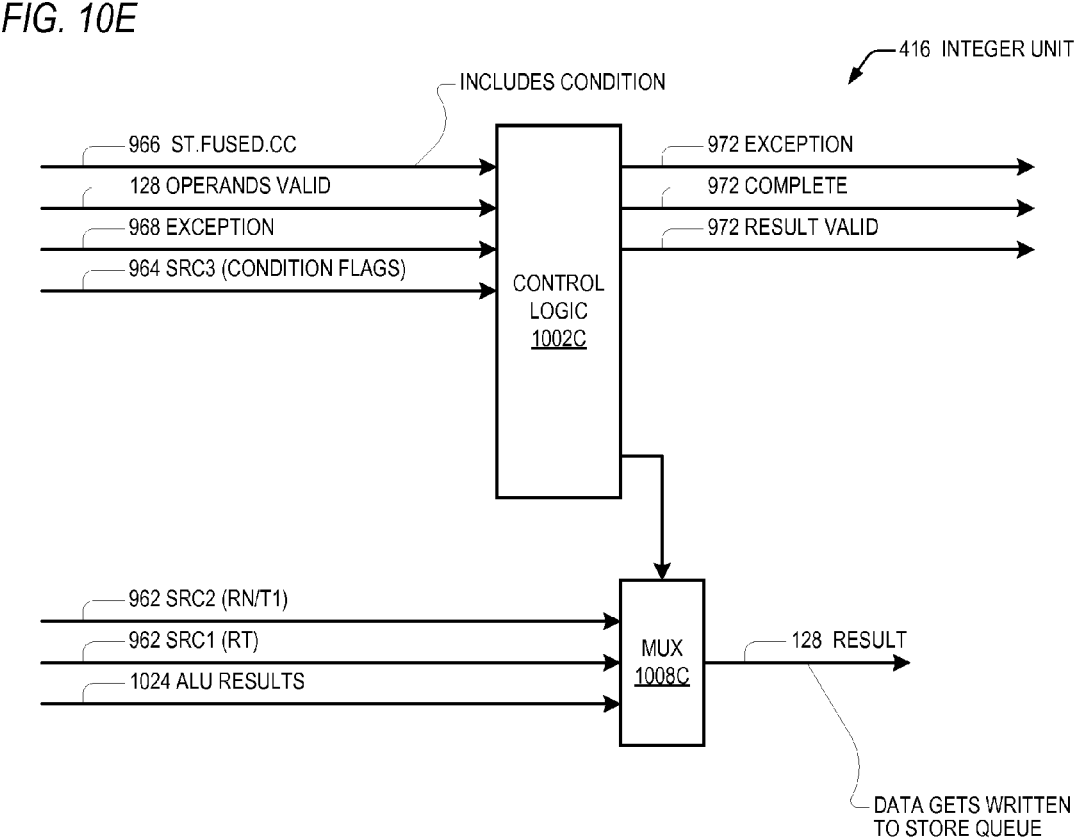
Figure 20:
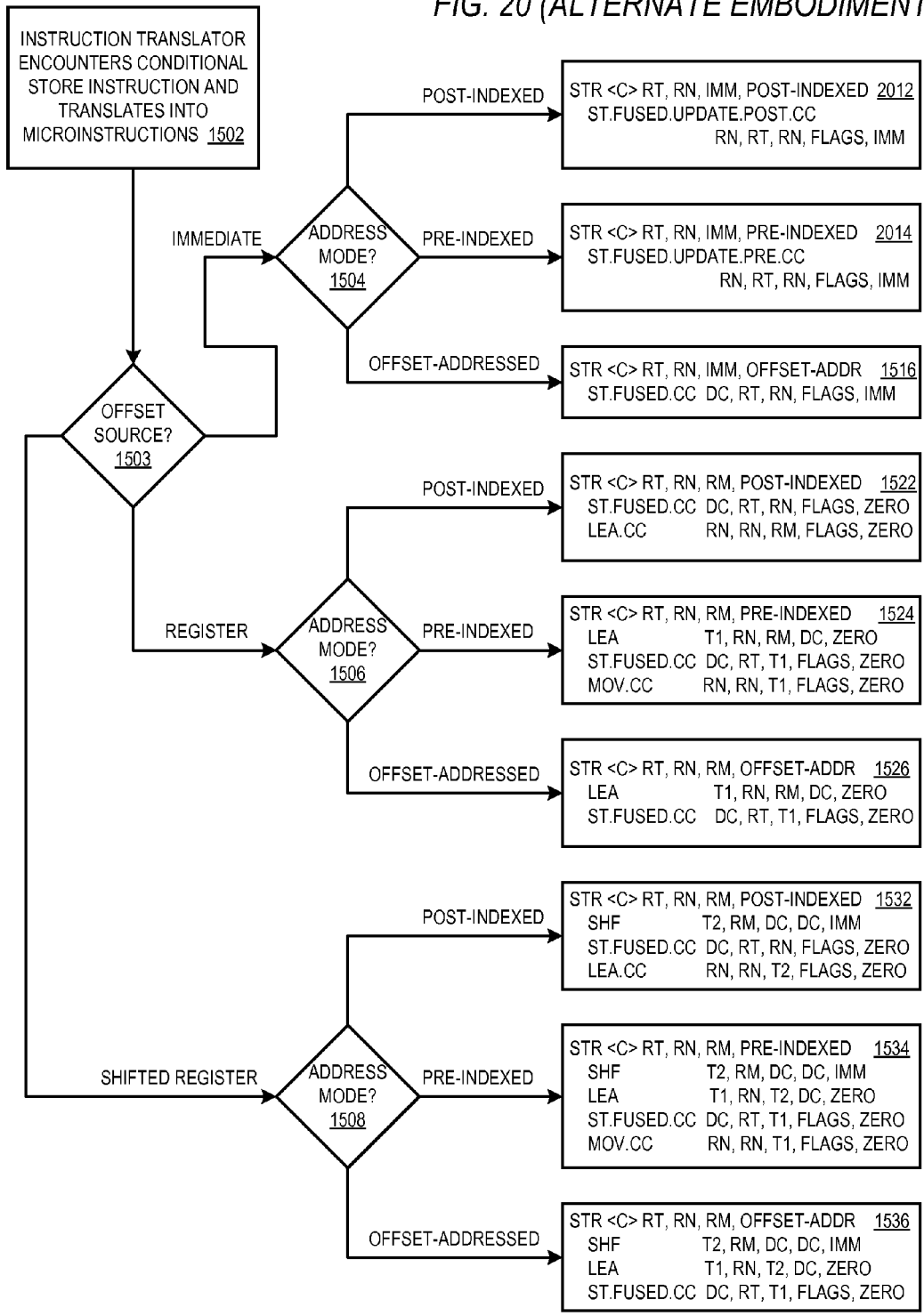
FIG. 20 is a flowchart illustrating operation of the instruction translator of the microprocessor of FIG. 9 to translate a conditional store instruction into microinstructions according to an alternate embodiment.

Referring now to FIG. 10E, a block diagram illustrating in further detail the integer unit 412 of FIG. 9 is shown. The integer unit 412 of FIG. 10E is the same as the integer unit 412 of FIG. 10C; however, FIG. 10E illustrates operation of the integer unit 412 when receiving a ST.FUSED.CC microinstruction 126, as shown, rather than when receiving a MOV.CC microinstruction 126. The ST.FUSED.CC microinstruction 126 is a single microinstruction 126 in the sense that it occupies only a single ROB 422 entry, reservation station 406 entry, instruction translator 104 slot, RAT 402 slot, and so forth. However, it is issued to two execution units 424, namely to both the store unit 416 (as described with respect to FIGS. 10D, 10E, 15, 16 and 17) and the integer unit 412. The store unit 416 executes the ST.FUSED.CC as a store address microinstruction 126, and the integer unit 412 executes the ST.FUSED.CC as a store data microinstruction 126. In this sense, the ST.FUSED.CC is two microinstructions 126 "fused" into a single microinstruction 126. The control logic 1002C, when it decodes a ST.FUSED.CC microinstruction 126, controls mux 1008C to select the first source 962 for provision on result bus 128, which in the case of the ST.FUSED.CC of FIGS. 15 and 20 is the data value from the data register (RT), as described in detail below with respect to FIGS. 15, 17 and 20. The data provided from the data register on the result bus 128 gets written to the store queue of the memory subsystem 108, as described with respect to FIG. 17.

Figure 10F:
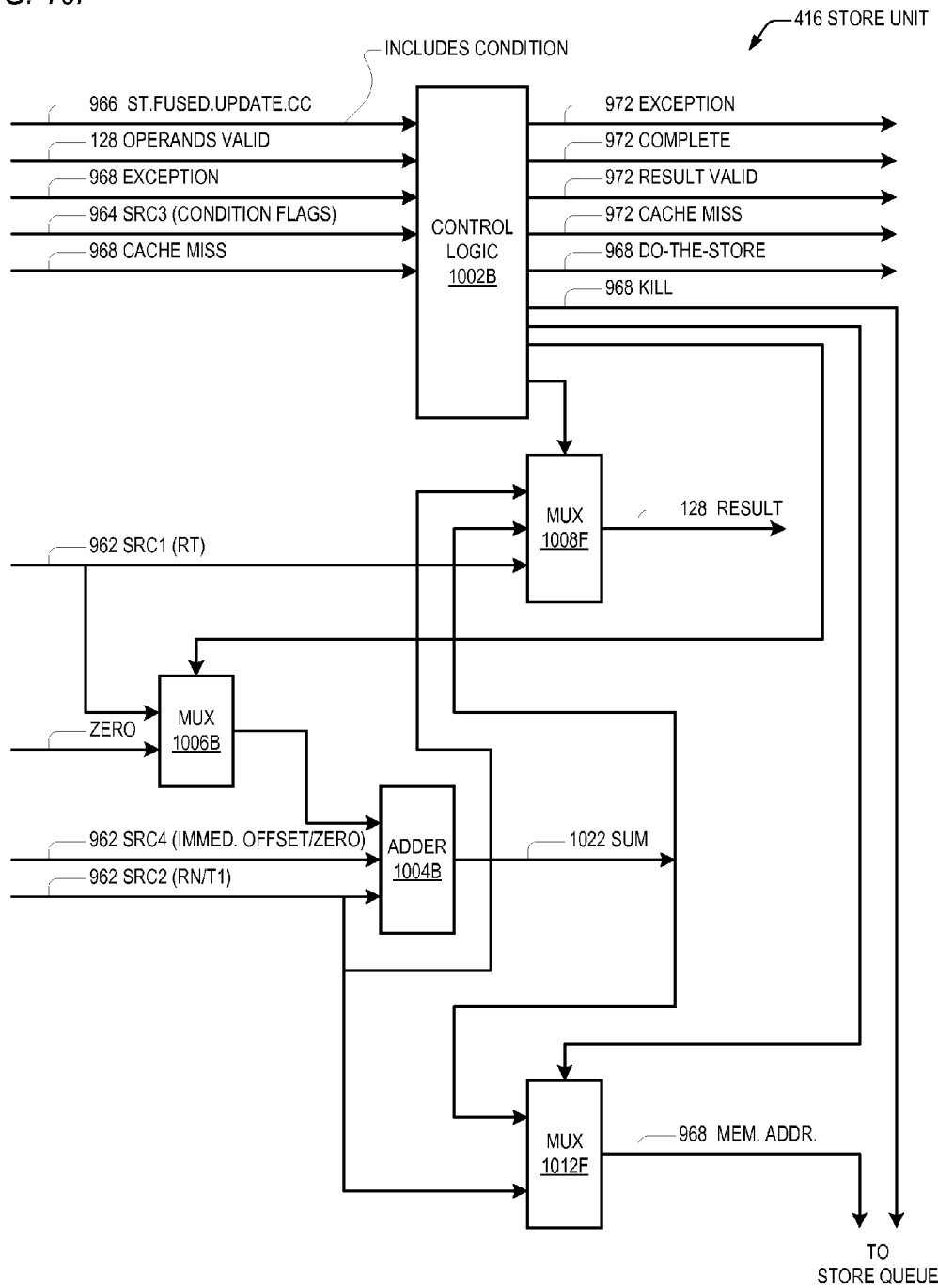
FIG. 10F is a block diagram illustrating in further detail the store unit of FIG. 9 according to an alternate embodiment.

Referring now to FIG. 10F, a block diagram illustrating in further detail the store unit 416 of FIG. 9 according to an alternate embodiment is shown. The store unit 416 of FIG. 10F is similar in many respects to the store unit 416 of FIG. 10D; however, FIG. 10F illustrates operation of the store unit 416 when receiving a conditional store fused update (ST.FUSED.UPDATE.CC) microinstruction 126, as shown, rather than when receiving a ST.FUSED.CC microinstruction 126. The ST.FUSED.UPDATE.CC microinstruction 126 writes an update value to the destination register (base register RN in the embodiment of blocks 2012 and 2014 of FIG. 20) and is described in more detail below with respect to FIGS. 20 and 21. Other differences between the store unit 416 of FIG. 10F and the store unit 416 of FIG. 10D are as follows.

The 2:1 mux 1008B of FIG. 10D is replaced with a 3:1 mux 1008F that receives as a third input the second source operand of the microinstruction 126, which in the case of the ST.FUSED.UPDATE.CC microinstruction of FIG. 20 is the previous value of the base register (RN), as described in detail below. A third mux 1012F receives the second source operand of the microinstruction 126 and the sum 1022 output of the adder 1004B. Depending upon whether the condition flags satisfy the condition specified in the microinstruction 126 and whether the ST.FUSED.UPDATE.CC microinstruction 126 is of the post-indexed or pre-indexed type (i.e., ST.FUSED.UPDATE.POST.CC of block 2012 of FIG. 20 or ST.FUSED.UPDATE.PRE.CC of block 2014 of FIG. 20, respectively) of FIG. 20, the control logic 1002B controls muxes 1008F and 1012F according to Table 2 below, and as described below with respect to FIGS. 20 and 21.

TABLE 2

| POST or PRE? | condition satisfied? | result 128 | memory address 968 |
|---|---|---|---|
| PRE | YES | sum (RN + immediate offset) | sum (RN + immediate offset) |
| PRE | NO | second source (RN) | sum (RN + immediate offset) |
| POST | YES | sum (RN + immediate offset) | second source (RN) |
| POST | NO | second source (RN) | second source (RN) |

Referring now to FIG. 11, a flowchart illustrating operation of the instruction translator 104 of the microprocessor 100 of FIG. 9 to translate a conditional load instruction 124 into microinstructions 126 is shown. Flow begins at block 1102.

At block 1102, the instruction translator 104 encounters a conditional load instruction 124 and translates it into one or more microinstructions 126 as described with respect to blocks 1112 through 1136 depending upon characteristics of the conditional load instruction 124. The conditional load instruction 124 specifies a condition (denoted <C> in FIG. 11) upon which data will be loaded from a memory address into an architectural destination register if the condition flags satisfy the condition. In the examples of FIG. 11, the destination register is denoted "RT." The conditional load instruction 124 also specifies an architectural base register and an offset. The base register holds a base address. In the examples of FIG. 11, the base register is denoted "RN." The offset may be one of three sources: (1) an immediate value specified by the conditional load instruction 124; (2) a value held in an architectural offset register; or (3) a value held in an offset register shifted by an immediate value specified by the conditional load instruction 124. In the examples of FIG. 11, the offset register is denoted "RM." One of the characteristics specified by the conditional load instruction 124 is an address mode. The address mode specifies how to compute the memory address from which the data will be loaded. In the embodiment of FIG. 11, three addressing modes are possible: post-indexed, pre-index, and offset-addressed. In the post-indexed address mode, the memory address is simply the base address, and the base register is updated with the sum of the base address and the offset. In the pre-indexed address mode, the memory address is the sum of the base address and the offset, and the base register is updated with the sum of the base address and the offset. In the indexed address mode, the memory address is the sum of the base address and the offset, and the base register is not updated. It is noted that the conditional load instruction 124 may specify a difference of the base address and offset rather than a sum. In such cases, the instruction translator 104 may emit slightly different microinstructions 126 than when the conditional load instruction 124 specifies a sum. For example, in the case of an immediate offset generated by the instruction translator 104, it may be inverted. Flow proceeds to decision block 1103.

At decision block 1103, the instruction translator 104 determines whether the source of the offset is an immediate value, a register value, or a shifted register value. If an immediate value, flow proceeds to decision block 1104; if a register value, flow proceeds to decision block 1106; if a shifted register value, flow proceeds to decision block 1108.

At decision block 1104, the instruction translator 104 determines whether the address mode is post-indexed, pre-indexed, or offset-addressed. If post-indexed, flow proceeds to block 1112; if pre-indexed, flow proceeds to block 1114; if offset-addressed, flow proceeds to block 1116.

At decision block 1106, the instruction translator 104 determines whether the address mode is post-indexed, pre-indexed, or offset-addressed. If post-indexed, flow proceeds to block 1122; if pre-indexed, flow proceeds to block 1124; if offset-addressed, flow proceeds to block 1126.

At decision block 1108, the instruction translator 104 determines whether the address mode is post-indexed, pre-indexed, or offset-addressed. If post-indexed, flow proceeds to block 1132; if pre-indexed, flow proceeds to block 1134; if offset-addressed, flow proceeds to block 1136.

At block 1112, the instruction translator 104 translates the immediate offset post-indexed conditional load instruction 124 into two microinstructions 126: a conditional load microinstruction 126 (LD.CC) and a conditional load effective address microinstruction 126 (LEA.CC). Each of the microinstructions 126 includes the condition specified by the conditional load instruction 124. The LD.CC specifies: (1) RT, the architectural register 106A that was specified as the destination register of the conditional load instruction 124, as its destination register; (2) RT as a source operand 962; (3) RN, the architectural register 106A that was specified as the base register of the conditional load instruction 124, as a source operand 962; (4) the condition flags 964 as a source operand; and (5) a zero constant 952 as a source operand 962. The execution of the LD.CC microinstruction 126 is described in detail with respect to FIG. 12. The LEA.CC specifies: (1) RN, the architectural register 106A that was specified as the base register of the conditional load instruction 124, as its destination register; (2) RN as a source operand 962; (3) a zero constant 952 as a source operand 962; (4) the condition flags 964 as a source operand; and (5) the immediate constant 952 specified by the conditional load instruction 124 as a source operand 962. The execution of the LEA.CC microinstruction 126 is described in detail with respect to FIG. 13. It is noted that if the LD.CC causes an exception (e.g., page fault), then the LEA.CC result will not be retired to architectural state to update the base register (RN), even though the result may be written to the speculative register file 106B.

At block 1114, the instruction translator 104 translates the immediate offset pre-indexed conditional load instruction 124 into two microinstructions 126: a conditional load microinstruction 126 (LD.CC) and a conditional load effective address microinstruction 126 (LEA.CC), similar to those described with respect to block 1112. However, the LD.CC of block 1114 specifies the immediate constant 952 specified by the conditional load instruction 124 as a source operand 962, in contrast to the LD.CC of block 1112 which specifies a zero constant 952 as the source operand 962. Consequently, the calculated memory address from which the data will be loaded is the sum of the base address and the offset, as described in more detail with respect to FIG. 12.

At block 1116, the instruction translator 104 translates the immediate offset offset-addressed indexed conditional load instruction 124 into a single microinstruction 126: a conditional load microinstruction 126 (LD.CC) similar to the LD.CC described with respect to block 1114. The LEA.CC of blocks 1112 and 1114 is not needed because the offset-addressed addressing mode does not call for updating the base register.

At block 1122, the instruction translator 104 translates the register offset post-indexed conditional load instruction 124 into two microinstructions 126: a conditional load microinstruction 126 (LD.CC) and a conditional load effective address microinstruction 126 (LEA.CC). Each of the microinstructions 126 includes the condition specified by the conditional load instruction 124. The LD.CC is the same as that described with respect to block 1112. The LEA.CC specifies: (1) RN, the architectural register 106A that was specified as the base register of the conditional load instruction 124, as its destination register; (2) RN as a source operand 962; (3) RM, the architectural register 106A that was specified as the offset register of the conditional load instruction 124, as a source operand 962; (4) the condition flags 964 as a source operand; and (5) a zero constant 952 as the source operand 962. That is, the LEA.CC of block 1122 is similar to that of block 1112, except that it specifies RM as a source register rather than a zero constant as its second source operand, and it specifies a zero constant rather than the immediate constant as its fourth source operand. Consequently, the calculated update base address is the sum of the base address and the register offset from RM, as described with respect to FIG. 13.

At block 1124, the instruction translator 104 translates the register offset pre-indexed conditional load instruction 124 into three microinstructions 126: an unconditional load effective address microinstruction 126 (LEA), a conditional load microinstruction 126 (LD.CC), and a conditional move microinstruction 126 (MOV.CC). The LD.CC and MOV.CC microinstructions 126 include the condition specified by the conditional load instruction 124. The LEA specifies: (1) T1, a temporary register 106, as its destination register; (2) RN, the architectural register 106A that was specified as the base register of the conditional load instruction 124, as a source operand 962; (3) RM, the architectural register 106A that was specified as the offset register of the conditional load instruction 124, as a source operand 962; (4) a don't care (DC) as the third source operand (because the LEA is unconditional and therefore does not require the condition flags 964 as a source operand); and (5) a zero constant 952 as a source operand 962. The execution of the LEA microinstruction 126 is similar to the execution of the LEA.CC except that it is unconditional, as described with respect to FIG. 13. The LD.CC specifies: (1) RT, the architectural register 106A that was specified as the destination register of the conditional load instruction 124, as its destination register; (2) RT as a source operand 962; (3) T1, the temporary register 106A that is the destination register of the LEA, as a source operand 962; (4) the condition flags 964 as a source operand; and (5) a zero constant 952 as a source operand 962. That is, the LD.CC of block 1124 is similar to that of block 1122; however, the LD.CC of block 1124 specifies T1 (destination register of the LEA) as a source operand 962, in contrast to the LD.CC of block 1122 which specifies RN (base register) as the source operand 962. Consequently, the calculated memory address from which the data will be loaded is the sum of the base address and the register offset. The MOV.CC specifies: (1) RN, the architectural register 106A that was specified as the base register of the conditional load instruction 124, as its destination register; (2) RN as a source operand 962; (3) T1, the temporary register 106A that is the destination register of the LEA, as a source operand 962; (4) the condition flags 964 as a source operand; and (5) a zero constant 952 as the source operand 962. Thus, the MOV.CC causes the base register to be updated with the sum of the base address and the register offset (T1 from the LEA). It is noted that if the LD.CC causes an exception (e.g., page fault), then the MOV.CC result will not be retired to architectural state to update the base register (RN), even though the result may be written to the speculative register file 106B.

At block 1126, the instruction translator 104 translates the register offset offset-addressed conditional load instruction 124 into two microinstructions 126: an unconditional load effective address microinstruction 126 (LEA) and a conditional load microinstruction 126 (LD.CC), which are the same as the LEA and LD.CC of block 1124. It is noted that the MOV.CC microinstruction 126 is not needed because the offset-addressed addressing mode does not call for updating the base register.

At block 1132, the instruction translator 104 translates the shifted register offset post-indexed conditional load instruction 124 into three microinstructions 126: a shift microinstruction 126 (SHF), a conditional load microinstruction 126 (LD.CC), and a conditional load effective address microinstruction 126 (LEA.CC). The SHF specifies: (1) T2, a temporary register 106, as its destination register; (2) RM, the architectural register 106A that was specified as the offset register of the conditional load instruction 124, as a source operand 962; (3) a don't care (DC) as the second source operand; (4) a don't care (DC) as the third source operand (because the SHF is unconditional and therefore does not require the condition flags 964 as a source operand); and (5) the immediate constant 952 specified by the conditional store instruction 124 as a source operand 962, which specifies the amount the value in RM is to be shifted to generate the shifted register offset. The LD.CC is the same as that described with respect to block 1112. The LEA.CC specifies: (1) RN, the architectural register 106A that was specified as the base register of the conditional load instruction 124, as its destination register; (2) RN as a source operand 962; (3) T2, the temporary register 106A that is the destination register of the SHF, as a source operand 962; (4) the condition flags 964 as a source operand; and (5) a zero constant 952 as a source operand 962. That is, the LEA.CC of block 1132 is similar to that of block 1122, except that it specifies T2 as a source register rather than RM as its second source operand. Consequently, the calculated update base address is the sum of the base address and the shifted register offset.

At block 1134, the instruction translator 104 translates the shifted register offset pre-indexed conditional load instruction 124 into four microinstructions 126: a shift microinstruction 126 (SHF), an unconditional load effective address microinstruction 126 (LEA), a conditional load microinstruction 126 (LD.CC), and a conditional move microinstruction 126 (MOV.CC). The SHF is the same as that of block 1132, and the LD.CC and MOV.CC are the same as those of block 1124. The LEA is the same as that of block 1124, except that it specifies T2, the temporary register 106A that is the destination register of the SHF, as its second source operand 962. Consequently, the memory address from which the data is loaded and the updated base address value is the sum of the base address and the shifted register offset.

At block 1136, the instruction translator 104 translates the shifted register offset offset-addressed conditional load instruction 124 into three microinstructions 126: a shift microinstruction 126 (SHF), an unconditional load effective address microinstruction 126 (LEA), and a conditional load microinstruction 126 (LD.CC), which are the same as the SHF, LEA and LD.CC of block 1134. It is noted that the MOV.CC microinstruction 126 is not needed because the offset-addressed addressing mode does not call for updating the base register.

It is noted that the instruction translator 104 emits the SHF, LEA, LD.CC, LEA.CC, MOV.CC microinstructions 126 of FIG. 11, and the ST.FUSED.CC microinstructions 126 (of FIG. 15) such that they do not update the condition flags.

As described above, the hardware instruction translator 104 emits the microinstructions 126 in-order. That is, the hardware instruction translator 104 translates the ISA instructions 124 in the order they appear in the ISA program, such that the groups of microinstructions 126 emitted from the translations of corresponding ISA instructions 124 are emitted in the order the corresponding ISA program instructions 124 appear in the ISA program. Furthermore, the microinstructions 126 within a group have an order. In FIG. 11 (and FIGS. 15, 19 and 20), within a given block of the flowchart, the microinstructions 126 are emitted by the hardware instruction translator 104 in the order shown. For example, in block 1112, the LD.CC microinstruction 126 precedes the LEA.CC microinstruction 126. Still further, the RAT 402 allocates entries in the ROB 422 for the microinstructions 126 in the order they are emitted by the hardware instruction translator 104. Consequently, the microinstructions 126 within a group emitted from the translation of an ISA instruction 124 are retired in the order they are emitted by the hardware instruction translator 104. However, advantageously the execution pipeline 112 executes the microinstructions 126 out-of-order, i.e., in a different order than the order they are emitted by the hardware instruction translator 104, to the extent permitted by the dependencies of given microinstructions 126 upon other microinstructions 126. A beneficial side effect of the in-order retirement of microinstructions 126 is that if a first microinstruction 126 that precedes a second microinstruction 126 causes an exception condition, the result of the second microinstruction 126 will not be retired to architectural state, e.g., to the architectural general purpose registers 106A or the architectural flags register 106C.

Figure 12:
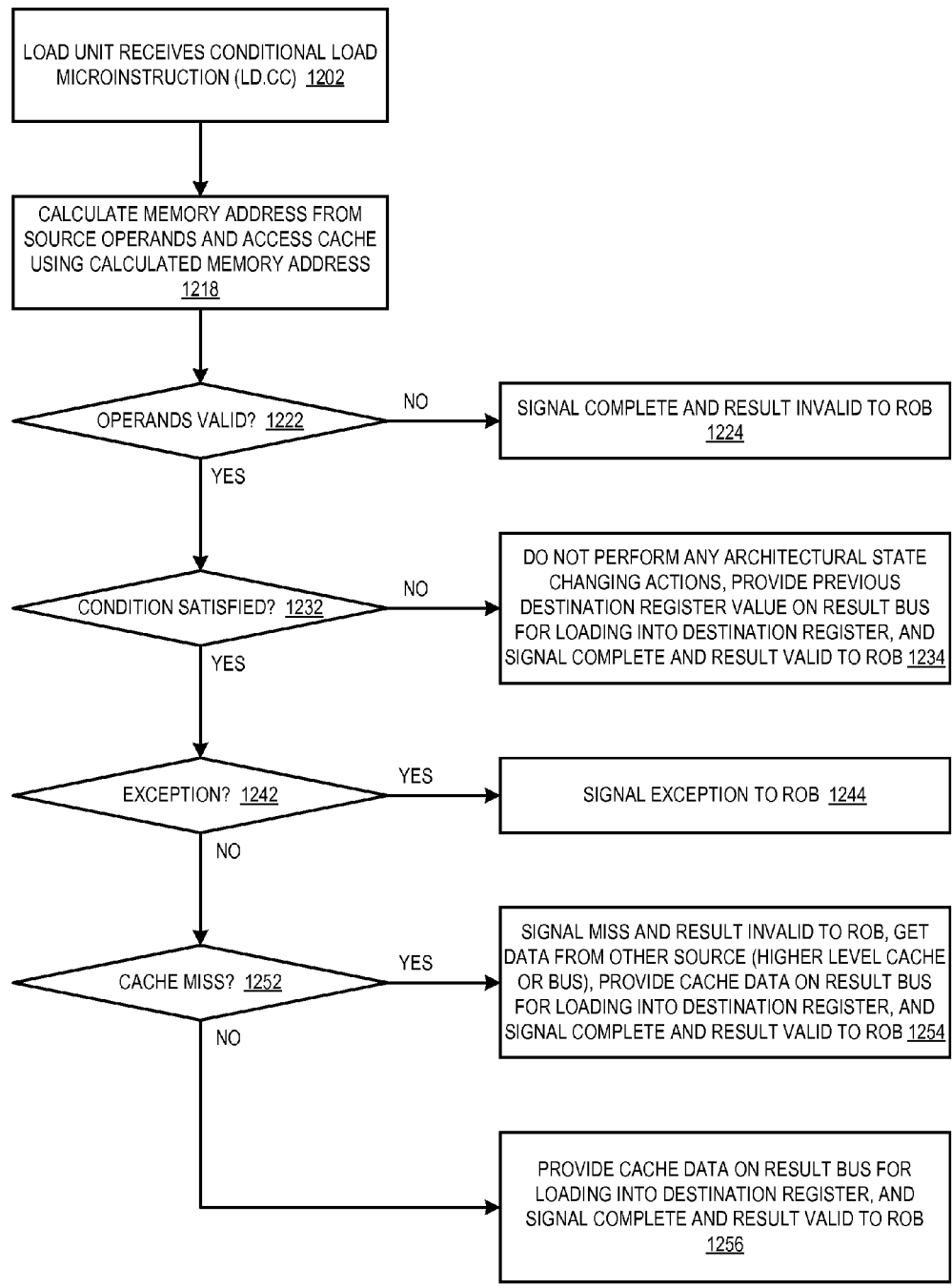
FIG. 12 is a flowchart illustrating operation of the microprocessor of FIG. 9 to execute a conditional load microinstruction.

Referring now to FIG. 12, a flowchart illustrating operation of the microprocessor 100 of FIG. 9 to execute a conditional load microinstruction 126 (e.g., LD.CC of FIG. 11) is shown. Flow begins at block 1202.

At block 1202, the load unit 416 receives the LD.CC from the microinstruction queue 904 along with its source operands 962/964. Flow proceeds to block 1218.

At block 1218, the load unit 416 calculates the memory address from the source operands by adding the two relevant source operands. In the case of the LD.CC microinstructions 126 of FIG. 11, for example, the load unit 416 adds the base address specified in the base register (RN) to the offset to produce the memory address. As described above, the offset may be an immediate value provided on the constant bus 952 or a register or shifted register value provided on one of the operand buses 962. The load unit 416 then provides the calculated memory address to the memory subsystem 108 to access the data cache. Flow proceeds to decision block 1222.

Figure 18:
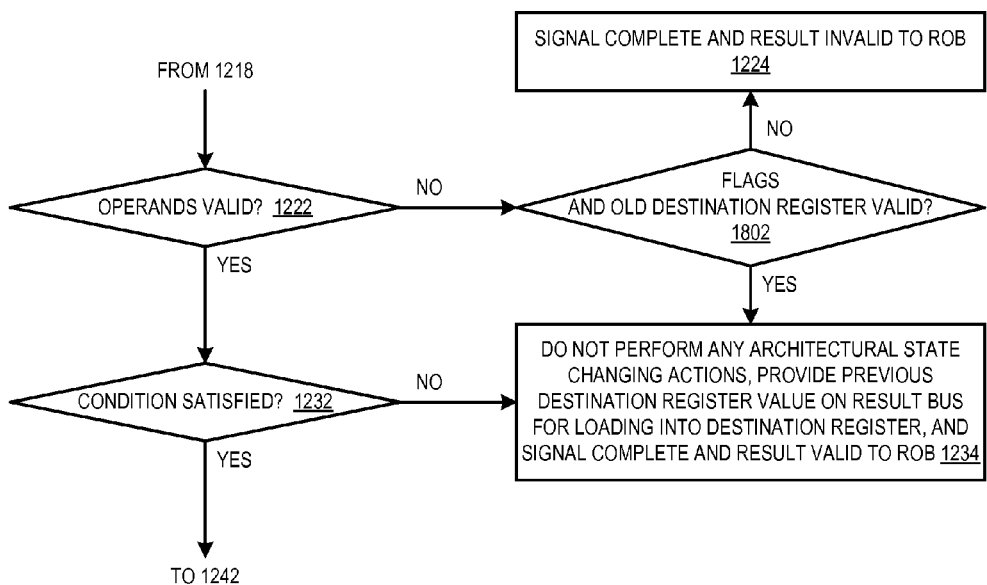
FIG. 18 is a flowchart illustrating operation of the microprocessor of FIG. 9 to execute a conditional load microinstruction according to an alternate embodiment.

At decision block 1222, the load unit 416 determines whether the operands provided to it at block 1202 are valid. That is, the microarchitecture speculates that the source operands are valid, namely the flags 964, the previous value of the destination register 962, and the address calculation operands 962. If the load unit 416 learns that its source operands are not valid, e.g., due to an older load miss that signals its result is invalid, then the load unit 416 signals the ROB 422 to replay the LD.CC microinstruction 126 at block 1224 below. However, as an optimization according to an alternate embodiment illustrated in FIG. 18, if the load unit 416 detects that the flags 964 are valid but did not satisfy the condition and the previous destination register value 962 is valid (at decision block 1802 of FIG. 18), then even if the address operands 962 are not valid the load unit 416 signals the ROB 422 that the microinstruction 126 is complete, i.e., does not signal the ROB 422 to replay the conditional load/store microinstruction 126 and provides the previous value of the destination register on the result bus 128, similar to the manner described below with respect to block 1234. The previous value of a register (e.g., the destination/base register) received by a microinstruction "A" 126 (for example, the LD.CC microinstruction 126 of block 1112) is a result produced by execution of another microinstruction "B" 126 that is the most recent in-order previous writer of the register with respect to microinstruction A. That is, microinstruction B refers to the microinstruction 126 that: (1) writes to the register (i.e., it specifies as its destination register the same register 106A as microinstruction A specifies as one its source registers 106A); (2) is previous to microinstruction A within a stream of microinstructions 126 emitted by the hardware instruction translator 104; and (3) of all the microinstructions 126 in the stream previous to microinstruction A, microinstruction B is the most recent within the stream that writes to the register, i.e., is the previous register writer closest in the stream to microinstruction A. As described above, the previous value of the register may be provided to the execution unit 424 that executes microinstruction A by either the architectural register file 106A, the speculative register file 106B, or the forwarding buses 128. Typically, the flags are written by an unretired microinstruction 126 translated from an instruction 124 in the program that precedes the conditional load/store instruction 124 (e.g., an ADD instruction 124) such that the flag-writing microinstruction 126 is older than the LD.CC, LEA.CC and/or MOV.CC microinstruction 126 from which the conditional load/store instruction 124 is translated. Therefore, the RAT 402 generates a dependency for each of the conditional microinstructions 126 (e.g., LD.CC, LEA.CC and/or MOV.CC) upon the older flag-writing microinstruction 126. If the source operands 962/964 are valid, flow proceeds to decision block 1232; otherwise, flow proceeds to block 1224.

At block 1224, the load unit 416 signals that the operation is complete and the result 128 is invalid. In an alternate embodiment, the load unit 416 signals a miss rather than operation complete. Flow ends at block 1224.

At decision block 1232, the load unit 416 determines whether the condition flags 964 received at block 1202 satisfy the condition specified by the LD.CC. In an alternate embodiment, logic separate from the execution units 424, such as the instruction issue unit 408, makes the determination of whether the condition flags satisfy the condition and provide an indication to the execution units 424, rather than the execution units 424 themselves making the determination. If so, flow proceeds to decision block 1242; otherwise, flow proceeds to block 1234.

At block 1234, the load unit 416 does not perform any actions that would cause the microprocessor 100 to change its architectural state. More specifically, in one embodiment, the load unit 416 does not: (1) perform a tablewalk (even if the memory address misses in the TLB, because a tablewalk may involve updating a page table); (2) generate an architectural exception (e.g., page fault, even if the memory page implicated by the memory address is absent from physical memory); (3) perform any bus transactions (e.g., in response to a cache miss, or in response to a load from an uncacheable region of memory). Additionally, the load unit 416 does not allocate a line in the data cache of the memory subsystem 108. In other words, the load unit 416 acts like it would when an exception is generated, except that it does not set an exception bit in the ROB 422 entry allocated for the LD.CC. The actions not performed by the load unit 416 (or store unit 416 with respect to block 1634 below, for example) apply to the load/store units 416 and memory subsystem 108 as a whole; for example, the tablewalk engine of the memory subsystem 108 does not perform the tablewalk or bus transactions or allocate a line in the data cache. Furthermore, the load unit 416 provides the previous destination register value 926 on the result bus 128 for loading into the destination register (RT). The previous destination register value 926 is a result produced by execution of another microinstruction 126 that is the most recent in-order previous writer of the destination register (RT) with respect to the LD.CC microinstruction 126. It is noted that even though the condition flags do not satisfy the condition, the execution of the LD.CC microinstruction 126 writes a result to the destination register (assuming the LD.CC retires), which is part of the architectural state of the microprocessor 100; however, the execution of the LD.CC microinstruction 126 does not "change" the destination register if the condition flags do not satisfy the condition, because the previous value of the destination register is re-written to the destination register here at block 1234. This is the correct architectural result defined by the instruction set architecture for the conditional load instruction 124 when the condition is not satisfied. Finally, the load unit 416 signals that the operation is complete and the result 128 is valid. Flow ends at block 1234.

At decision block 1242, the load unit 416 determines whether the LD.CC caused an exception condition to occur, such as a page fault, memory protection fault, data abort condition, alignment fault condition, and so forth. If not, flow proceeds to decision block 1252; otherwise, flow proceeds to block 1244.

At block 1244, the load unit 416 signals that the operation caused an exception. Flow ends at block 1244.

At decision block 1252, the load unit 416 determines whether the memory address calculated at block 1218 missed in the data cache. If so, flow proceeds to block 1254; otherwise, flow proceeds to block 1256.

At block 1254, the load unit 416 signals the cache miss and that the result invalid. This enables the ROB 422 to replay any newer microinstructions 126 that are dependent upon the missing load data. Additionally, the load unit 416 obtains the data from the appropriate source. More specifically, the load unit 416 obtains the data from another cache memory in the cache hierarchy (e.g., an L2 cache) and if that fails, obtains the data from system memory. The load unit 416 then provides the data on the result bus 128 for loading into the destination register (RT) and signals complete and that the result is valid. Flow ends at block 1254.

At block 1256, the load unit 416 provides the data obtained from the data cache at block 1218 on the result bus 128 for loading into the destination register (RT) and signals complete and that the result is valid. Flow ends at block 1256.

Figure 13:
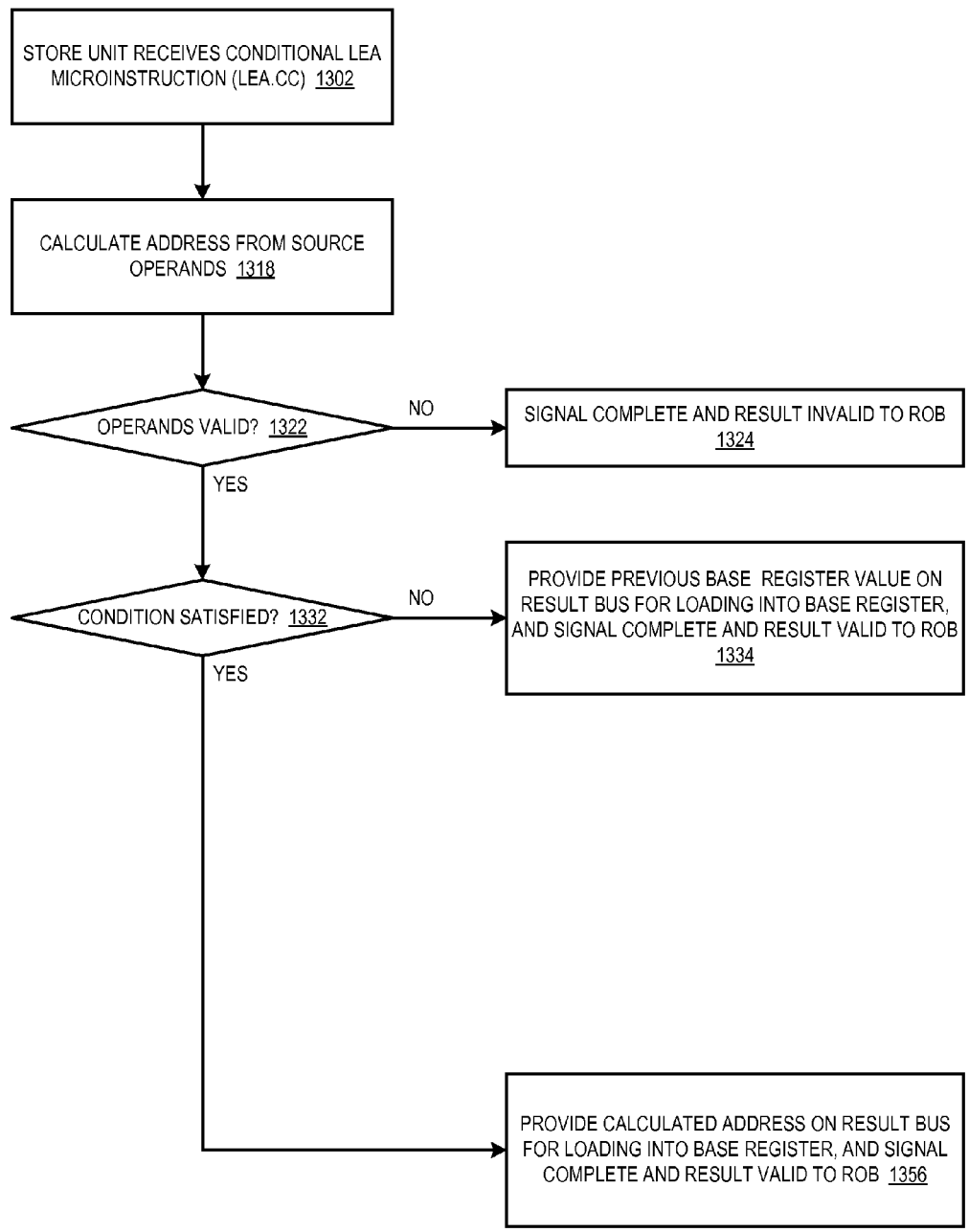
FIG. 13 is a flowchart illustrating operation of the microprocessor of FIG. 9 to execute a conditional load effective address microinstruction.

Referring now to FIG. 13, a flowchart illustrating operation of the microprocessor 100 of FIG. 9 to execute a conditional load effective address microinstruction 126 (e.g., LEA.CC of FIG. 11) is shown. Flow begins at block 1302.

At block 1302, the store unit 416 receives the LEA.CC from the microinstruction queue 904 along with its source operands 962/964. Flow proceeds to block 1318.

At block 1318, the store unit 416 calculates the address from the source operands by adding the two relevant source operands, similar to the calculation of the memory address by the load unit 416 at block 1218. In the case of the LEA.CC microinstructions 126 of FIG. 11, for example, the store unit 416 adds the base address specified in the base register (RN) to the offset to produce the address. As described above, the offset may be an immediate value provided on the constant bus 952 or a register or shifted register value provided on one of the operand buses 962. Flow proceeds to decision block 1322.

At decision block 1322, the store unit 416 determines whether the operands provided to it at block 1302 are valid. If the store unit 416 learns that its source operands are not valid, then the store unit 416 signals the ROB 422 to replay the LEA.CC microinstruction 126 at block 1324 below. However, as an optimization according to one embodiment, if the store unit 416 detects that the flags 964 are valid but did not satisfy the condition and the previous destination register value 962 is valid, then even if the address operands 962 are not valid the store unit 416 signals the ROB 422 that the microinstruction 126 is complete, i.e., does not signal the ROB 422 to replay the conditional load/store microinstruction 126 and provides the previous value of the base register on the result bus 128, similar to the manner described below with respect to block 1334. If the source operands 962/964 are valid, flow proceeds to decision block 1332; otherwise, flow proceeds to block 1324.

At block 1324, the store unit 416 signals that the operation is complete and the result 128 is invalid. Flow ends at block 1324.

At decision block 1332, the store unit 416 determines whether the condition flags 964 received at block 1302 satisfy the condition specified by the LEA.CC. If so, flow proceeds to decision block 1356; otherwise, flow proceeds to block 1334.

At block 1334, the store unit 416 provides the previous base register value 926 on the result bus 128 for loading into the base register (RN), which is specified as the destination register of the LEA.CC (e.g., of blocks 1112, 1114, 1122 and 1132 of FIG. 11). The previous base register value 926 is a result produced by execution of another microinstruction 126 that is the most recent in-order previous writer of the base register (RN) with respect to the LEA.CC microinstruction 126. It is noted that even though the condition flags do not satisfy the condition, the execution of the LEA.CC microinstruction 126 writes a result to the base register (assuming the LEA.CC retires), which is part of the architectural state of the microprocessor 100; however, the execution of the LEA.CC microinstruction 126 does not "change" the base register if the condition flags do not satisfy the condition, because the previous value of the base register is re-written to the base register here at block 1334. This is the correct architectural result defined by the instruction set architecture for the conditional load instruction 124 when the condition is not satisfied. Finally, the store unit 416 signals that the operation is complete and the result 128 is valid. Flow ends at block 1334.

At block 1356, the store unit 126 provides the address calculated at block 1318 on the result bus 128 for loading into the base register (RN) and signals complete and that the result is valid. Flow ends at block 1356.

The operation of the store unit 416 to perform the unconditional load effective address microinstruction 126 (e.g., LEA of FIG. 11) is similar to that described with respect to FIG. 13; however, the steps at blocks 1332 and 1334 are not performed since the LEA microinstruction 126 is unconditional. As described above with respect to FIG. 11, in some cases the instruction translator 104 specifies a temporary register 106, rather than an architectural register 106, as the destination register of the LEA microinstruction 126.

Generally speaking, programs tend to perform a significantly higher percentage of reads from memory than writes to memory. Consequently, the store unit is generally less utilized than the load unit. In the embodiment described above with respect to FIGS. 12 and 13, the store unit 416 executes the LEA.CC microinstruction 126 and the load unit 416 executes the LD.CC microinstruction 126. In the cases associated with blocks 1112, 1114, 1122, and 1132, for example, the LD.CC and LEA.CC microinstructions 126 do not have dependencies upon one another; therefore, they may be issued for execution independently of one another. In one embodiment, the LD.CC microinstruction 126 may be issued to the load unit 416 for execution in the same clock cycle the LEA.CC microinstruction 126 is issued to the store unit 416 for execution (assuming both microinstructions 126 are ready to be issued, i.e., the units 416 and the source operands 962/964 are available). Thus, advantageously, any additional latency associated with the second microinstruction 126 may be statistically small for many instruction streams. Additionally, an embodiment is contemplated in which the execution pipeline 112 includes dual symmetric load/store units 416, rather than a distinct load unit 416 and store unit 416. In such an embodiment, a similar benefit may be appreciated with respect to conditional load instructions 124 since the LD.CC microinstruction 126 and LEA.CC microinstruction 126 may be issued concurrently to the dual symmetric load/store units 416. Furthermore, a similar benefit may be appreciated with respect to conditional store instructions 124 in such an embodiment, since the ST.FUSED.CC microinstruction 126 (described in detail below with respect to FIGS. 15-17) and the LEA.CC microinstruction 126 do not have dependencies upon one another, and therefore may be issued for execution concurrently to the symmetric load/store units 416.

Figure 14:
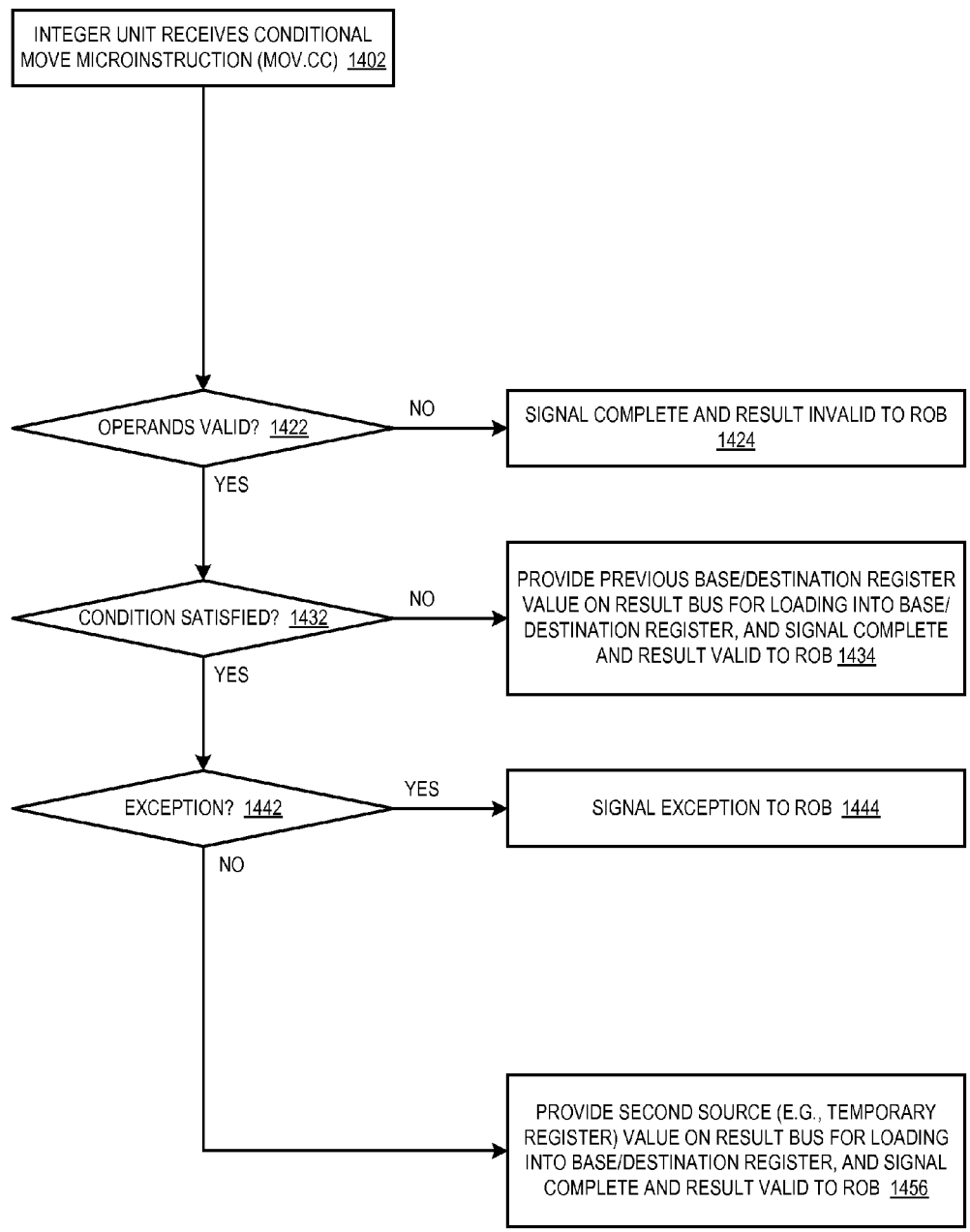
FIG. 14 is a flowchart illustrating operation of the microprocessor of FIG. 9 to execute a conditional move microinstruction.

Referring now to FIG. 14, a flowchart illustrating operation of the microprocessor 100 of FIG. 9 to execute a conditional move microinstruction 126 (e.g., MOV.CC of FIG. 11) is shown. Flow begins at block 1402.

At block 1402, the integer unit 412 receives the MOV.CC from the microinstruction queue 904 along with its source operands 962/964. Flow proceeds to decision block 1422.

At decision block 1422, the integer unit 412 determines whether the operands provided to it at block 1402 are valid. If the source operands 962/964 are valid, flow proceeds to decision block 1432; otherwise, flow proceeds to block 1424.

At block 1424, the integer unit 412 signals that the operation is complete and the result 128 is invalid. Flow ends at block 1424.

At decision block 1432, the integer unit 412 determines whether the condition flags 964 received at block 1402 satisfy the condition specified by the MOV.CC. If so, flow proceeds to decision block 1442; otherwise, flow proceeds to block 1434.

At block 1434, the integer unit 412 provides the previous base register value 926 on the result bus 128 for loading into the base register (RN), which is specified as the destination register of the MOV.CC (e.g., of blocks 1124 and 1134 of FIG. 11). The previous base register value 926 is a result produced by execution of another microinstruction 126 that is the most recent in-order previous writer of the base register (RN) with respect to the MOV.CC microinstruction 126. It is noted that even though the condition flags do not satisfy the condition, the execution of the MOV.CC microinstruction 126 writes a result to the base register (assuming the MOV.CC retires), which is part of the architectural state of the microprocessor 100; however, the execution of the MOV.CC microinstruction 126 does not "change" the base register if the condition flags do not satisfy the condition, because the previous value of the base register is re-written to the base register here at block 1434. This is the correct architectural result defined by the instruction set architecture for the conditional load instruction 124 when the condition is not satisfied. In some instances of the MOV.CC microinstruction 126 generated by the instruction translator 104, the MOV.CC provides the previous destination register value 926 (rather than the previous base register value) on the result bus 128 for loading into the destination register (RT), which is specified as the destination register of the MOV.CC (e.g., of blocks 1924, 1926, 1934 and 1936 of FIG. 19). Finally, the integer unit 412 signals that the operation is complete and the result 128 is valid. Flow ends at block 1434.

At decision block 1442, the integer unit 412 determines whether the MOV.CC caused an exception condition to occur. If not, flow proceeds to block 1456; otherwise, flow proceeds to block 1444.

At block 1444, the integer unit 412 signals that the operation caused an exception. Flow ends at block 1444.

At block 1456, the integer unit 412 provides the second source operand 926 (e.g., temporary register T1 of blocks 1124 and 1134 of FIG. 11) on the result bus 128 for loading into the base register (RN) or destination register (RT), depending on which register the instruction translator 104 specified as the destination register of the MOV.CC, and signals complete and that the result is valid. Flow ends at block 1456.

Referring now to FIG. 15, a flowchart illustrating operation of the instruction translator 104 of the microprocessor 100 of FIG. 9 to translate a conditional store instruction 124 into microinstructions 126 is shown. Flow begins at block 1502.

At block 1502, the instruction translator 104 encounters a conditional store instruction 124 and translates it into one or more microinstructions 126 as described with respect to blocks 1512 through 1536 depending upon characteristics of the conditional store instruction 124. The conditional store instruction 124 specifies a condition (denoted <C> in FIG. 15) upon which data will be stored to a memory address from a data register if the condition flags satisfy the condition. In the examples of FIG. 15, the data register is denoted "RT." The conditional store instruction 124 also specifies a base register and an offset. The base register holds a base address. In the examples of FIG. 15, the base register is denoted "RN." The offset may be one of three sources: (1) an immediate value specified by the conditional store instruction 124; (2) a value held in an offset register; or (3) a value held in an offset register shifted by an immediate value specified by the conditional store instruction 124. In the examples of FIG. 15, the offset register is denoted "RM." One of the characteristics specified by the conditional store instruction 124 is an address mode. The address mode specifies how to compute the memory address to which the data will be stored. In the embodiment of FIG. 15, three addressing modes are possible: post-indexed, pre-index, and offset-addressed. In the post-indexed address mode, the memory address is simply the base address, and the base register is updated with the sum of the base address and the offset. In the pre-indexed address mode, the memory address is the sum of the base address and the offset, and the base register is updated with the sum of the base address and the offset. In the indexed address mode, the memory address is the sum of the base address and the offset, and the base register is not updated. It is noted that the conditional store instruction 124 may specify a difference of the base address and offset rather than a sum. Flow proceeds to decision block 1503.

At decision block 1503, the instruction translator 104 determines whether the source of the offset is an immediate value, a register value, or a shifted register value. If an immediate value, flow proceeds to decision block 1504; if a register value, flow proceeds to decision block 1506; if a shifted register value, flow proceeds to decision block 1508.

At decision block 1504, the instruction translator 104 determines whether the address mode is post-indexed, pre-indexed, or offset-addressed. If post-indexed, flow proceeds to block 1512; if pre-indexed, flow proceeds to block 1514; if offset-addressed, flow proceeds to block 1516.

At decision block 1506, the instruction translator 104 determines whether the address mode is post-indexed, pre-indexed, or offset-addressed. If post-indexed, flow proceeds to block 1522; if pre-indexed, flow proceeds to block 1524; if offset-addressed, flow proceeds to block 1526.

At decision block 1508, the instruction translator 104 determines whether the address mode is post-indexed, pre-indexed, or offset-addressed. If post-indexed, flow proceeds to block 1532; if pre-indexed, flow proceeds to block 1534; if offset-addressed, flow proceeds to block 1536.

At block 1512, the instruction translator 104 translates the immediate offset post-indexed conditional store instruction 124 into two microinstructions 126: a conditional store fused microinstruction 126 (ST.FUSED.CC) and a conditional load effective address microinstruction 126 (LEA.CC). Each of the microinstructions 126 includes the condition specified by the conditional store instruction 124. The ST.FUSED.CC specifies: (1) DC (don't care) as its destination register (because the ST.FUSED.CC does not provide a result); (2) RT, the architectural register 106A that was specified as the data register of the conditional store instruction 124, as a source operand 962; (3) RN, the architectural register 106A that was specified as the base register of the conditional store instruction 124, as a source operand 962; (4) the condition flags 964 as a source operand; and (5) a zero constant 952 as a source operand 962. The execution of the ST.FUSED.CC microinstruction 126 is described in detail with respect to FIG. 16. The ST.FUSED.CC microinstruction 126 is a single microinstruction 126 that occupies a single entry in the ROB 422; however, it is issued to both the store unit 416 and the integer unit 412. In one embodiment, the store unit 416 executes a store address portion that generates a store address written to a store queue entry, and the integer unit 412 executes a store data portion that writes store data to the store queue entry. In one embodiment, the microprocessor 100 does not include a distinct store data unit; instead, the store data operation is performed by the integer unit 412. In one embodiment, the ST.FUSED.CC is similar to that described in U.S. Pat. No. 8,090,931 (CNTR.2387), which is hereby incorporated by reference in its entirety for all purposes. The LEA.CC specifies: (1) RN, the architectural register 106A that was specified as the base register of the conditional store instruction 124, as its destination register; (2) RN as a source operand 962; (3) a zero constant 952 as a source operand 962; (4) the condition flags 964 as a source operand; and (5) the immediate constant 952 specified by the conditional store instruction 124 as a source operand 962. The execution of the LEA.CC microinstruction 126 is described in detail with respect to FIG. 13. It is noted that if the ST.FUSED.CC causes an exception (e.g., page fault), then the LEA.CC result will not be retired to architectural state to update the base register (RN), even though the result may be written to the speculative register file 106B.

At block 1514, the instruction translator 104 translates the immediate offset pre-indexed conditional store instruction 124 into two microinstructions 126: a conditional store fused microinstruction 126 (ST.FUSED.CC) and a conditional load effective address microinstruction 126 (LEA.CC), similar to those of block 1512. However, the ST.FUSED.CC of block 1514 specifies the immediate constant 952 specified by the conditional store instruction 124 as a source operand 962, in contrast to the ST.FUSED.CC of block 1512 which specifies a zero constant 952 as the source operand 962. Consequently, the calculated memory address to which the data will be stored is the sum of the base address and the offset, as described in more detail with respect to FIG. 16.

At block 1516, the instruction translator 104 translates the immediate offset offset-addressed conditional store instruction 124 into a single microinstruction 126: a conditional store fused microinstruction 126 (ST.FUSED.CC), similar to the ST.FUSED.CC of block 1514. The LEA.CC of blocks 1512 and 1514 is not needed because the offset-addressed addressing mode does not call for updating the base register.

At block 1522, the instruction translator 104 translates the register offset post-indexed conditional store instruction 124 into two microinstructions 126: a conditional store fused microinstruction 126 (ST.FUSED.CC) and a conditional load effective address microinstruction 126 (LEA.CC). Each of the microinstructions 126 includes the condition specified by the conditional store instruction 124. The ST.FUSED.CC is the same as the ST.FUSED.CC described with respect to block 1512. The LEA.CC specifies: (1) RN, the architectural register 106A that was specified as the base register of the conditional load instruction 124, as its destination register; (2) RN as a source operand 962; (3) RM, the architectural register 106A that was specified as the offset register of the conditional load instruction 124, as a source operand 962; (4) the condition flags 964 as a source operand; and (5) a zero constant 952 as the source operand 962. That is, the LEA.CC of block 1522 is similar to that of block 1512, except that it specifies RM as a source register rather than a zero constant as its second source operand, and it specifies a zero constant rather than the immediate constant as its fourth source operand. Consequently, the calculated update base address is the sum of the base address and the register offset from RM, as described with respect to FIG. 13.

At block 1524, the instruction translator 104 translates the register offset pre-indexed conditional store instruction 124 into three microinstructions 126: an unconditional load effective address microinstruction 126 (LEA), a conditional store fused microinstruction 126 (ST.FUSED.CC), and a conditional move microinstruction 126 (MOV.CC). The ST.FUSED.CC and MOV.CC microinstructions 126 include the condition specified by the conditional load instruction 124. The LEA specifies: (1) T1, a temporary register 106, as its destination register; (2) RN, the architectural register 106A that was specified as the base register of the conditional store instruction 124, as a source operand 962; (3) RM, the architectural register 106A that was specified as the offset register of the conditional store instruction 124, as a source operand 962; (4) a don't care (DC) as the third source operand (because the LEA is unconditional and therefore does not require the condition flags 964 as a source operand); and (5) a zero constant 952 as a source operand 962. The ST.FUSED.CC specifies: (1) DC (don't care) as its destination register; (2) RT as a source operand 962; (3) T1, the temporary register 106A that is the destination register of the LEA, as a source operand 962; (4) the condition flags 964 as a source operand; and (5) a zero constant 952 as a source operand 962. That is, the ST.FUSED.CC of block 1524 is similar to that of block 1522; however, the ST.FUSED.CC of block 1524 specifies T1 (destination register of the LEA) as a source operand 962, in contrast to the ST.FUSED.CC of block 1522 which specifies RN (base register) as the source operand 962. Consequently, the calculated memory address to which the data will be stored is the sum of the base address and the register offset. The MOV.CC specifies: (1) RN, the architectural register 106A that was specified as the base register of the conditional store instruction 124, as its destination register; (2) RN as a source operand 962; (3) T1, the temporary register 106A that is the destination register of the LEA, as a source operand 962; (4) the condition flags 964 as a source operand; and (5) a zero constant 952 as the source operand 962. Thus, the MOV.CC causes the base register to be updated with the sum of the base address and the register offset (T1 from the LEA). It is noted that if the ST.FUSED.CC causes an exception (e.g., page fault), then the MOV.CC result will not be retired to architectural state to update the base register (RN), even though the result may be written to the speculative register file 106B.

At block 1526, the instruction translator 104 translates the register offset offset-addressed conditional store instruction 124 into two microinstructions 126: an unconditional load effective address microinstruction 126 (LEA) and a conditional store fused microinstruction 126 (ST.FUSED.CC), which are the same as the LEA and ST.FUSED.CC of block 1524. It is noted that the MOV.CC microinstruction 126 is not needed because the offset-addressed addressing mode does not call for updating the base register.

At block 1532, the instruction translator 104 translates the shifted register offset post-indexed conditional store instruction 124 into three microinstructions 126: a shift microinstruction 126 (SHF), a conditional store fused microinstruction 126 (ST.FUSED.CC), and a conditional load effective address microinstruction 126 (LEA.CC). The SHF specifies: (1) T2, a temporary register 106, as its destination register; (2) RM, the architectural register 106A that was specified as the offset register of the conditional store instruction 124, as a source operand 962; (3) a don't care (DC) as the second source operand; (4) a don't care (DC) as the third source operand (because the SHF is unconditional and therefore does not require the condition flags 964 as a source operand); and (5) the immediate constant 952 specified by the conditional store instruction 124 as a source operand 962, which specifies the amount the value in RM is to be shifted to generate the shifted register offset. The ST.FUSED.CC is the same as that described with respect to block 1512. The LEA.CC specifies: (1) RN, the architectural register 106A that was specified as the base register of the conditional store instruction 124, as its destination register; (2) RN as a source operand 962; (3) T2, the temporary register 106A that is the destination register of the SHF, as a source operand 962; (4) the condition flags 964 as a source operand; and (5) a zero constant 952 as the source operand 962. That is, the LEA.CC of block 1532 is similar to that of block 1522, except that it specifies T2 as a source register rather than RM as its second source operand. Consequently, the calculated update base address is the sum of the base address and the shifted register offset.

At block 1534, the instruction translator 104 translates the shifted register offset pre-indexed conditional store instruction 124 into four microinstructions 126: a shift microinstruction 126 (SHF), an unconditional load effective address microinstruction 126 (LEA), a conditional store fused microinstruction 126 (ST.FUSED.CC), and a conditional move microinstruction 126 (MOV.CC). The SHF is the same as that of block 1532, and the LD.CC and MOV.CC are the same as those of block 1524. The LEA is the same as that of block 1524, except that it specifies T2, the temporary register 106A that is the destination register of the SHF, as its second source operand 962. Consequently, the memory address to which the data is stored and the updated base address value is the sum of the base address and the shifted register offset.

At block 1536, the instruction translator 104 translates the register offset offset-addressed conditional store instruction 124 into three microinstructions 126: a shift microinstruction 126 (SHF), an unconditional load effective address microinstruction 126 (LEA), and a conditional store fused microinstruction 126 (ST.FUSED.CC), which are the same as the SHF, LEA and ST.FUSED.CC of block 1534. It is noted that the MOV.CC microinstruction 126 is not needed because the offset-addressed addressing mode does not call for updating the base register.

Referring now to FIG. 16, a flowchart illustrating operation of the microprocessor 100 of FIG. 9 to execute the store address portion of a conditional store fused microinstruction 126 (e.g., ST.FUSED.CC of FIG. 11) is shown. Flow begins at block 1602.

At block 1602, the store unit 416 receives the ST.FUSED.CC from the microinstruction queue 904 along with its source operands 962/964. When the ST.FUSED.CC is issued to the store unit 416, the memory subsystem 108 snoops the bus from the microinstruction queue 904 and detects that the ST.FUSED.CC microinstruction 126 has been issued. In response, the memory subsystem 108 allocates an entry in the store queue for the ST.FUSED.CC. In an alternate embodiment, the memory subsystem 108 allocates the entry in the store queue by snooping the RAT 402 and detecting when the ST.FUSED.CC microinstruction 126 is dispatched to the reservation stations 406 and microinstruction queue 904. The memory address to which the data will be stored is subsequently written to the allocated store queue entry, as described with respect to block 1656 below. Additionally, the data to be stored is subsequently written to the allocated store queue entry, as described with respect to block 1756 of FIG. 17. Subsequently, the memory subsystem 108 will store the data in the store queue entry to memory at the memory address in the store queue entry if the ST.FUSED.CC is eventually retired. Flow proceeds to block 1618.

At block 1618, the store unit 416 calculates the memory address from the source operands by adding the two relevant source operands. In the case of the ST.FUSED.CC microinstructions 126 of FIG. 15, for example, the store unit 416 adds the base address specified in the base register (RN) to the offset to produce the memory address. As described above, the offset may be an immediate value provided on the constant bus 952 or a register or shifted register value provided on one of the operand buses 962. Flow proceeds to decision block 1622.

At decision block 1622, the store unit 416 determines whether the operands provided to it at block 1602 are valid. If the source operands 962/964 are valid, flow proceeds to decision block 1632; otherwise, flow proceeds to block 1624.

At block 1624, the store unit 416 signals that the operation is complete. In an alternate embodiment, the store unit 416 does not signal complete. Flow ends at block 1624.

At decision block 1632, the store unit 416 determines whether the condition flags 964 received at block 1602 satisfy the condition specified by the ST.FUSED.CC. If so, flow proceeds to decision block 1642; otherwise, flow proceeds to block 1634.

At block 1634, the store unit 416 does not perform any actions that would cause the microprocessor 100 to change its architectural state. More specifically, in one embodiment, the store unit 416 does not: (1) perform a tablewalk (even if the memory address misses in the TLB, because a tablewalk may involve updating a page table); (2) generate an architectural exception (e.g., page fault, even if the memory page implicated by the memory address is absent from physical memory); (3) perform any bus transactions (e.g., to store the data to memory). Additionally, the store unit 416 does not allocate a line in the data cache of the memory subsystem 108. In other words, the store unit 416 acts like it would when an exception is generated, except that it does not set an exception bit in the ROB 422 entry allocated for the ST.FUSED.CC. Furthermore, the store unit 416 signals the memory subsystem 108 to kill the entry in the store queue that was allocated for the ST.FUSED.CC at block 1602 so that no store operation is performed by the memory subsystem 108 and to cause the store queue entry to be released in coordination with the writing of the store data by the integer unit 412 at block 1756 of FIG. 17. Finally, the store unit 416 signals that the operation is complete and the result 128 is valid. Flow ends at block 1634.

At decision block 1642, the store unit 416 determines whether the ST.FUSED.CC caused an exception condition to occur. If not, flow proceeds to block 1656; otherwise, flow proceeds to block 1644.

At block 1644, the store unit 416 signals that the operation caused an exception. Flow ends at block 1644.

At block 1656, the store unit 416 writes the memory address calculated at block 1618 to which the data will be stored to the allocated store queue entry. Additionally, the store unit 416 signals complete and that the result is valid. The memory subsystem 108 will subsequently write the data from the store queue entry to memory at the memory address in the store queue entry if the ST.FUSED.CC is eventually retired. Flow ends at block 1656.

Figure 17:
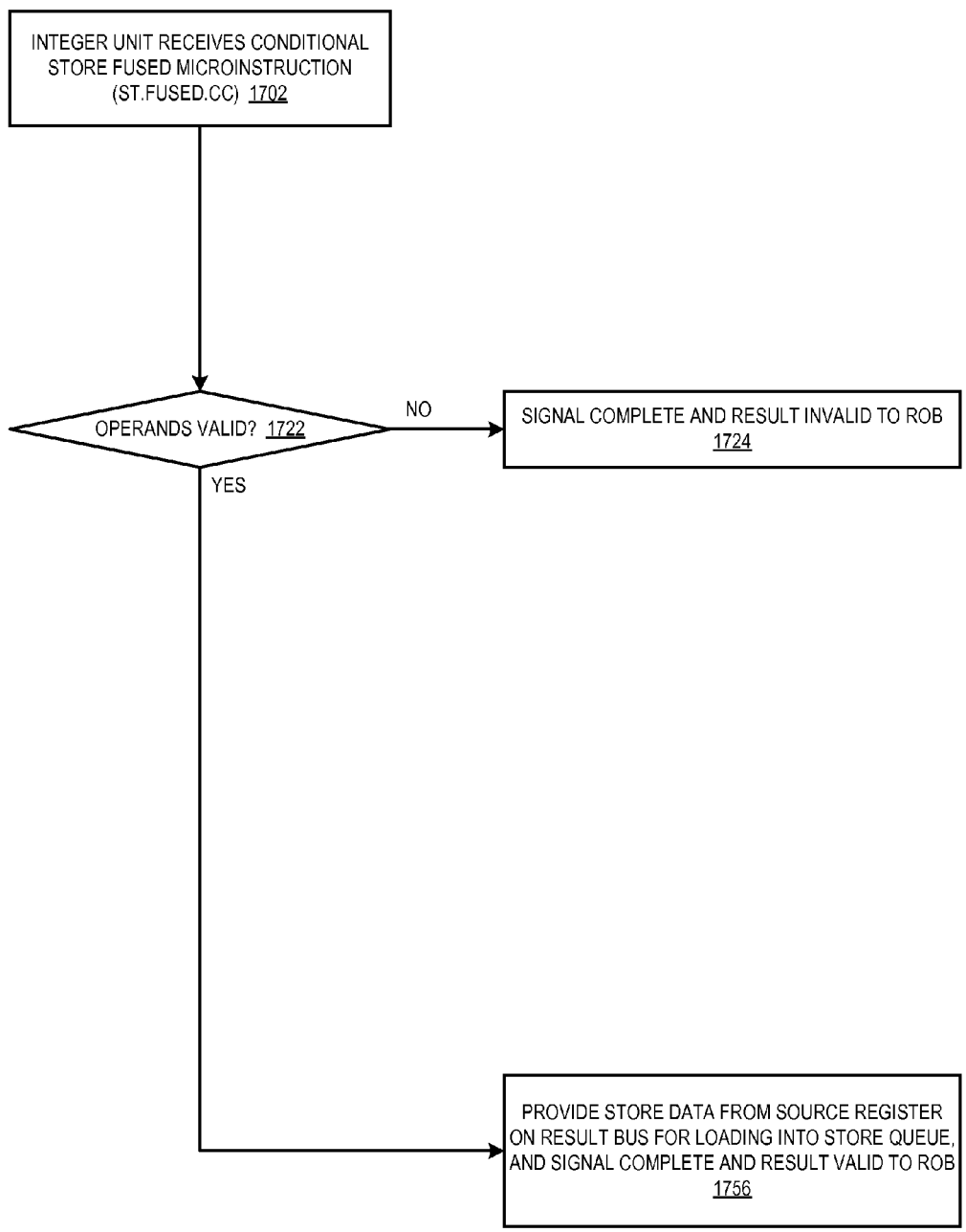

Referring now to FIG. 17, a flowchart illustrating operation of the microprocessor 100 of FIG. 9 to execute the store data portion of a conditional store fused microinstruction 126 (e.g., ST.FUSED.CC of FIG. 11) is shown. Flow begins at block 1702.

At block 1702, the integer unit 412 receives the ST.FUSED.CC from the microinstruction queue 904 along with its source operands 962/964. Flow proceeds to decision block 1722.

At decision block 1722, the integer unit 412 determines whether the operands provided to it at block 1702 are valid. If the source operands 962/964 are valid, flow proceeds to block 1756; otherwise, flow proceeds to block 1724.

At block 1756, the integer unit 412 provides the store data from the source data register (e.g., RT of FIG. 15) on the result bus 128 for loading into the store queue entry allocated at block 1602 of FIG. 16, and signals complete and that the result is valid. Flow ends at block 1756.

Although embodiments have been described in which the conditional store instruction is translated into one or more microinstructions that include a conditional store fused microinstruction, the invention is not limited to such embodiments; rather, other embodiments are contemplated in which the conditional store instruction is translated into distinct conditional store address and store data microinstructions rather than a conditional store fused microinstruction. Thus, for example, the case shown in block 1512 of FIG. 15 could alternatively be translated into the following microinstruction 126 sequence:

STA.CC DC, RT, RN, FLAGS, ZERO
STD DC, RT, RN, FLAGS, ZERO
LEA.CC RN, RN, ZERO, FLAGS, IMM

The STA.CC and STD microinstructions 126 are executed in a manner similar to those described with respect to FIGS. 16 and 17, respectively; however, the two microinstructions 126 do not share a ROB entry; rather, a distinct ROB 422 entry is allocated for each of the microinstructions 126. This alternate embodiment may simplify portions of the microprocessor 100 if it does not include a store fused microinstruction 126 in the microarchitecture instruction set. However, it may suffer the disadvantages associated with consuming an additional ROB 422 entry and potentially adding to the complexity of the hardware instruction translator 104, particularly in cases where the total number of microinstructions 126 into which the conditional store instruction 124 is translated exceeds the width of the simple instruction translator 204, i.e., exceeds the number of microinstructions 126 the simple instruction translator 204 is capable of emitting in a single clock cycle.

Referring now to FIG. 19, a flowchart illustrating operation of the instruction translator 104 of the microprocessor 100 of FIG. 9 to translate a conditional load instruction 124 into microinstructions 126 according to an alternate embodiment is shown. The flowchart of FIG. 19 is similar to that of FIG. 11 in many respects and like numbered blocks are the same. However, blocks 1124, 1126, 1134 and 1136 of FIG. 11 are replaced in FIG. 19 with blocks 1924, 1926, 1934 and 1936, respectively.

At block 1924 the instruction translator 104 translates the register offset pre-indexed conditional load instruction 124 into three microinstructions 126: a conditional load microinstruction 126 (LD.CC), a conditional load effective address microinstruction 126 (LEA.CC), and a conditional move microinstruction 126 (MOV.CC). The LD.CC and MOV.CC microinstructions 126 include the condition specified by the conditional load instruction 124. The LD.CC specifies: (1) T1, a temporary register 106, as its destination register; (2) RN, the architectural register 106A that was specified as the base register of the conditional load instruction 124, as a source operand 962; (3) RM, the architectural register 106A that was specified as the offset register of the conditional load instruction 124, as a source operand 962; (4) the condition flags 964 as a source operand; and (5) a zero constant 952 as a source operand 962. The LEA.CC specifies: (1) RN, the architectural register 106A that was specified as the base register of the conditional load instruction 124, as a source operand 962; (2) RN as a source operand 962; (3) RM, the architectural register 106A that was specified as the offset register of the conditional load instruction 124, as a source operand 962; (4) the condition flags 964 as a source operand; and (5) a zero constant 952 as a source operand 962. The MOV.CC specifies: (1) RT, the architectural register 106A that was specified as the destination register of the conditional load instruction 124, as its destination register; (2) RT as a source operand 962; (3) T1, the temporary register 106A that is the destination register of the LD.CC, as a source operand 962; (4) the condition flags 964 as a source operand; and (5) a zero constant 952 as the source operand 962. It is noted that the instruction translator 104 generates an LD.CC microinstruction 126, rather than an unconditional load microinstruction 126, in the embodiment of FIG. 19 even though a temporary register, rather than an architectural register, is being loaded in order to avoid taking architectural state-updating actions, which the LD.CC does not do if the condition is not satisfied, as described above with respect to block 1234 of FIG. 12. The embodiment of block 1924 differs from the embodiment of block 1124 in that the load and load effective address microinstruction 126 are reversed and the dependencies of the microinstructions 126 are different, which may affect the throughput of the microprocessor 100 for a given instruction 124 stream and depending upon the composition of the execution units 424, the cache hit rate, and so forth.

At block 1926, the instruction translator 104 translates the register offset offset-addressed conditional load instruction 124 into two microinstructions 126: a conditional load microinstruction 126 (LD.CC) and a conditional move microinstruction 126 (MOV.CC), which are the same as the LD.CC and MOV.CC of block 1924. It is noted that the LEA.CC microinstruction 126 is not needed because the offset-addressed addressing mode does not call for updating the base register.

At block 1934, the instruction translator 104 translates the shifted register offset pre-indexed conditional load instruction 124 into four microinstructions 126: a shift microinstruction 126 (SHF), a conditional load microinstruction 126 (LD.CC), a conditional load effective address microinstruction 126 (LEA.CC), and a conditional move microinstruction 126 (MOV.CC). The LD.CC, LEA.CC and MOV.CC microinstructions 126 include the condition specified by the conditional load instruction 124. The SHF is the same as that of block 1132, and the LEA.CC and MOV.CC are the same as those of block 1924. The LD.CC is the same as that of block 1924, except that it specifies T2, the temporary register 106A that is the destination register of the SHF, as its second source operand 962. Consequently, the memory address from which the data is loaded and the updated base address value is the sum of the base address and the shifted register offset. The embodiment of block 1934 differs from the embodiment of block 1134 in that the load and load effective address microinstruction 126 are reversed and the dependencies of the microinstructions 126 are different, which may affect the throughput of the microprocessor 100 for a given instruction 124 stream and depending upon the composition of the execution units 424, the cache hit rate, and so forth.

At block 1936, the instruction translator 104 translates the shifted register offset offset-addressed conditional load instruction 124 into three microinstructions 126: a shift microinstruction 126 (SHF), a conditional load microinstruction 126 (LD.CC), and a conditional move microinstruction 126 (MOV.CC), and which are the same as the SHF, LD.CC and MOV.CC of block 1934. It is noted that the LEA.CC microinstruction 126 is not needed because the offset-addressed addressing mode does not call for updating the base register.

Referring now to FIG. 20, a flowchart illustrating operation of the instruction translator 104 of the microprocessor 100 of FIG. 9 to translate a conditional store instruction 124 into microinstructions 126 according to an alternate embodiment is shown. The flowchart of FIG. 20 is similar to that of FIG. 15 in many respects and like numbered blocks are the same. However, blocks 1512 and 1514 of FIG. 15 are replaced in FIG. 20 with blocks 2012 and 2014, respectively.

At block 2012, the instruction translator 104 translates the immediate offset post-indexed conditional store instruction 124 into a single conditional store fused post-update microinstruction 126 (ST.FUSED.UPDATE.POST.CC). The ST.FUSED.UPDATE.POST.CC microinstruction 126 includes the condition specified by the conditional store instruction 124. The ST.FUSED.UPDATE.POST.CC specifies: (1) RN, the architectural register 106A that was specified as the base register of the conditional store instruction 124, as a source operand 962; (2) RT, the architectural register 106A that was specified as the data register of the conditional store instruction 124, as a source operand 962; (3) RN as a source operand 962; (4) the condition flags 964 as a source operand; and (5) the immediate constant 952 specified by the conditional store instruction 124 as a source operand 962. The execution of the ST.FUSED.UPDATE.CC microinstruction 126 is described in detail with respect to FIG. 21. The ST.FUSED.UPDATE.CC microinstruction 126 operates similarly to a ST.FUSED.CC microinstruction 126; however, it also writes a result to a destination register. In the embodiment of block 2012, the destination register is the base register (RN) and the updated address written to the base register by the ST.FUSED.UPDATE.POST.CC is the sum of the base address and the immediate offset.

At block 2014, the instruction translator 104 translates the immediate offset pre-indexed conditional store instruction 124 into a single conditional store fused pre-update microinstruction 126 (ST.FUSED.UPDATE.PRE.CC). The ST.FUSED.UPDATE.PRE.CC microinstruction 126 of block 2014 is similar to the ST.FUSED.UPDATE.POST.CC microinstruction 126 of block 2012, except that it stores the data to the base address (rather than the sum of the base address and the immediate offset) although, like the ST.FUSED.UPDATE.POST.CC, the ST.FUSED.UPDATE.PRE.CC writes the sum of the base address and the immediate offset to the destination register.

Figure 21:
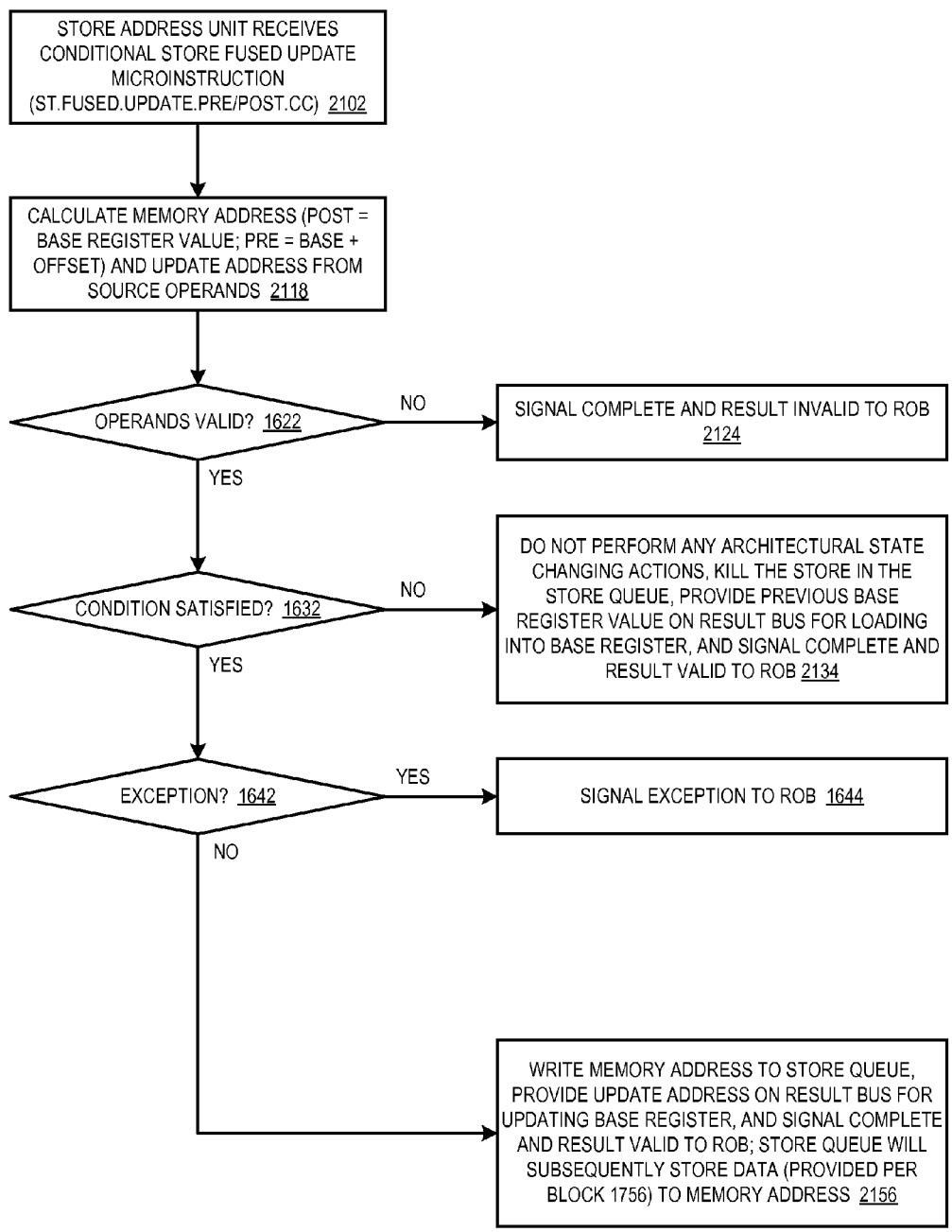
FIG. 21 is a flowchart illustrating operation of the microprocessor of FIG. 9 to execute a conditional store fused microinstruction according to an alternate embodiment.

Referring now to FIG. 21, a flowchart illustrating operation of the microprocessor 100 of FIG. 9 to execute a conditional store fused update microinstruction 126 (e.g., ST.FUSED.UPDATE.POST.CC of block 2012 and ST.FUSED.UPDATE.PRE.CC of block 2014 of FIG. 20, which are referred to generically herein as ST.FUSED.UPDATE.CC) is shown. The flowchart of FIG. 21 is similar to that of FIG. 16 in many respects and like numbered blocks are the same. However, blocks 1602, 1618, 1624, 1634 and 1656 of FIG. 16 are replaced in FIG. 21 with blocks 2102, 2118, 2124, 2134 and 2156, respectively.

At block 2102, the store unit 416 receives the ST.FUSED.UPDATE.CC from the microinstruction queue 904 along with its source operands 962/964. When the ST.FUSED.UPDATE.CC is issued to the store unit 416, the memory subsystem 108 snoops the bus from the microinstruction queue 904 and detects that the ST.FUSED.UPDATE.CC microinstruction 126 has been issued. In response, the memory subsystem 108 allocates an entry in the store queue for the ST.FUSED.UPDATE.CC. The memory address to which the data will be stored is subsequently written to the allocated store queue entry, as described with respect to block 2156 below. Additionally, the data to be stored is subsequently written to the allocated store queue entry, as described with respect to block 1756 of FIG. 17. Subsequently, the memory subsystem 108 will store the data in the store queue entry to memory at the memory address in the store queue entry if the ST.FUSED.UPDATE.CC is eventually retired. Flow proceeds to block 2118.

At block 2118, the store unit 416 calculates both the memory address and an update address from the source operands. The store unit 416 calculates the update address by adding the two relevant source operands. In the case of the ST.FUSED.UPDATE.CC microinstructions 126 of FIG. 15, for example, the store unit 416 adds the base address specified in the base register (RN) to the offset to produce the update address. As described above, the offset may be an immediate value provided on the constant bus 952 or a register or shifted register value provided on one of the operand buses 962. In the case of a ST.FUSED.UPDATE.POST.CC, the store unit 416 calculates the memory address by adding the base address to zero. In the case of a ST.FUSED.UPDATE.PRE.CC, the store unit 416 calculates the memory address by adding the two relevant source operands, as with the update address. Flow proceeds to decision block 2122.

At block 2124, the store unit 416 signals that the operation is complete and the result 128 is invalid. Flow ends at block 2124.

At block 2134, the store unit 416 executes the ST.FUSED.UPDATE.CC similar to the manner described with respect to the execution of the ST.FUSED.CC at block 1634. However, the store unit 416 additionally provides the previous base register value 926 on the result bus 128 for loading into the base register (RN), which is specified as the destination register of the ST.FUSED.UPDATE.CC (e.g., of blocks 2012 and 2014 of FIG. 20). The previous base register value 926 is a result produced by execution of another microinstruction 126 that is the most recent in-order previous writer of the base register (RN) with respect to the ST.FUSED.UPDATE.CC microinstruction 126. It is noted that even though the condition flags do not satisfy the condition, the execution of the ST.FUSED.UPDATE.CC microinstruction 126 writes a result to the base register (assuming the ST.FUSED.UPDATE.CC retires), which is part of the architectural state of the microprocessor 100; however, the execution of the ST.FUSED.UPDATE.CC microinstruction 126 does not "change" the base register if the condition flags do not satisfy the condition, because the previous value of the base register is re-written to the base register here at block 2134. This is the correct architectural result defined by the instruction set architecture for the conditional load instruction 124 when the condition is not satisfied. Flow ends at block 2134.

At block 2156, the store unit 416 writes the memory address calculated at block 2118 to which the data will be stored to the allocated store queue entry. Additionally, the store unit 416 signals complete and that the result is valid. The memory subsystem 108 will subsequently write the data from the store queue entry to memory at the memory address in the store queue entry if the ST.FUSED.CC is eventually retired. Additionally, the store unit 416 provides the update address calculated at block 2118 on the result bus 128 for loading into the base register (RN), which is specified as the destination register of the ST.FUSED.UPDATE.CC (e.g., of blocks 2012 and 2014 of FIG. 20). In one embodiment, providing the update address on the result bus 128 occurs sooner than the writing of the memory address to the store queue entry, and the store address unit 416 signals complete for the update address sooner than it signals complete for the writing of the memory address to the store queue, which may be advantageous because it enables the update address to be forwarded to dependent microinstructions 126 sooner. Flow ends at block 2156.

As may be observed from operation of the microprocessor 100 as described with respect to the Figures above, the load/store address is a function of the base address value and the offset value; in the case of a post-indexed addressing mode, the load/store address is simply the base address value; whereas, in the case of a pre-indexed or offset-addressed addressing mode, the load/store address is the sum of the offset value and the base address value.

As may be observed, the embodiments described herein advantageously enable the conditional load instruction 124 to specify a destination register that is different than all of the source operand (e.g., base and offset) registers specified by the conditional load instruction 124. Additionally, the embodiments described herein advantageously enable the conditional store instruction 124 to specify a data register that is different than all of the source operand (e.g., base and offset) registers specified by the conditional store instruction 124.

Embodiments of the microprocessor 100 have been described in which the architectural register file 106A includes only enough read ports to provide at most two source operands to the execution units 424 that execute the microinstructions 126 that implement the conditional load/store instructions 124. As described above with respect to FIG. 1, embodiments are contemplated in which the microprocessor 100 is an enhancement of a commercially available microprocessor. The register file that holds the general purpose registers of the commercially available microprocessor includes only enough read ports for the register file to provide at most two source operands to the execution units that execute the microinstructions 126 that are described herein that implement the conditional load/store instructions 124. Thus, the embodiments described herein are particularly advantageous for synergistic adaptation of the commercially available microprocessor microarchitecture. As also described above with respect to FIG. 1, the commercially available microprocessor was originally designed for the x86 ISA in which conditional execution of instructions is not a dominant feature and, because it is accumulator-based, generally requires one of the source operands to be the destination operand, and therefore does not seem to justify the additional read port.

As may be observed from the foregoing, embodiments described herein potentially avoid disadvantages of employing a microarchitecture that allows microinstructions 126 to specify an additional source operand to obtain the previous destination register value in addition to the base register value and offset register value in the case of a conditional load instruction, or to obtain the data, base and offset register values in the case of a conditional store instruction. The avoided disadvantages may include the following. First, adding an additional source operand to the microinstructions 126 may require an additional read port on the architectural register file 106A for each execution unit 424 that would execute microinstructions 126 with an additional source operand. Second, it may require an additional read port on the speculative register file 106B for each execution unit 424 that would execute microinstructions 126 with an additional source operand. Third, it may require more wires for the forwarding buses 128 for each execution unit 424 that would execute microinstructions 126 with an additional source operand. Fourth, it may require an additional relatively large mux for each execution unit 424 that would execute microinstructions 126 with an additional source operand. Fifth, it may require a relatively large number of additional tag comparators that is a function of the number of execution units 424, the number of reservation station 406 entries for each execution unit 424, the maximum number of source operands specifiable by a microinstruction executable by each execution unit 424, and the number of execution units 424 that are capable of forwarding to each execution unit 424. Sixth, it may require additional renaming lookup in the RAT 402 for the additional source operand. Seventh, it may require the reservation stations 406 to be expanded to handle the additional source operand. The additional cost in terms of speed, power, and real estate might be undesirable. These undesirable additional costs are advantageously potentially avoided by the embodiments described.

Thus, an advantage of the embodiments described herein is that they enable ISA conditional load/store instructions to be efficiently performed by an out-of-order execution pipeline while keeping an acceptable number of read ports on the general purpose and ROB register files. Although embodiments are described in which the ISA (e.g., ARM ISA) conditional load/store instruction may specify up to two source operands provided from general purpose architectural registers and the number of read ports on the general purpose register file and on the ROB register file is kept to two per execution unit, other embodiments are contemplated in which a different ISA in which the ISA conditional load/store instruction may specify more than two source operands provided from general purpose architectural registers and the number of read ports on the general purpose register file and on the ROB register file per execution unit is still kept to a desirable number. For example, in the different ISA the conditional load/store instruction may specify up to three source operands provided from general purpose architectural registers, such as a base register value, an index register value, and an offset register value. In such an embodiment, the number of read ports per execution unit may be three, the microinstructions may be adapted to specify an additional source register, and the conditional load/store instruction may be translated into similar numbers of microinstructions as embodiments described herein. Alternatively, the number of read ports per execution unit may be two, and the conditional load/store instruction may be translated into a larger number of microinstructions and/or different microinstructions than the embodiments described herein. For example, consider the case of a conditional load instruction similar to the case described with respect to block 1134 of FIG. 11 but which additionally specifies an index register, RL, that is added to the base register (RN) value and the offset register (RM) value to generate the memory address and update address value, as shown here, along with the microinstructions into which the conditional load instruction is translated:

LDR <C> RT, RN, RM, RL, PRE-INDEXED
    SHF T2, RM, DC, DC, IMM
    LEA T1, RN, T2, DC, DC
    LEA T3, RL, T1, DC, DC
    LD.CC RT, RT, T3, FLAGS, ZERO
    MOV.CC RN, RN, T3, FLAGS, ZERO

For another example, consider the case in which a conditional store instruction similar to the case described with respect to block 1516 of FIG. 15 but which additionally specifies an index register, RL, that is added to the base register (RN) value and the immediate offset value to generate the memory address, as shown here, along with the microinstructions into which the conditional store instruction is translated:

STR <C> RT, RN, RL, IMM, OFFSET-ADDR
    LEA T1, RL, RN, FLAGS, IMM
    ST.FUSED.CC DC, RT, T1, FLAGS, IMM

Another advantage of the embodiments described herein is that although in some cases there is the execution latency associated with the execution of two, three, or four microinstructions into which the conditional load/store instruction 124 is translated, the operations performed by each of the microinstructions are relatively simple, which lends itself to a pipelined implementation that is capable of supporting relatively high core clock rates.

Although embodiments are described in which the microprocessor 100 is capable of performing instructions of both the ARM ISA and the x86 ISA, the embodiments are not so limited. Rather, embodiments are contemplated in which the microprocessor performs instructions of only a single ISA. Furthermore, although embodiments are described in which the microprocessor 100 translates ARM ISA conditional load/store instructions into microinstructions 126 as described herein, embodiments are contemplated in which the microprocessor performs instructions of an ISA other than the ARM but which includes conditional load/store instructions in its instruction set.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
condition flags;
an instruction translator, that receives a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition;
wherein the instruction translator translates the conditional load instruction into a number of microinstructions, wherein the number of microinstructions varies as a function of the offset source, addressing mode, and whether the conditional instruction is a conditional load or store instruction; and
an out-of-order execution pipeline, that executes the microinstructions to generate results specified by the instruction.

2. The microprocessor of claim 1, wherein to execute the microinstructions the execution pipeline changes architectural state of the microprocessor based on the results only if the condition flags satisfy the condition, but refrains from changing any architectural state of the microprocessor if the condition flags do not satisfy the condition.

3. The microprocessor of claim 2, wherein to execute the microinstructions, if the condition flags do not satisfy the condition, the execution pipeline refrains from performing a virtual memory page table walk in response to a miss of the memory location address in a translation lookaside buffer of the microprocessor.

4. The microprocessor of claim 2, wherein to execute the microinstructions, if the condition flags do not satisfy the condition, the execution pipeline refrains from performing transactions on a system bus, to which the microprocessor is coupled, in order to load the data from the memory location.

5. The microprocessor of claim 2, wherein to execute the microinstructions, if the condition flags do not satisfy the condition, the execution pipeline refrains from generating an architectural exception even if the instruction creates an architectural exception condition.

6. The microprocessor of claim 2, wherein to execute the microinstructions, if the condition flags do not satisfy the condition, the execution pipeline refrains from allocating a cache line for the data in a cache memory of the microprocessor.

7. The microprocessor of claim 2, wherein the execution pipeline comprises a plurality of execution units that execute the microinstructions, wherein at least one of the execution units is configured to execute a microinstruction of the microinstructions;
wherein to execute the microinstruction the execution unit receives the values of the destination register, the condition flags, the base register, and the offset and an indication of whether each is valid, wherein if the execution unit determines the condition flags do not satisfy the condition:
if the received values of the condition flags and the destination register are valid, the execution unit signals completion of the microinstruction and provides the received destination register value as its result, even if the received values of the base register and/or the offset are invalid; and
otherwise, the execution unit signals the result is invalid.

8. The microprocessor of claim 1, wherein the conditional load instruction comprises a conditional load register (LDR) instruction specified by the Advanced RISC Machines (ARM) instruction set architecture (ISA), wherein the conditional store instruction comprises a conditional store register (STR) instruction specified by the ARM ISA.

9. The microprocessor of claim 1, wherein in the case of a conditional load instruction, when the addressing mode specifies the base register is updated, the number of microinstructions is at least two.

10. The microprocessor of claim 9, wherein the at least two microinstructions comprise:
a first microinstruction, wherein to execute the first microinstruction an execution unit of the execution pipeline receives a previous value of the destination register and generates a result that is the data loaded from the memory location if the condition flags satisfy the condition but is the previous value of the destination register if the condition flags do not satisfy the condition; and
a second microinstruction, wherein to execute the second microinstruction an execution unit of the execution pipeline receives the previous value of the base register and generates a result that is a memory address based on the offset and previous base register value if the condition flags satisfy the condition but is the previous base register value if the condition flags do not satisfy the condition;

wherein the previous value of the destination register comprises a result produced by execution of a microinstruction that is the most recent in-order previous writer of the destination register with respect to the first microinstruction;

wherein the previous value of the base register comprises a result produced by execution of a microinstruction that is the most recent in-order previous writer of the base register with respect to the second microinstruction.

11. The microprocessor of claim 10, wherein the execution pipeline comprises:
  a first execution unit, that executes the first microinstruction;
  a second execution unit, that executes the second microinstruction; and
  an issue unit, capable of issuing the first and second microinstructions concurrently to the first and second execution units, respectively.

12. The microprocessor of claim 1, wherein the offset source further specifies whether the register value is shifted or un-shifted, wherein the number of microinstructions further varies as a function of whether the register value is shifted or un-shifted.

13. The microprocessor of claim 12, wherein when the offset source specifies the offset is a shifted register value, the number of microinstructions is at least one more than when the offset source specifies the offset is an immediate value or an un-shifted register value.

14. The microprocessor of claim 12, wherein the execution pipeline comprises execution units that execute the microinstructions, the microprocessor further comprising:
  a register file, that includes a plurality of registers, wherein the instruction may specify the base register as one of the plurality of registers and specify an offset register as one of the plurality of registers, wherein for each of the execution units the register file includes at most two read ports for providing the base register value and the offset register value;
  wherein when the addressing mode specifies the base register is not updated, the number of microinstructions is:
    one when the offset source specifies the offset is an immediate value;
    two when the offset source specifies the offset is an un-shifted register value; and
    three when the offset source specifies the offset is a shifted register value.

15. The microprocessor of claim 12, wherein the addressing mode further specifies whether the memory location address is the unchanged base register value or a sum/difference of the base register value and the offset, wherein when the addressing mode specifies the memory location address is the sum/difference and the base register is updated with the sum/difference and the offset is a register value, the number of microinstructions is at least three.

16. The microprocessor of claim 15, wherein the execution pipeline comprises execution units that execute the microinstructions, the microprocessor further comprising:
  a register file, that includes a plurality of registers that the conditional load/store instruction may specify as the base register, wherein for each of the execution units the register file includes at most two read ports for providing operands;
  wherein the number of microinstructions is:
    three when the offset source specifies the register value is un-shifted; and
    four when the offset source specifies the register value is shifted.

17. The microprocessor of claim 15, wherein when the conditional instruction is a conditional load instruction, the at least three microinstructions comprise:
  a first microinstruction, wherein to execute the first microinstruction an execution unit of the execution pipeline generates the sum/difference;
  a second microinstruction, wherein to execute the second microinstruction an execution unit of the execution pipeline receives a previous value of the destination register and the sum/difference and generates a result that is the data loaded from the memory location whose address is specified by the sum/difference if the condition flags satisfy the condition but is the previous value of the destination register if the condition flags do not satisfy the condition; and
  a third microinstruction, wherein to execute the third microinstruction an execution unit of the execution pipeline receives the previous value of the base register and the sum/difference and generates a result that is the sum/difference if the condition flags satisfy the condition but is the previous value of the base register if the condition flags do not satisfy the condition;
  wherein the previous value of the destination register comprises a result produced by execution of a microinstruction that is the most recent in-order previous writer of the destination register with respect to the second microinstruction;
  wherein the previous value of the base register comprises a result produced by execution of a microinstruction that is the most recent in-order previous writer of the base register with respect to the third microinstruction.

18. The microprocessor of claim 17, wherein when the offset source specifies the register value is shifted, the at least three microinstructions comprise:
  a fourth microinstruction, wherein to execute the fourth microinstruction an execution unit of the execution pipeline generates the shifted register value;
  wherein to execute the first microinstruction an execution unit of the execution pipeline generates the sum/difference as a sum/difference of the base register value and the shifted register value generated by the fourth microinstruction.

19. The microprocessor of claim 15, wherein when the conditional instruction is a conditional store instruction, the at least three microinstructions comprise:
  a first microinstruction, wherein to execute the first microinstruction an execution unit of the execution pipeline generates the sum/difference;
  a second microinstruction, wherein to execute the second microinstruction an execution unit of the execution pipeline:
    if the condition flags satisfy the condition, writes the first result to an allocated entry in the store queue of the microprocessor, wherein the store queue is configured to subsequently write the data to the memory location specified by the address; and
    if the condition flags do not satisfy the condition, kills the allocated store queue entry so that the store queue does not write the data to the memory location specified by the address; and
  a third microinstruction, wherein to execute the third microinstruction an execution unit of the execution pipeline receives the previous value of the base register and the sum/difference and generates a result that is the sum/difference if the condition flags satisfy the condition but is the previous value of the base register if the condition flags do not satisfy the condition;

wherein the previous value of the base register comprises a result produced by execution of a microinstruction that is the most recent in-order previous writer of the base register with respect to the third microinstruction.

20. The microprocessor of claim 19, wherein when the offset source specifies the register value is shifted, the at least three microinstructions comprise:

a fourth microinstruction, wherein to execute the fourth microinstruction an execution unit of the execution pipeline generates the shifted register value;

wherein to execute the first microinstruction an execution unit of the execution pipeline generates the sum/difference as a sum/difference of the base register value and the shifted register value generated by the fourth microinstruction.

21. The microprocessor of claim 12, wherein the addressing mode further specifies whether the memory location address is the unchanged base register value or the sum/difference of the base register value and the offset, wherein when the addressing mode specifies the memory location address is the sum/difference, the number of microinstructions is:

two when the offset source specifies the offset is an immediate value;

three when the offset source specifies the offset is an unshifted register value; and four when the offset source specifies the offset is a shifted register value.

22. The microprocessor of claim 1, wherein the addressing mode further specifies whether the memory location address is the unchanged base register value or a sum/difference of the base register value and the offset, wherein when the conditional instruction is a conditional load instruction and the addressing mode specifies the memory location address is the sum/difference, the microinstructions comprise at least:

a first microinstruction, wherein to execute the first microinstruction an execution unit of the execution pipeline generates the sum/difference; and a second microinstruction, wherein to execute the second microinstruction an execution unit of the execution pipeline receives the previous value of the destination register and the sum/difference and generates a result that is the data loaded from the memory location whose address is the sum/difference if the condition flags satisfy the condition but is the previous value of the destination register if the condition flags do not satisfy the condition;

wherein the previous value of the destination register comprises a result produced by execution of a microinstruction that is the most recent in-order previous writer of the destination register with respect to the second microinstruction.

23. The microprocessor of claim 22, wherein when the addressing mode specifies the base register is updated with the sum/difference, the microinstructions further comprise:

a third microinstruction, wherein to execute the third microinstruction an execution unit of the execution pipeline receives the previous value of the base register and the sum/difference and generates a result that is the sum/difference if the condition flags satisfy the condition but is the previous value of the base register if the condition flags do not satisfy the condition;

wherein the previous value of the base register comprises a result produced by execution of a microinstruction that is the most recent in-order previous writer of the base register with respect to the third microinstruction.

24. A method for operating a microprocessor having condition flags, the method comprising:

receiving a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition;

translating the conditional load instruction into a number of microinstructions, wherein the number of microinstructions varies as a function of the offset source, addressing mode, and whether the conditional instruction is a conditional load or store instruction; and executing the microinstructions to generate results specified by the instruction, by an out-of-order execution pipeline.

25. The method of claim 24, wherein said executing the microinstructions comprises changing architectural state of the microprocessor based on the results only if the condition flags satisfy the condition, but refraining from changing any architectural state of the microprocessor if the condition flags do not satisfy the condition.

26. The method of claim 25, wherein said executing the microinstructions comprises refraining from performing a virtual memory page table walk in response to a miss of the memory location address in a translation lookaside buffer of the microprocessor if the condition flags do not satisfy the condition.

27. The method of claim 25, wherein said executing the microinstructions comprises refraining from performing transactions on a system bus, to which the microprocessor is coupled, in order to load the data from the memory location if the condition flags do not satisfy the condition.

28. The method of claim 25, wherein said executing the microinstructions comprises refraining from generating an architectural exception even if the instruction creates an architectural exception condition if the condition flags do not satisfy the condition.

29. The method of claim 25, wherein said executing the microinstructions comprises refraining from allocating a cache line for the data in a cache memory of the microprocessor if the condition flags do not satisfy the condition.

30. The method of claim 25, wherein said executing the microinstructions comprises:

receiving the values of the destination register, the condition flags, the base register, and the offset and an indication of whether each is valid;

wherein if the condition flags do not satisfy the condition:
if the received values of the condition flags and the destination register are valid, signaling completion of the microinstruction and providing the received destination register value as its result, even if the received values of the base register and/or the offset are invalid; and otherwise, signaling the result is invalid.

31. The method of claim 24, wherein the conditional load instruction comprises a conditional load register (LDR) instruction specified by the Advanced RISC Machines (ARM) instruction set architecture (ISA), wherein the conditional store instruction comprises a conditional store register (STR) instruction specified by the ARM ISA.

32. The method of claim 24, wherein in the case of a conditional load instruction, when the addressing mode specifies the base register is updated, the number of microinstructions is at least two.

33. The method of claim 32, wherein the at least two microinstructions comprise:
  a first microinstruction, wherein said executing the first microinstruction comprises receiving a previous value of the destination register and generating a result that is the data loaded from the memory location if the condition flags satisfy the condition but is the previous value of the destination register if the condition flags do not satisfy the condition; and
  a second microinstruction, wherein said executing the second microinstruction comprises receiving the previous value of the base register and generating a result that is a memory address based on the offset and previous base register value if the condition flags satisfy the condition but is the previous base register value if the condition flags do not satisfy the condition;
  wherein the previous value of the destination register comprises a result produced by execution of a microinstruction that is the most recent in-order previous writer of the destination register with respect to the first microinstruction;
  wherein the previous value of the base register comprises a result produced by execution of a microinstruction that is the most recent in-order previous writer of the base register with respect to the second microinstruction.

34. The method of claim 24, wherein the offset source further specifies whether the register value is shifted or un-shifted, wherein the number of microinstructions further varies as a function of whether the register value is shifted or un-shifted.

35. The method of claim 34, wherein when the offset source specifies the offset is a shifted register value, the number of microinstructions is at least one more than when the offset source specifies the offset is an immediate value or an un-shifted register value.

36. The method of claim 34, wherein the microprocessor includes a register file that includes a plurality of registers, wherein the instruction may specify the base register as one of the plurality of registers and specify an offset register as one of the plurality of registers, wherein for each of a plurality of execution units of the microprocessor the register file includes at most two read ports for providing the base register value and the offset register value;
  wherein when the addressing mode specifies the base register is not updated, the number of microinstructions is:
    one when the offset source specifies the offset is an immediate value;
    two when the offset source specifies the offset is an un-shifted register value; and
    three when the offset source specifies the offset is a shifted register value.

37. The method of claim 34, wherein the addressing mode further specifies whether the memory location address is the unchanged base register value or a sum/difference of the base register value and the offset, wherein when the addressing mode specifies the memory location address is the sum/difference and the base register is updated with the sum/difference and the offset is a register value, the number of microinstructions is at least three.

38. The method of claim 37, wherein the microprocessor includes a register file that includes a plurality of registers that the conditional load/store instruction may specify as the base register, wherein for each of a plurality of execution units of the microprocessor the register file includes at most two read ports for providing operands;
  wherein the number of microinstructions is:
    three when the offset source specifies the register value is un-shifted; and
    four when the offset source specifies the register value is shifted.

39. The method of claim 37, wherein when the conditional instruction is a conditional load instruction, the at least three microinstructions comprise:
  a first microinstruction, wherein said executing the first microinstruction comprises generating the sum/difference;
  a second microinstruction, wherein said executing the second microinstruction comprises receiving a previous value of the destination register and the sum/difference and generating a result that is the data loaded from the memory location whose address is specified by the sum/difference if the condition flags satisfy the condition but is the previous value of the destination register if the condition flags do not satisfy the condition; and
  a third microinstruction, wherein said executing the third microinstruction comprises receiving the previous value of the base register and the sum/difference and generating a result that is the sum/difference if the condition flags satisfy the condition but is the previous value of the base register if the condition flags do not satisfy the condition;
  wherein the previous value of the destination register comprises a result produced by execution of a microinstruction that is the most recent in-order previous writer of the destination register with respect to the second microinstruction;
  wherein the previous value of the base register comprises a result produced by execution of a microinstruction that is the most recent in-order previous writer of the base register with respect to the third microinstruction.

40. The method of claim 39, wherein when the offset source specifies the register value is shifted, the at least three microinstructions comprise:
  a fourth microinstruction, wherein said executing the fourth microinstruction comprises generating the shifted register value;
  wherein said executing the first microinstruction comprises generating the sum/difference as a sum/difference of the base register value and the shifted register value generated by the fourth microinstruction.

41. The method of claim 37, wherein when the conditional instruction is a conditional store instruction, the at least three microinstructions comprise:
  a first microinstruction, wherein said executing the first microinstruction comprises generating the sum/difference;
  a second microinstruction, wherein said executing the second microinstruction comprises:
    if the condition flags satisfy the condition, writing the first result to an allocated entry in the store queue of the microprocessor, wherein the store queue is configured to subsequently write the data to the memory location specified by the address; and if the condition flags do not satisfy the condition, killing the allocated store queue entry so that the store queue does not write the data to the memory location specified by the address; and a third microinstruction, wherein said executing the third microinstruction comprises receiving the previous value of the base register and the sum/difference and generating a result that is the sum/difference if the condition flags satisfy the condition but is the previous value of the base register if the condition flags do not satisfy the condition;

wherein the previous value of the base register comprises a result produced by execution of a microinstruction that is the most recent in-order previous writer of the base register with respect to the third microinstruction.

42. The method of claim 41, wherein when the offset source specifies the register value is shifted, the at least three microinstructions comprise:

a fourth microinstruction, wherein said executing the fourth microinstruction comprises generating the shifted register value;

wherein said executing the first microinstruction comprises generating the sum/difference as a sum/difference of the base register value and the shifted register value generated by the fourth microinstruction.

43. The method of claim 34, wherein the addressing mode further specifies whether the memory location address is the unchanged base register value or the sum/difference of the base register value and the offset, wherein when the addressing mode specifies the memory location address is the sum/difference, the number of microinstructions is:

two when the offset source specifies the offset is an immediate value;

three when the offset source specifies the offset is an unshifted register value; and four when the offset source specifies the offset is a shifted register value.

44. The method of claim 24, wherein the addressing mode further specifies whether the memory location address is the unchanged base register value or a sum/difference of the base register value and the offset, wherein when the conditional instruction is a conditional load instruction and the addressing mode specifies the memory location address is the sum/difference, the microinstructions comprise at least:

a first microinstruction, wherein said executing the first microinstruction comprises generating the sum/difference; and a second microinstruction, wherein said executing the second microinstruction comprises receiving the previous value of the destination register and the sum/difference and generating a result that is the data loaded from the memory location whose address is the sum/difference if the condition flags satisfy the condition but is the previous value of the destination register if the condition flags do not satisfy the condition;

wherein the previous value of the destination register comprises a result produced by execution of a microinstruction that is the most recent in-order previous writer of the destination register with respect to the second microinstruction.

45. The method of claim 44, wherein when the addressing mode specifies the base register is updated with the sum/difference, the microinstructions further comprise:

a third microinstruction, wherein said executing the third microinstruction receiving the previous value of the base register and the sum/difference and generating a result that is the sum/difference if the condition flags satisfy the condition but is the previous value of the base register if the condition flags do not satisfy the condition;

wherein the previous value of the base register comprises a result produced by execution of a microinstruction that is the most recent in-order previous writer of the base register with respect to the third microinstruction.

46. A computer program product encoded in at least one computer readable storage medium for use with a computing device, the computer program product comprising:

computer readable program code embodied in said medium, for specifying a microprocessor, the computer readable program code comprising:

first program code for specifying condition flags;

second program code for specifying an instruction translator, that receives a conditional load/store instruction that specifies a condition, a destination/data register, a base register, an offset source, and a memory addressing mode, wherein the instruction instructs the microprocessor to load data from a memory location into the destination register (conditional load instruction) or store data to the memory location from the data register (conditional store instruction) only if the condition flags satisfy the condition, wherein the offset source specifies whether the offset is an immediate value or a value in an offset register, wherein the addressing mode specifies whether or not the base register is updated when the condition flags satisfy the condition, wherein the instruction translator translates the conditional load instruction into a number of microinstructions, wherein the number of microinstructions varies as a function of the offset source, addressing mode, and whether the conditional instruction is a conditional load or store instruction; and third program code for specifying an out-of-order execution pipeline, that executes the microinstructions to generate results specified by the instruction.

47. The computer program product of claim 46, wherein the at least one computer readable storage medium is selected from the set of a disk, tape, or other magnetic, optical, or electronic storage medium and a network, wire line, wireless or other communications medium.

* * * * *

UNITED STATES PATENT AND TRADEMARK OFFICE
CERTIFICATE OF CORRECTION

PATENT NO. : 9,244,686 B2
APPLICATION NO. : 14/007116
DATED : January 26, 2016
INVENTOR(S) : G. Glenn Henry et al.

It is certified that error appears in the above-identified patent and that said Letters Patent is hereby corrected as shown below:

Claims

Claim 1, col. 67, line 58: replace "load" with "load/store"
Claim 1, col. 67, line 61: replace "load" with "load/store"
Claim 17, col. 70, line 7: insert --load/store-- between "conditional" and "instruction"
Claim 19, col. 70, line 48: insert --load/store-- between "conditional" and "instruction"
Claim 19, col. 70, lines 56-57: replace "first result" with "data"
Claim 22, col. 71, line 38: insert --load/store-- between "tional" and "instruction"
Claim 24, col. 72, line 21: replace "load" with "load/store"
Claim 24, col. 72, line 24: insert --load/store-- between "conditional" and "instruc-"
Claim 39, col. 74, lines 15-16: insert --load/store-- between "conditional" and "instruction"
Claim 41, col. 74, lines 55-56: insert --load/store-- between "conditional" and "instruction"
Claim 41, col. 74, line 64: replace "first result" with "data"
Claim 44, col. 75, lines 41-42: insert --load/store-- between "conditional" and "instruction"
Claim 46, col. 76, line 41: replace "load" with "load/store"
Claim 46, col. 76, lines 44-45: insert --load/store-- between "conditional" and "instruction"

Signed and Sealed this
Twenty-sixth Day of April, 2016

Michelle K. Lee
*Director of the United States Patent and Trademark Office*